United States Patent
Takeuchi et al.

(10) Patent No.: US 7,128,951 B2
(45) Date of Patent: Oct. 31, 2006

(54) RETARDERS, CIRCULAR POLARIZER AND PROCESSES FOR PREPARING THEM

(75) Inventors: Hiroshi Takeuchi, Minami-ashigara (JP); Seiya Sakurai, Minami-ashigara (JP)

(73) Assignee: Fuji Photo Film Co., Ltd., Minami-Ashigara-shi (JP)

( * ) Notice: Subject to any disclaimer, the term of this patent is extended or adjusted under 35 U.S.C. 154(b) by 106 days.

(21) Appl. No.: 10/632,915

(22) Filed: Aug. 4, 2003

(65) Prior Publication Data

US 2004/0100600 A1 May 27, 2004

(30) Foreign Application Priority Data

Aug. 7, 2002 (JP) ............................. 2002-229923
Feb. 4, 2003 (JP) ............................. 2003-026849

(51) Int. Cl.
*C09K 19/00* (2006.01)
*G02F 1/1335* (2006.01)

(52) U.S. Cl. ..................... 428/1.1; 428/1.3; 349/117; 349/121; 349/98

(58) Field of Classification Search ................ 428/1.1, 428/1.3, 1.31, 1.2; 252/299.01; 349/98, 349/117, 121

See application file for complete search history.

(56) References Cited

U.S. PATENT DOCUMENTS

| | | | |
|---|---|---|---|
| 4,536,063 A | 8/1985 | Southwell | |
| 6,400,433 B1 * | 6/2002 | Arakawa et al. | 349/117 |
| 6,421,107 B1 | 7/2002 | Greenfield et al. | |
| 6,519,016 B1 * | 2/2003 | Ichihashi et al. | 349/117 |
| 6,824,838 B1 * | 11/2004 | Kawata et al. | 428/1.31 |
| 2004/0109114 A1 * | 6/2004 | Takeuchi et al. | 349/117 |

FOREIGN PATENT DOCUMENTS

| | | |
|---|---|---|
| EP | 0 860 716 A2 | 8/1998 |
| JP | 11-148080 A | 6/1999 |

OTHER PUBLICATIONS

Search Report issued in European Patent Application No. EP 03 01 7514, Nov. 24, 2003.

* cited by examiner

*Primary Examiner*—Shean C. Wu
(74) *Attorney, Agent, or Firm*—Buchanan Ingersoll & Rooney PC

(57) ABSTRACT

A retarder and circular polarizer are disclosed. They comprise at least two adjacent layers respectively formed of a composition comprising a liquid-crystalline compound, in which the liquid-crystalline molecules are fixed in an alignment state disposed on or above a substrate wherein no alignment layer is substantially disposed between the two layers. As one embodiment of the present invention, the retarder wherein the lower layer is formed of a composition comprising a liquid-crystalline compound and a non-crystalline polymer is also disclosed.

19 Claims, 1 Drawing Sheet

RETARDERS, CIRCULAR POLARIZER AND PROCESSES FOR PREPARING THEM

TECHNICAL FIELD

The present invention relates to retarders comprising at least two adjacent optically anisotropic layers respectively formed of a composition comprising a liquid-crystalline compound, in which liquid-crystalline molecules fixed are aligned in an alignment state, and no alignment layer between the adjacent two optically anisotropic layers.

DESCRIPTION OF RELATED ART

Retarders formed of optical anisotropic material, having a desired property, are required for LCD. If a retarder having a desired optical property cannot be made of a single member, in order to obtain the desired optical property, plural members maybe used for preparation of a retarder. For example, a quarter wave plate employed in a refractive LCD is required to generate a phase difference of $\lambda/4$ at R, G and B wavelength range respectively, in other words to have a broadband property, however, it is difficult to make a quarter wave plate having such a property of a single member and thus, a quarter wave plate is usually used in the combination with a $\lambda/2$ plate. Such known broadband quarter wave plates are prepared by sticking $\lambda/4$ and $\lambda/2$ plates together, respectively having a thickness not less than tens micro meters, with an adhesive or the like.

On the other hand, a process for preparing broadband quarter wave plates by laminating at least two optically anisotropic layers formed of liquid-crystalline molecules on a long-length-substrate is disclosed in JPA No. 2001-4837 (the term "JPA" as used herein means an "unexamined published Japanese patent application"). A process for laminating plural layers respectively formed of liquid-crystalline molecules fixed in an alignment state is disclosed in U.S. Pat. No. 6,160,597.

In such processes, a fist optically anisotropic layer is prepared by applying a composition comprising a liquid-crystalline compound to an alignment layer and an upper optically anisotropic layer is prepared by applying a composition comprising a liquid-crystalline compound to an alignment layer disposed on the first optically anisotropic layer. Thus, the processes must include a step for preparing an alignment layer before a step for preparing an optically anisotropic layer thereon. In other words, for preparing an optically anisotropic layer, it must be carried out two steps of applying compositions for an alignment layer and for an optically anisotropic layer respectively. As a result, costs for preparing broadband quarter wave plates by the processes increase, and other processes which can prepare them with reduced costs are required. The more it is carried out applying steps in a process, the more defects it is found in the retarder prepared by the process. As a result, a productivity of manufacturing retarders by such a process often lowers. Thus, in order to improve a productivity through a process, it is necessary to reduce applying steps included in the process.

On the other hand, it has been reported that optically anisotropic layers can be formed of a composition comprising a liquid-crystalline compound and a surfactant. For example, in JPA No. 2000-105315, it is disclosed that a surfactant is added to an optically anisotropic layer so as to control the tilted alignment of liquid-crystalline molecules in an area near to the air interface of the layer. However, it is silent about that it is possible to rub the surface of a layer formed of a composition comprising a surfactant, and to prepare an optically anisotropic layer formed of liquid-crystal material on the rubbed surface. In JPA No. 1999-148080 or JPA No. 1996-231958, it has been reported that surfactants can contribute to leveling layers formed of a polymerizable liquid-crystal composition, and in other words, can be used as a leveling agent for such layers. According to them, leveling agents have a property of lowering a surface tension of a liquid-crystal composition, and therefore they can reduce optical unevenness of the layers formed of the composition due to thick unevenness. However, they are also silent about that it is possible to rub the surface of a layer formed of a composition comprising a leveling agent, and to prepare an optically anisotropic layer formed of liquid-crystal material on the rubbed surface. We tried to prepare a first optically anisotropic layer formed of a composition a polymerizable liquid-crystalline compound and a leveling agent described in JPA No. 1996-231958, rub the surface of the first layer and prepare an upper layer formed of a liquid-crystalline compound on the rubbed surface, however, we found that the surface of the first layer was so sticky that the component of the first layer transferred to a rubbing cloth during the rubbing treatment and the liquid-crystalline molecules in the upper layer couldn't be aligned completely on the such rubbed surface.

SUMMARY OF THE INVENTION

Accordingly, the present invention has for its object to provide a process for preparing retarders comprising an upper and lower layers in which liquid-crystalline molecules fixed in an alignment state, which enables preparing the upper layer by aligning and fixing liquid-crystalline molecules in an alignment state without any substantive alignment layers. In particular, an object of the present invention is to provide a process for laminating the upper layer on the lower layer without any alignment layers between them and to provide retarders prepared by the process. A further object of the present invention is to improve productivity of retarders, that is, to provide retarders capable being prepared with high productivity and a process for preparing retarders with high productivity.

In one aspect, the present invention provides a retarder comprising a substrate and at least two adjacent layers respectively formed of a composition comprising a liquid-crystalline compound, in which the liquid-crystalline molecules are fixed in an alignment state, disposed on or above the substrate wherein no alignment layer is substantially disposed between the two adjacent layers.

As embodiments of the present invention, there are provided the retarder wherein the lower layer of the two layers has an upper surface subjected to a rubbing treatment and the upper layer of the two layers is disposed in contact with the rubbed surface of the lower layer; the retarder wherein slow axes of the lower layer and the upper layer are not parallel to each other; and the retarder wherein an angle between a slow axis of the lower layer and a slow axis of the upper layer is substantially 60 degrees, one of the layers generates a phase difference of $\pi$ at 550 nm and another generates a phase difference of $\pi/2$ at 550 nm.

The lower layer of the reterder desirably comprises an additive, thereby allowing a rubbing treatment to an upper surface of the lower layer. The addidive is preferably selected from non-liquid-crystalline polymers.

As one embodiment of the present invention, there is provided the retarder wherein the lower layer is formed of a composition comprising a liquid-crystalline compound and additive; and the retarder wherein the additive is a modified polyvinyl alcohol, desirably the modified polyvinyl alcohol having a hydrocarbon, and much desirably the modified polyvinyl alcohol denoted by Formula (PX):

-(VAl)$_x$-(HyD)$_y$-(VAc)$_z$-  Formula (PX)

where "Val" is a vinyl alcohol based repeating unit, "HyD" is a repeating unit having a hydrocarbon group of not greater than 9 carbon atoms, "VAc" is a vinyl acetate based repeating unit, x is 20 to 95 wt %, y is 2 to 98 wt %, and z is 0 to 30 wt %.

As embodiments of the present invention, there are provided the retarder wherein the additive is a non-liquid-crystalline polymer having a cross-linkable group; the retarder wherein the non-liquid-crystalline polymer comprises a repeating unit denoted by Formula (III):

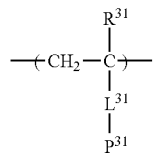

Formula (III)

where $R^{31}$ is a hydrogen atom or a C1–4 alkyl, $P^{31}$ is a monovalent group having an ethylenic unsaturated group, and $L^{31}$ is a single bond or divalent group; the retarder wherein $R^{31}$ is hydrogen or methyl; $P^{31}$ is a monovalent group including an acryloyl, methacryloyl or styryl; and $L^{31}$ is an arylene group, *-COO—, *-CONH— or *-OCO which are respectively bonded to a main chain at the * site; and the retarder wherein the non-liquid-crystalline polymer is a copolymer comprising a repeating unit denoted by the Formula (III) and at least one repeating unit not having any cross-linkable groups; and the retarder wherein the non-liquid-crystalline polymer has a smaller δ a value, which is calculated with three-dimensional SP value, than that of the liquid-crystalline compound.

In another aspect, the present invention provides a circular polarizer comprising:

a reterder comprising a substrate and at least two adjacent layers respectively formed of a composition comprising a liquid-crystalline compound, in which the liquid-crystalline molecules are aligned in an alignment state, disposed on or above the substrate, wherein an angle between the slow axes of the two layers is substantially 60 degrees, one of the layers generates a phase difference of π at 550 nm, the other layer generates a phase difference of π/2 at 550 nm, no alignment layer is substantially disposed between the two layers, the lower layer of the two layers has an upper surface subjected to a rubbing treatment, and the upper layer of the two layers is disposed in contact with the rubbed surface of the lower layer;

a polarizer plate disposed nearer to the layer generating a phase difference of n than the other layer, wherein an angle between a slow axis of the layer generating a phase difference of π and a transmittance axis of the polarizer plate is substantially 15 or 75 degrees.

In another aspect, the present invention provides a liquid-crystal display comprising a retarder of the present invention or a circular polarizer of the present invention.

In another aspect, the present invention provide a process for preparing a retarder comprising a substrate, a lower layer and an upper layer disposed on or above the substrate in this order wherein the layers are respectively formed of a composition comprising a liquid-crystalline compound in which the liquid-crystalline molecules are fixed in an alignment, and no alignment layer is disposed between the layers, comprising a rubbing step of rubbing an upper surface of the lower layer and a step of preparing the upper layer in contact with the rubbed surface of the lower layer.

In the present specification, the term of "lower layer" is used for any layers which are included in retarders comprising a substrate and at least two layers on or above the substrate and are disposed nearer to the substrate than the other layer of the two layers, and the term of "upper layer" is used for any layers which are included in retarders comprising a substrate and at least two layers on or above the substrate and are disposed farther from the substrate than the other layer of the two layers.

And in the present specification, "no alignment layer is substantially disposed" means that there is no layer which is prepared as only an alignment layer. Embodiments comprising at least two adjacent layers in which the upper surface of the lower layer can contribute to alignment of the liquid-crystalline molecules in the upper layer are included in the scope of the present invention, so far as the lower layer is not prepared as only an alignment layer for the upper layer.

In the present specification, the term of "substantially" for an angle means that the angle is in the range of an exact angle ±5°. Preferably, the difference from the exact angle is less than 4°, and more preferably less than 3°.

In the present specification, "a slow axis" means a direction showing a maximum refractive index.

DESCRIPTION OF THE PREFERRED EMBODIMENTS

Figure 1:
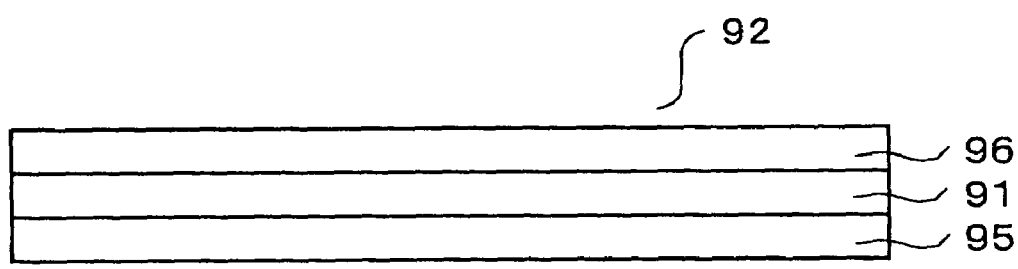
FIG. 1 a rough cross-section drawing of the circular polarizer of Example 2.

The present invention is desirably applied to the technical field of broadband quarter wave plates and their preparations. The retarders capable of functioning as a broadband quarter wave plate, comprising at least two layers respectively formed of liquid-crystalline molecules fixed in an alignment state, are described in JPA No. 2001-4837, JPA No. 2001-21720 and JPA No. 2000-206331.

Embodiments of the present invention relating to broadband quarter wave plates and preparations thereof will be described in detail hereinafter, however, the present invention is not limited to quarter wave plates and their preparations.

[Optical Property of a Broadband Quarter Wave Plate]

In the specification, broadband quarter wave plates specifically mean that they have a retardation value (Re)/wavelength (λ) ratio within the range of 0.2 to 0.3 measured at a wavelength of any of 450 nm, 550 nm and 650 nm. The Re/λ ratio is preferably within the range of 0.21 to 0.29, and more preferably within the range of 0.22 to 0.28. An approximate circular polarized light can be obtained in the whole broadband through a quarter wave plate comprising a linear polarizer film, an optically anisotropic layer generating a phase difference of π and an optically anisotropic layer generating a phase difference of π/2. It is described with Poincare sphere in JPA No. 1998-68816 how circular polarized light can be obtained.

The retarder according to the present invention comprising at least two layers respectively formed of liquid-crystalline molecules fixed in an alignment state. When the present invention is applied to broadband quarter wave plates, one of the layers is an optically anisotropic layer substantially generating a π phase difference at a wavelength and another is an optically anisotropic layer substantially generating a π/2 phase difference at the wavelength. Preferably, the optically anisotropic layers can generate π and π/2 phase differences respectively at 550 nm, which is mostly the middle of visible light range. In order to obtain a π phase difference at a wavelength (λ) through an optically anisotropic layer, it is necessary to prepare the layer so as to adjust the measured retardation of the layer to λ/2 at the λ. In order to obtain a π/2 phase difference at a wavelength (λ) through an optically anisotropic layer, it is necessary to prepare the layer so as to adjust the measured retardation of the layer to λ/4 at the λ.

The optically anisotropic layer generating a π phase difference desirably has a retardation in the range from 200 to 290 nm, preferably from 210 to 280 nm, at 550 nm. The optically anisotropic layer generating a π/2 phase difference desirably has a retardation in the range from 100 to 145 nm, preferably from 110 to 140 nm, at 550 nm.

In the specification, a retardation (Re) of an anisotropic layer means an in-pale retardation when light incident along the normal line direction of the layer. Specifically, a retardation is the value defined by the following formula:

$$Re=(nx-ny)\times d$$

In the formula, nx and ny denote the in-plane major refractive indexes of the optically anisotropic layer, and d (nm) denotes the thickness of the layer.

In the broadband quarter wave plates, the intersection angle of the slow axes in the optically anisotropic layer generating a π phase difference and the optically anisotropic layer generating a π/2 phase difference is important. The intersection angle is desirably from 60±10 degrees, preferably 60±5 degrees. When circular polarizer comprising the broadband quarter wave plate and a linear polarizer film is prepared, it is desired that the linear polarizer film, the optically anisotropic layer generating a π phase difference and the optically anisotropic layer generating a π/2 phase difference are laminated in this order, and more desired that they are laminated in the order and the angle between the transmission axis of the linear polarizer film and the slow axis of the optically anisotropic layer generating a π phase difference is 15±5 degrees, preferably 15±3 degrees. Usually, commercially available long-length linear polarizer films have an absorption axis parallel to the longitudinal direction thereof and have a transmission axis along with the orthogonal direction to the longitudinal direction. When the long-length linear polarizer film is used for preparation of the circular polarizer, the optically anisotropic layer generating a π phase difference is desirably laminated on the linear polarizer film such that the angle between the slow axis of the layer and the longitudinal axis of the linear polarizer film is about 75 degrees. Linear polarizer films having an absorption axis in a direction inclined at 45 degrees relative to the longitudinal direction are described in JPA No. 2002-86554. When the linear polarizer film is used, the optically anisotropic layer generating a n phase difference is desirably laminated on the linear polarizer film such that the angle between the slow axis of the layer and the longitudinal axis of the linear polarizer film is about 15 or 75 degrees.

[Optically Anisotropic Layer]

Liquid-crystalline compounds employed in the present invention are desirably liquid-crystalline compounds of rod-like molecules or discotic molecules. In the optically anisotropic layer, the liquid-crystalline molecules are desirably aligned in a substantially uniform manner, more desirably fixed in a substantially uniform aligned manner, and much more desirably fixed by polymerization reaction.

As a rod-like liquid-crystalline compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles are desirably employed in the present invention. Not only low-molecular-weight liquid-crystalline compounds as mentioned above but also high-molecular-weight liquid-crystalline compounds can be used.

The rod-like liquid-crystalline molecules may be fixed in an alignment state by polymerization. The examples of the polymerizable rod-like liquid-crystalline compound include those described in "Makromol. Chem., Vol. 190, p. 2255 (1989)"; "Advanced Materials Vol. 5, p. 107 (1993)"; U.S. Pat. Nos. 4,683,327, 5,622,648 and 5,770,107; International Publications WO95/22,586, WO95/24,455, WO97/00,600, WO98/23,580 and WO98/52905; JPA No.1989-272551, JPA No. 1994-16616, JPA No. 1995-110469 and JPA No. 1999-80081; and Japanese Patent Application No. 2001-64627.

The rod-like liquid-crystalline compounds represented by Formula (I) are preferred.

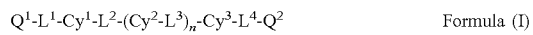

$$Q^1\text{-}L^1\text{-}Cy^1\text{-}L^2\text{-}(Cy^2\text{-}L^3)_n\text{-}Cy^3\text{-}L^4\text{-}Q^2 \qquad \text{Formula (I)}$$

In the Formula (I), $Q^1$ and $Q^2$ respectively denote a polymerizable group; $L^1$ and $L^4$ respectively denote a divalent linking group, $L^2$ and $L^3$ respectively denote a single bond or divalent linking group; $Cy^1$, $Cy^2$ and $Cy^3$ respectively denote a divalent cyclic group; and n is 0, 1 or 2.

The polymerizable rod-like liquid-crystalline compounds will be described in detail.

In the Formula (I), $Q^1$ and $Q^2$ respectively denote a polymerizable group. The polymerizable groups may be addition polymerizable (ring opening polymerizable) or condensation polymerizable. Preferably, $Q^1$ and $Q^2$ respectively denote a group capable of addition polymerization or condensation polymerization. The examples of the polymerizable groups are shown bellow.

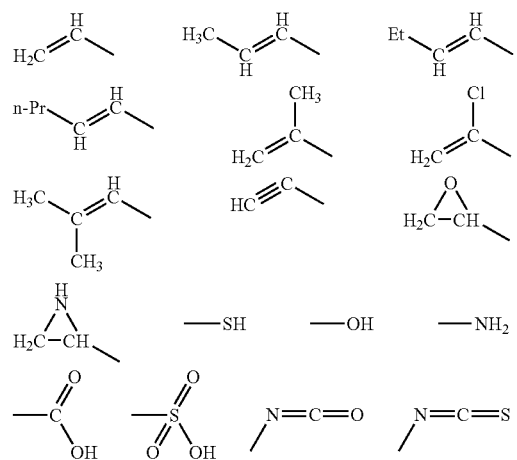

In the Formula (I), $L^1$ and $L^4$ respectively denote a divalent group. Preferably, $L^1$ and $L^4$ respectively denote a divalent linking group selected from the group consisting of —O—, —S—, —CO—, —NR$^2$—, a divalent chain group, divalent cyclic group and any combinations thereof. R$^2$ is a C1–7 alkyl group or hydrogen atom, desirably a C1–4 alkyl group or hydrogen atom and preferably methyl, ethyl or hydrogen atom and more preferably hydrogen atom. The examples of the combination linking groups are shown bellow. In the following examples, the left end of an exemplified group is bonded to Q$^1$ or Q$^2$ and the right end is bonded to Cy$^1$ or Cy$^3$.

L-1: —CO—O-{a divalent chain group}-O—
L-2: —CO—O-{a divalent chain group}-O—CO—
L-3: —CO—O-{a divalent chain group}-O—CO—O—
L-4: —CO—O-{a divalent chain group}-O-{a divalent cyclic group}-
L-5: —CO—O-{a divalent chain group}-O-{a divalent cyclic group}-CO—O—
L-6: —CO—O-{a divalent chain group}-O-{a divalent cyclic group}-O—CO—
L-7: —CO—O-{a divalent chain group}-O-{a divalent cyclic group}-{a divalent chain group}-
L-8: —CO—O-{a divalent chain group}-O-{a divalent cyclic group}-{a divalent chain group}-CO—O—
L-9: —CO—O-{a divalent chain group}-O-{a divalent cyclic group}-{a divalent chain group}-O—CO—
L-10: —CO—O-{a divalent chain group}-O—CO-{a divalent cyclic group}-
L-11: —CO—O-{a divalent chain group}-O—CO-{a divalent cyclic group}-CO—O—
L-12: —CO—O-{a divalent chain group}-O—CO-{a divalent cyclic group}-O—CO—
L-13: —CO—O-{a divalent chain group}-O—CO-{a divalent cyclic group}-a divalent chain group}-
L-14: —CO—O-{a divalent chain group}-O—CO-{a divalent cyclic group}-{a divalent chain group}-CO—O—
L-15: —CO—O-{a divalent chain group}-O—CO-{a divalent cyclic group}-{a divalent chain group}-O—CO—
L-16: —CO—O-{a divalent chain group}-O—CO—O-{a divalent cyclic group}-
L-17: —CO—O-{a divalent chain group}-O—CO—O-{a divalent cyclic group}—CO—O—
L-18: —CO—O-{a divalent chain group}-O—CO—O-{a divalent cyclic group}-O—CO—
L-19: —CO—O-{a divalent chain group}-O—CO—O-{a divalent cyclic group}-{a divalent chain group}-
L-20: —CO—O-{a divalent chain group}-O—CO—O-{a divalent cyclic group}-{a divalent chain group}—CO—O—
L-21: —CO—O-{a divalent chain group}-O—CO—O-{a divalent cyclic group}-{a divalent chain group}-O—CO—

The term of "divalent chain group" is the general term for substituted or non-substituted alkylene group, substituted or non-substituted alkenylene group and substituted or non-substituted alkynylene group. The divalent chain group is desirably substituted or non-substituted alkylene group or substituted or non-substituted alkenylene group, and preferably non-substituted alkylene group or non-substituted alkenylene group.

The non-substituted alkylene group may have a straight chain or branched chain structure. The number of the carbon atoms included in the non-substituted alkylene group is desirably 1 to 12, preferably 2 to 10 and more preferably 2 to 8.

The alkylene chain portion of the substituted alkylene group is identically defined with the non-substituted alkylene group above and their preferred scopes are also identical. The examples of the substituent group for the alkylene group include halogen atoms.

The non-substituted alkenylene group may have a straight chain or branched chain structure. The number of the carbon atoms included in the non-substituted alkenylene group is desirably 2 to 12, preferably 2 to 10 and more preferably 2 to 8.

The alkenylene chain portion of the substituted alkenylene group is identically defined with the non-substituted alkenylene group above and their preferred scopes are also identical. The examples of the substituent group for the alkenylene group include halogen atoms.

The non-substituted alkynylene group may a have straight chain or branched chain structure. The number of the carbon atoms included in the non-substituted alkynylene group is desirably 2 to 12, preferably 2 to 10 and more preferably 2 to 8.

The alkynylene chain portion of the substituted alkynylene group is identically defined with the non-substituted alkynylene group above and their preferred scopes are also identical. The examples of the substituent group for the alkynylene group include halogen atoms.

The specific examples of the divalent chain group include ethylene, trimethylene, propylene, butamethylene, 1-methyl-butamethylene, pentamethylene, hexamethylene, octamethylene, 2-buthenylene and 2-butynylene.

The divalent cyclic group is identically defined with Cy$^1$, Cy$^2$ and Cy$^3$ to be hereinafter described and their preferred examples are identical.

L$^2$ and L$^3$ respectively denote a single bond or divalent linking group. L$^2$ and L$^3$ respectively denote a single bond or divalent linking group selected from the group consisting of —O—, —S—, —CO—, —NR$^2$—, a divalent chain group, divalent cyclic group and any combinations thereof. R$^2$ is hydrogen or C1–7 alkyl group, desirably hydrogen or C1–4 alkyl group, preferably hydrogen, methyl or ethyl, and more preferably hydrogen. The divalent chain group and divalent cyclic group are identically defined with them denoted respectively by L$^1$ and L$^4$.

In the Formula (I), n is 0, 1 or 2. When n is 2, two of L$^3$ may be identical or different and two of Cy$^2$ may also be identical or different. n is desirably 1 or 2, and preferably 1.

In the Formula (I), Cy$^1$, Cy$^2$ and Cy$^3$ are respectively divalent cyclic groups.

The divalent cyclic group includes at least a ring, desirably a five-membered, six-membered or seven-membered ring, preferably a five-membered or six-membered ring and more preferably a six-membered ring. The divalent cyclic group may include a condensed ring, however, non-condensed rings are preferred to condensed rings. The divalent cyclic group may include an aromatic, aliphatic or hetero ring. The examples of the aromatic ring include benzene and naphthalene ring. The examples of the aliphatic ring include cyclohexane ring. The examples of the hetero ring include pyridine and pyrimidine ring.

Among the divalent cyclic groups including a benzene ring, 1,4-phenylene is desirable. Among the divalent cyclic groups including a naphthalene ring, naphthalene-1,5-diyl and naphthalene-2,6-diyl are desirable. Among the divalent cyclic groups including a cyclohexane ring, 1,4-cyclohexylene is desirable. Among the divalent cyclic groups including a pyridine ring, pyridine-2,5-diyl is desirable. Among the divalent cyclic groups including a pyrimidine ring, pyrimidine-2,5-diyl is desirable.

The divalent cyclic group may be substituted or non-substituted. The examples of the substituent for the divalent cyclic group include halogen atoms, cyano, nitro, C1–5 alkyl group, C1–5 alkyl halide group, C1–5 alkoxy group, C1–5 alkylthio group, C2–6 acyloxy group, C2–6 alkoxycarbonyl group, carbamoyl, C2–6 alkylcarbamoyl group and C2–6 acylamino group.

The specific examples of the polymerizable liquid-crystalline compounds are shown bellow, however, liquid-crystalline compounds that can be employed in the present invention are not limited to these compounds.

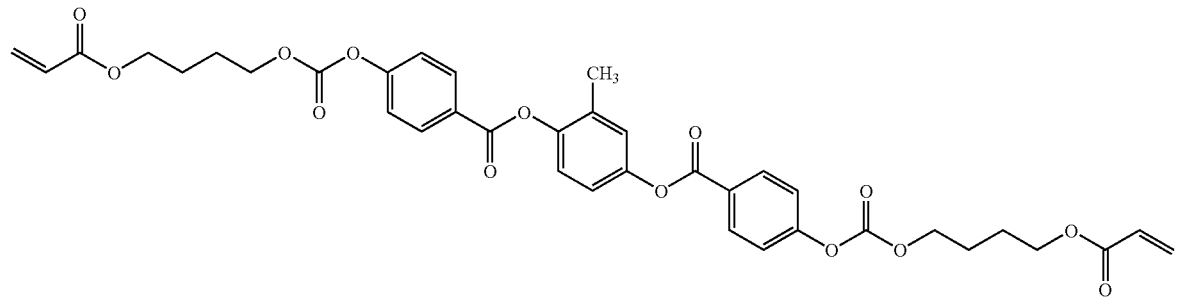

I-1)

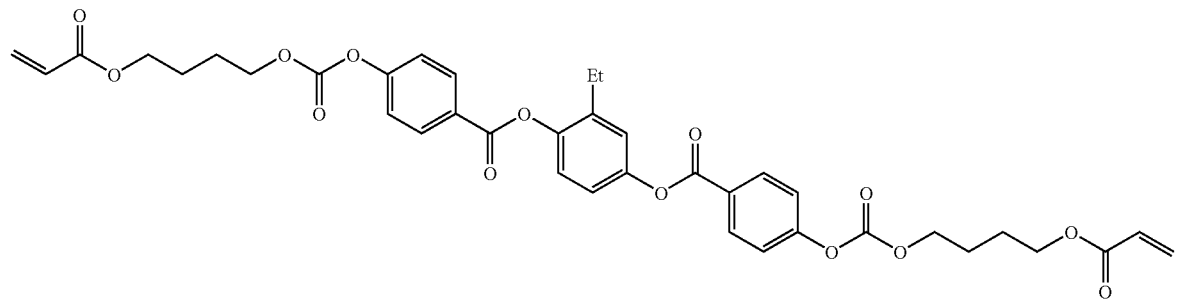

I-2)

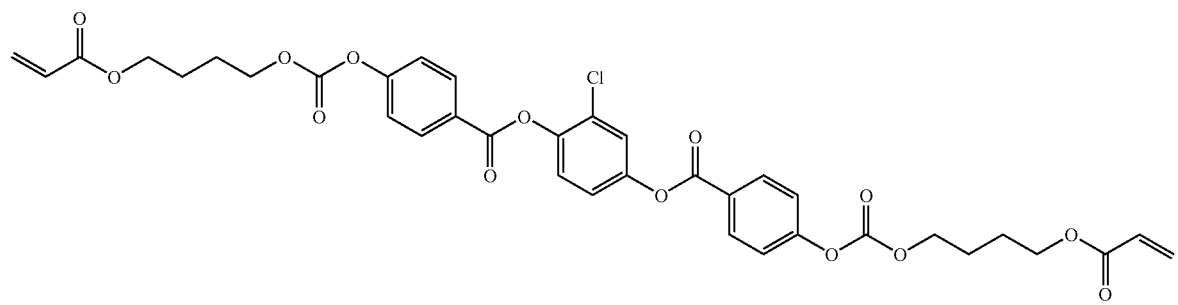

I-3)

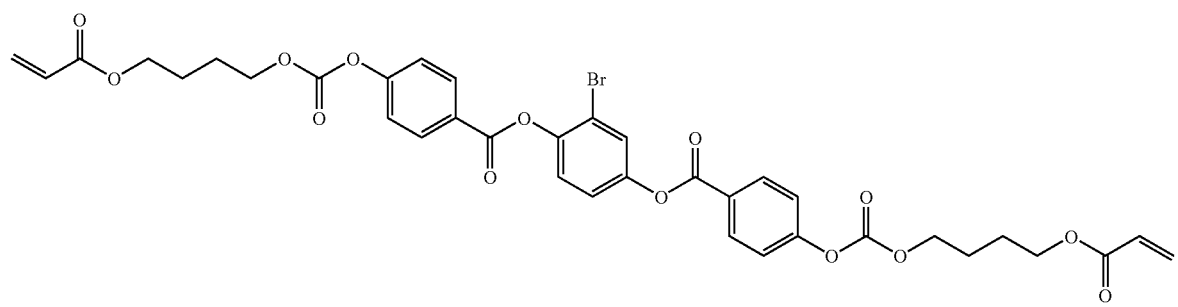

I-4)

-continued
I-5)
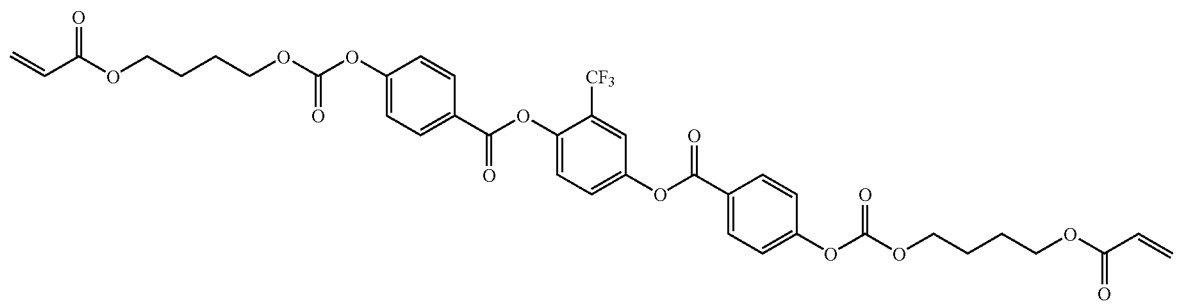
I-6)
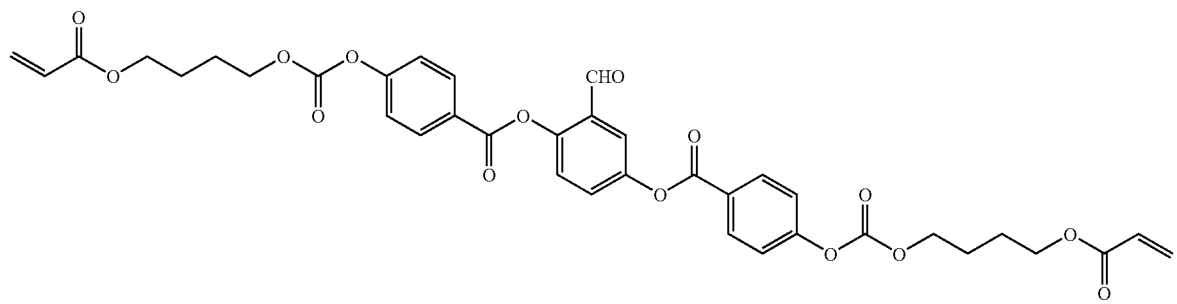
I-7)
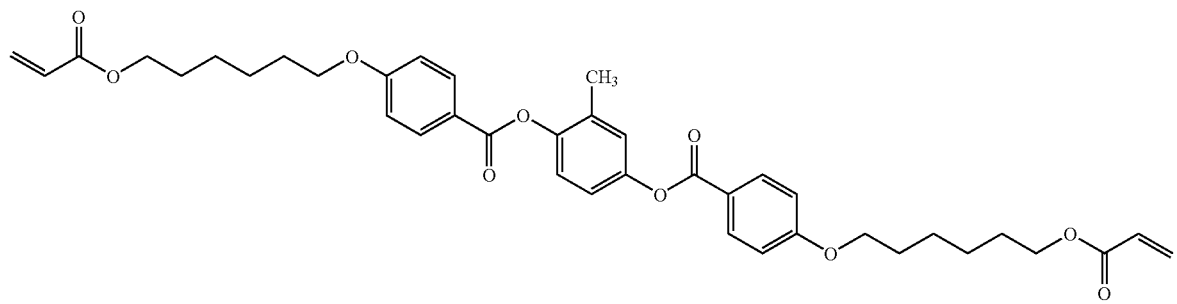
I-8)
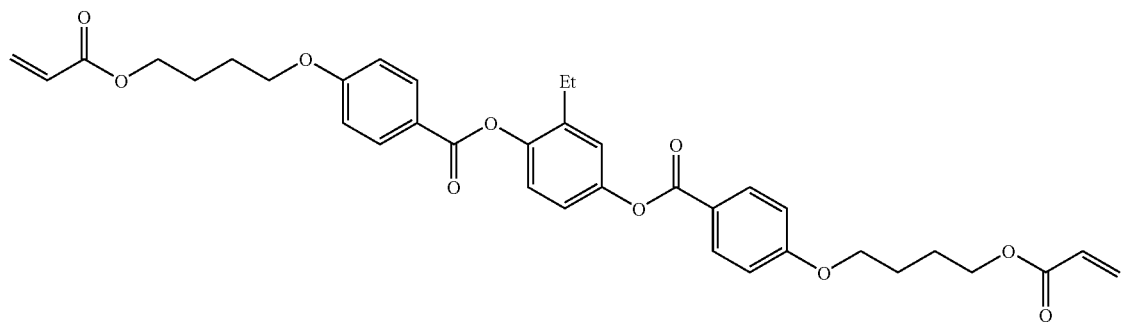

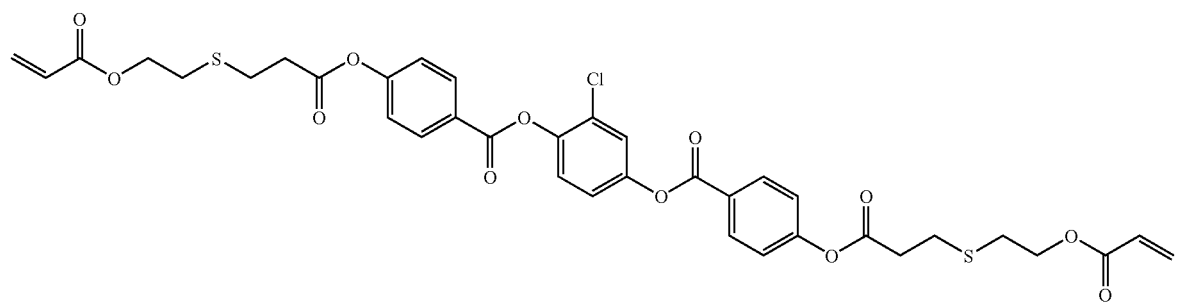
I-9)
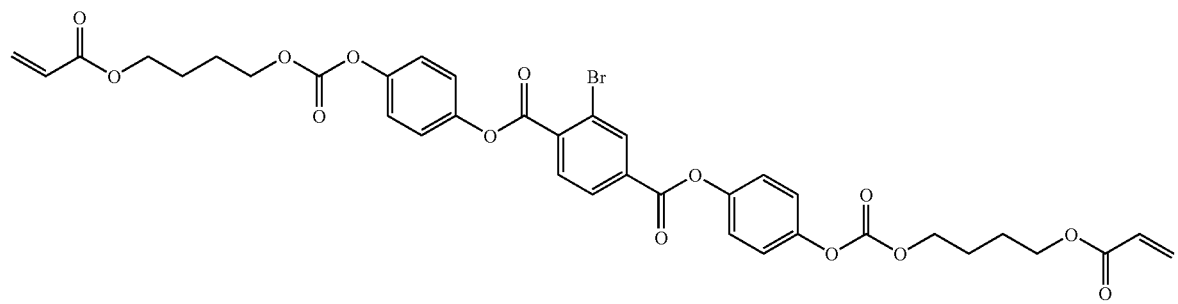
I-10)
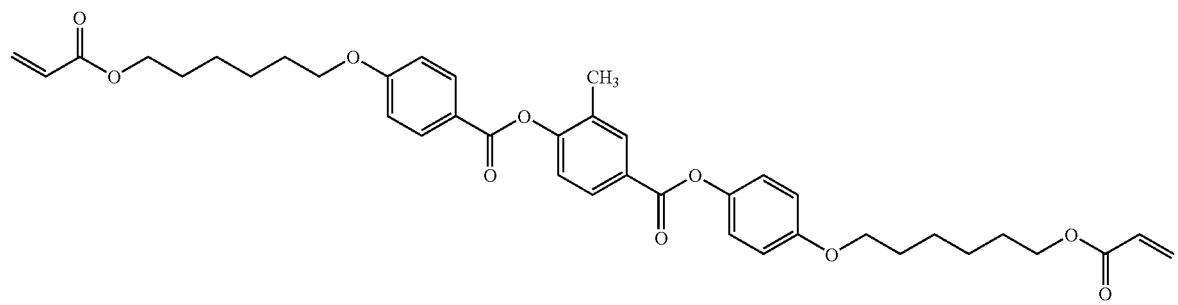
I-11)
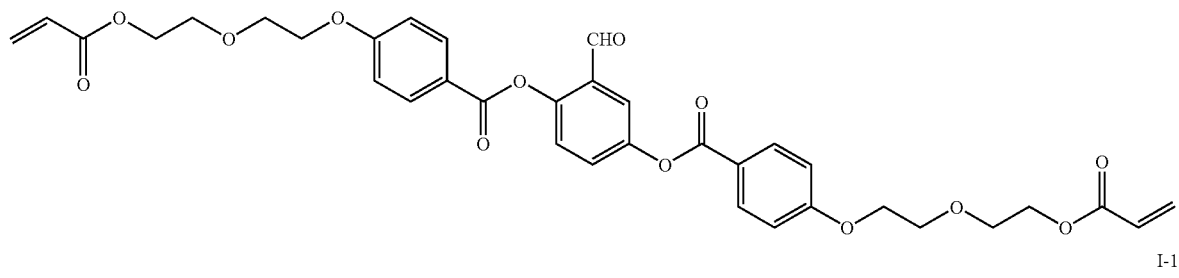
I-12)
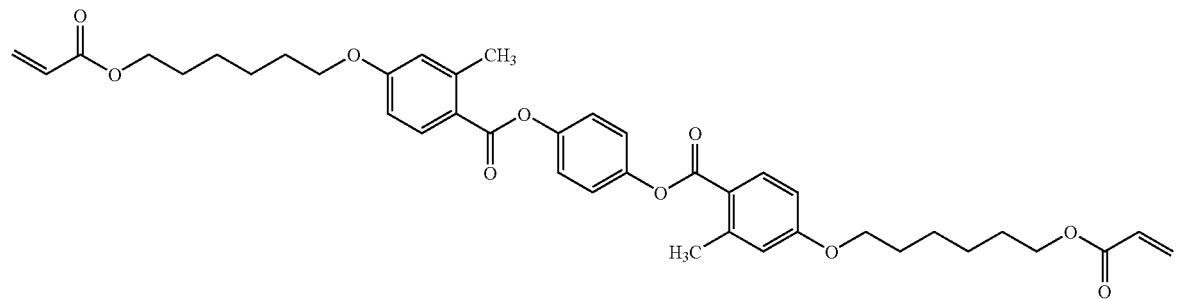
I-13)

-continued
I-14)
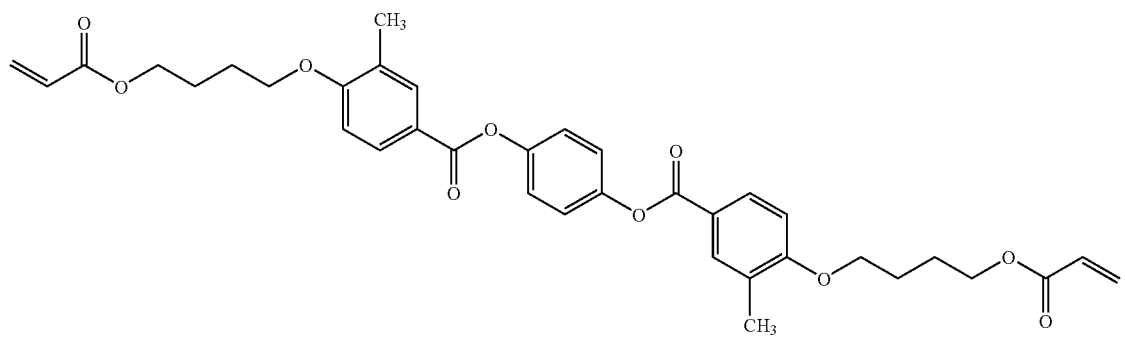
I-15)
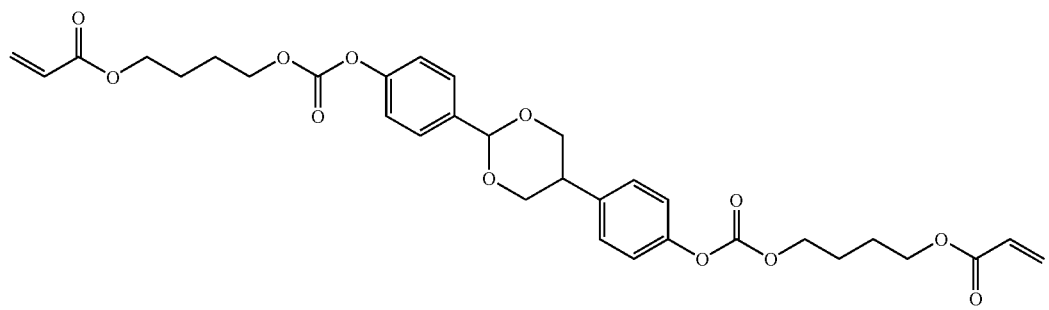
I-16)
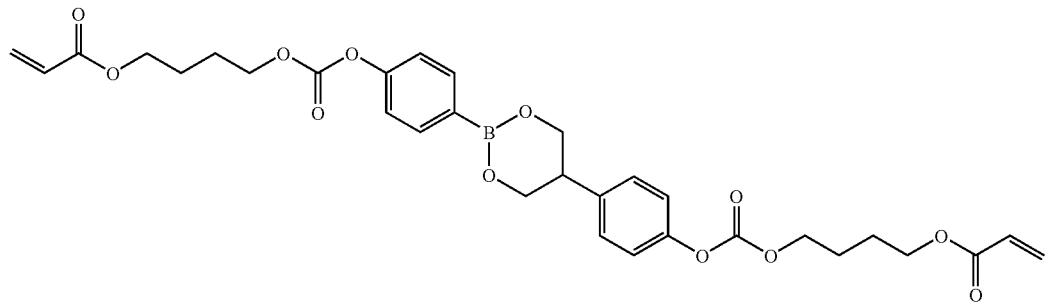
I-17)
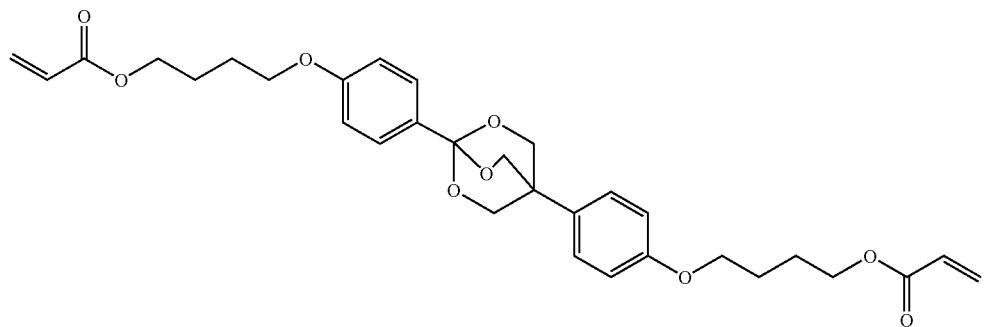
I-18)
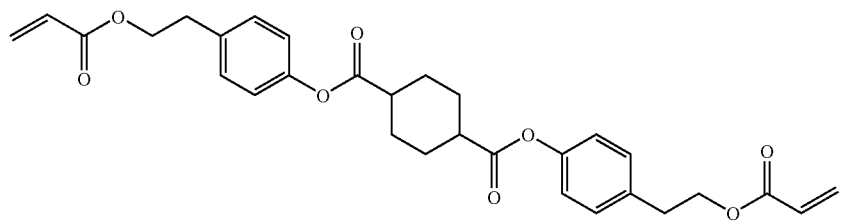

-continued
I-19)
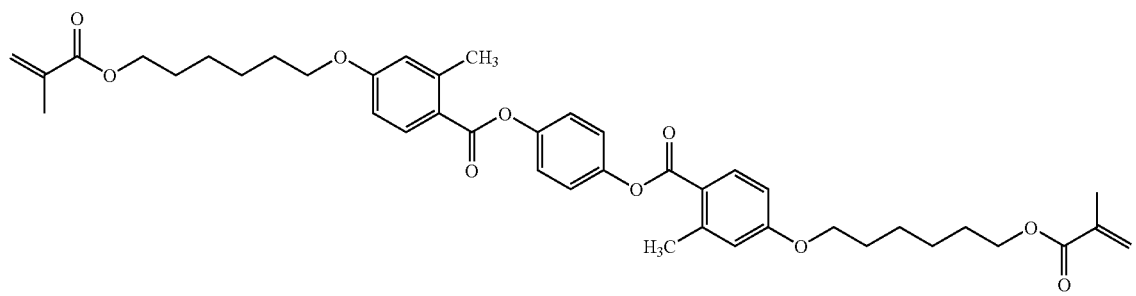
I-20)
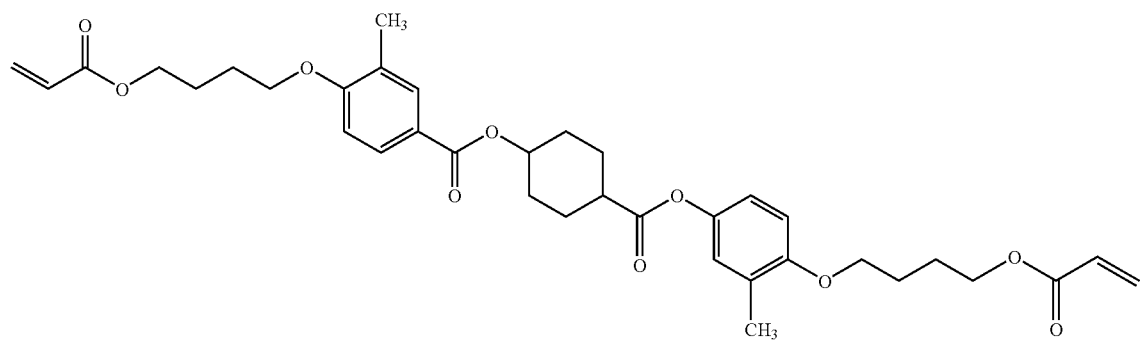
I-21)
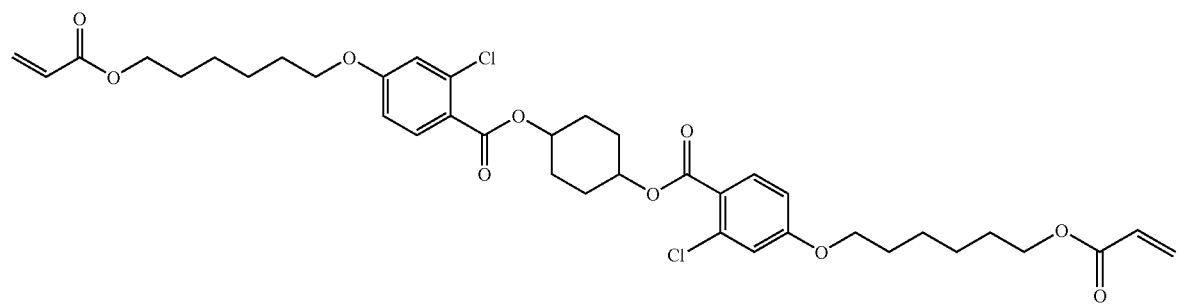
I-22)
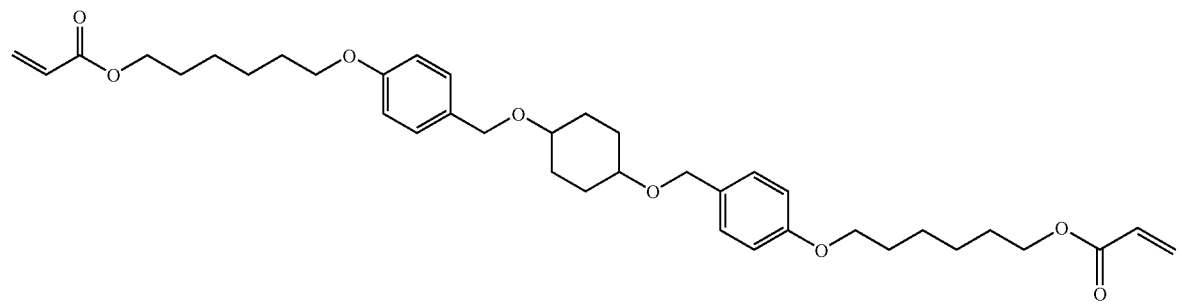

-continued

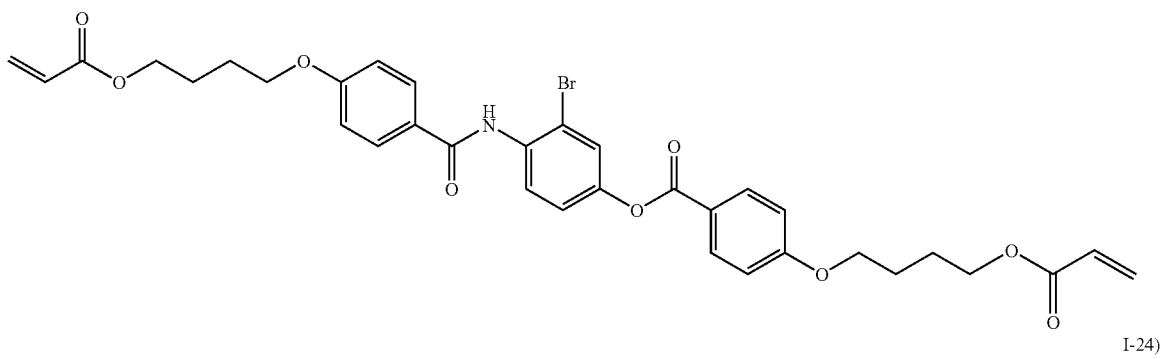

I-23)

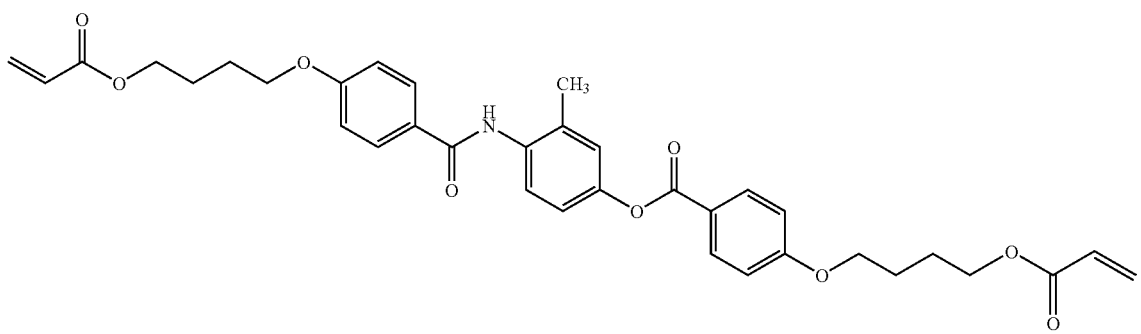

I-24)

Next, discotic liquid-crystalline compounds which can be employed desirably in the present invention are described in detail. According to the present invention, discotic liquid-crystalline molecules in the layer are desirably aligned homeotropically relative to a layer plane, in particular with a mean tilt angle of 50 to 90 degree. Discotic liquid-crystalline molecules have been variously described in the literatures (Mol. Crysr. Liq. Cryst., vol. 71, page 111 (1981), C. Destrade et al.; Quarterly Chemistry Survey, No. 22, The Chemistry of Liquid-crystals, Chapter 5, Chapter 10, Section 2 (1994), ed. by Japan Chem. Soc.; Angew. Chem. Soc. Chem. Comm., page 1794 (1985), B. Kohne et al.; J. Am. Chem. Soc., vol. 116, page 2,655 (1994), J. Zhang et al.). The polymerization of discotic liquid-crystalline molecules is described in JPA No. 1996-27284. It is necessary to bond a polymerizable group as a substituent to the disk-shaped core of a discotic liquid-crystalline molecule to better fix the discotic liquid-crystalline molecules by polymerization. However, when a polymerizable group is directly bonded to the disk-shaped core, it tends to be difficult to maintain alignment during the polymerization reaction. Accordingly, the discotic liquid-crystalline molecule desirably comprises a linking group between the disk-shaped core and the polymerizable group. That is, the discotic liquid-crystalline molecule is desirably the compound denoted by Formula (II) below.

D(-L-P)$_n$        Formula (II)

In the Formula (II), D denotes the disk-shaped core, L denotes a divalent linking group, P denotes a polymerizable group, and n denotes an integer of from 4 to 12. Examples of disk-shaped core (D) in the above formula are given below. In the various examples below, LP (or PL) denotes the combination of a divalent linking group (L) with a polymerizable group (P).

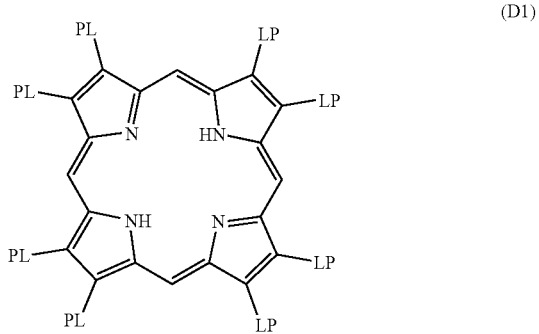

(D1)

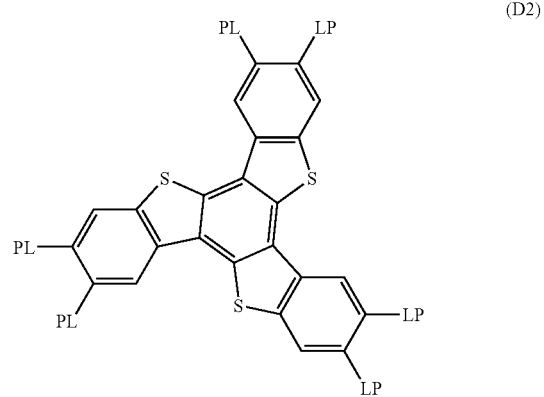

(D2)

-continued
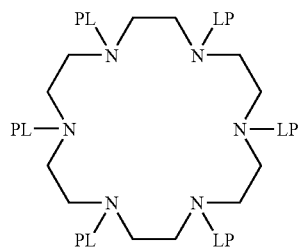
(D3)
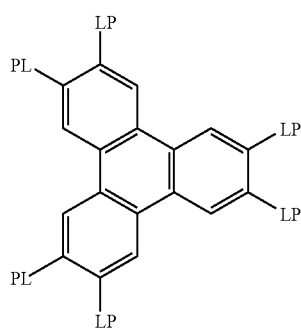
(D4)
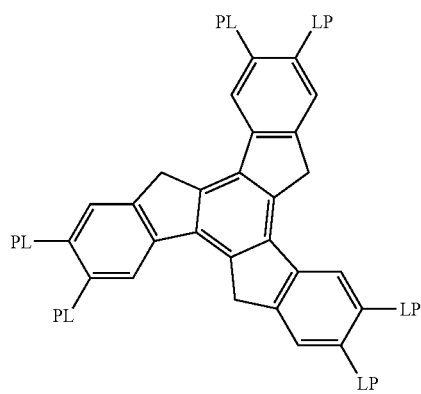
(D5)
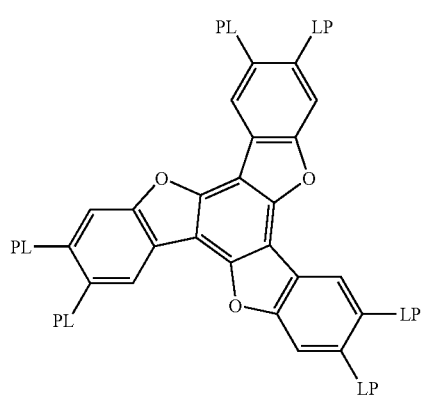
(D6)
-continued
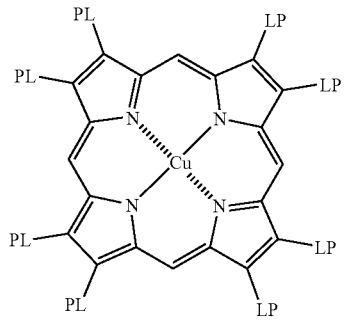
(D7)
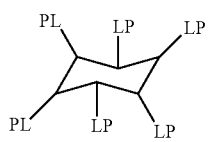
(D8)
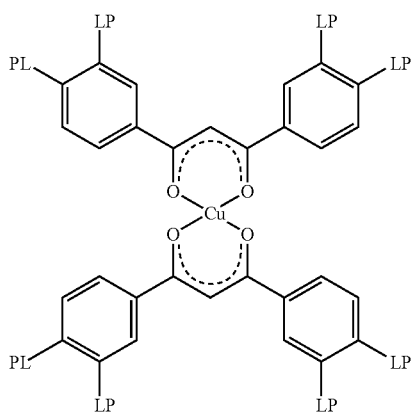
(D9)
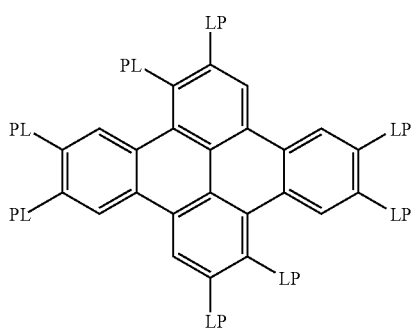
(D10)

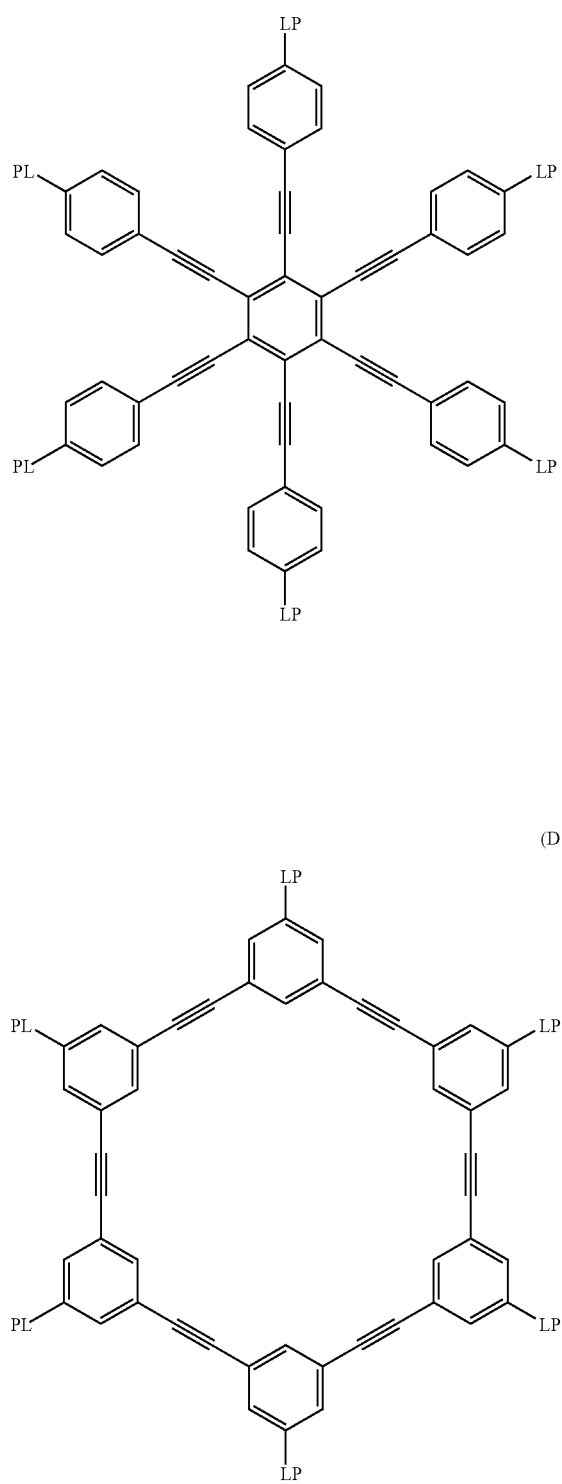
(D11)
(D12)
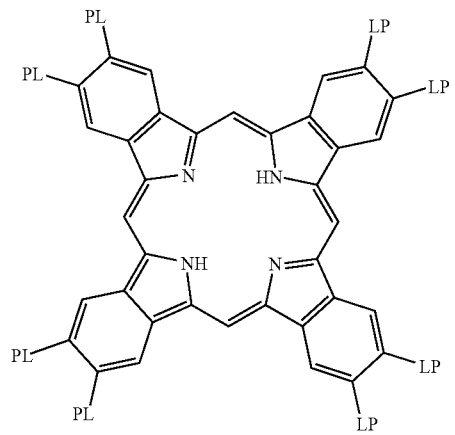
(D13)
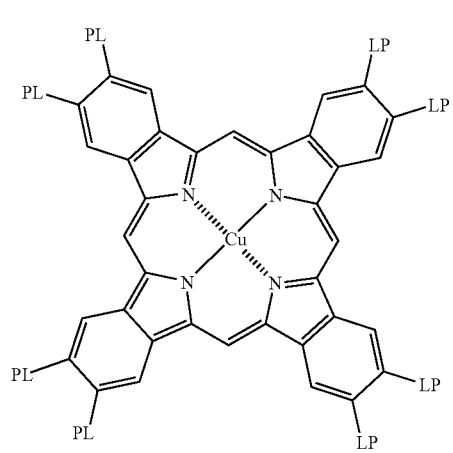
(D14)
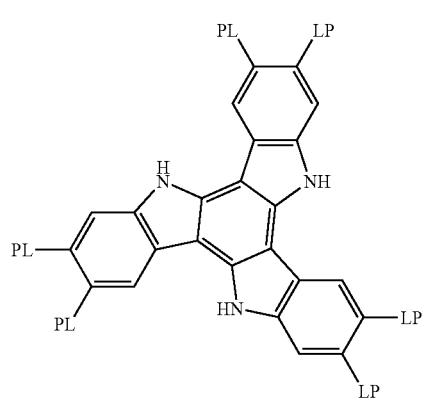
(D15)

In the above Formula (II), divalent linking group (L) is desirably a divalent linking group selected from the group consisting of an alkylene group, alkenylene group, arylene group, —CO—, —NH—, —O—, —S— and any combinations thereof. Divalent linking group (L) is preferably a group combining at least two divalent groups selected from the group consisting of an alkylene group, alkenylene group, arylene group, —CO—, —NH—, —O—, and —S—. Most preferably, divalent linking group (L) is a group combining at least two divalent groups selected from the group consisting of an alkylene group, alkenylene group, arylene group, —CO— and —O—. The alkylene group desirably comprises from 1 to 12 carbon atoms. The alkenylene group desirably comprises form 2 to 12 carbon atoms. The arylene group desirably comprises from 6 to 10 carbon atoms. The alkylene group, alkenylene group and arylene group may have at least one substituent such as an alkyl group, halogen atom, cyano, alkoxy group or acyloxy group.

The examples of the divalent linking group (L) are shown bellow. Each of them is bonded on the left to disk-shaped core (D) and on the right to polymerizable group (P). "AL" denotes an alkylene group or alkenylene group, and "AR" denotes an arylene group.

L1: -AL-CO—O-AL-
L2: -AL-CO—O-AL-O—
L3: -AL-CO—O-AL-O-AL-
L4: -AL-CO—O-AL-O—CO—
L5: —CO-AR-O-AL-
L6: —CO-AR-O-AL-O—
L7: —CO-AR-O-AL-O—CO—
L8: —CO—NH-AL-
L9: —NH-AL-C—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AL-AR-O-AL-O—CO—
L17: —O—CO-AR-O-AL-CO—
L18: —O—CO-AR-O-AL-O—CO—
L19: —O—CO-AR-O-AL-O-AL-O—CO—
L20: —O—CO-AR-O-AL-O-AL-O-AL-O—CO—
L21: —S-AL-
L22: —S-AL-O—
L23: —S-AL-O—CO—
L24: —S-AL-S-AL-
L25: —S-AR-AL-

In the Formula (II), the polymerizable group (P) may be selected depending on the manner of polymerization. The examples of the polymerizable group are shown bellow.

—CH=CH$_2$ (P1)

—C≡CH (P2)

—CH$_2$—C≡CH (P3)

—NH$_2$ (P4)

—SO$_3$H (P5)

—CH$_2$—CH$\overset{O}{\overset{\diagup\diagdown}{-}}$CH$_2$ (P6)

-continued

—C(CH$_3$)=CH$_2$ (P7)

—CH=CH—CH$_3$ (P8)

—N=C=S (P9)

—SH (P10)

—CHO (P11)

—OH (P12)

—CO$_2$H (P13)

—N=C=O (P14)

—CH=CH—C$_2$H$_5$ (P15)

—CH=CH—n-C$_3$H$_7$ (P16)

—CH=C(CH$_3$)—CH$_3$ (P17)

—CH$\overset{O}{\overset{\diagup\diagdown}{-}}$CH$_2$ (P18)

Polymerizable group (P) is desirably an unsaturated polymerizable group (P1, P2, P3, P7, P8, P15, P16 or P17) or an epoxy group (P6 or P18), preferably an unsaturated polymerizable group, and more preferably, an ethylenic unsaturated polymerizable group (P1, P7, P8, P15, P16 or P17).

In the Formula (II), n is an integer from 4 to 12. n is determined depending on the species of the discotic core (D). The plural combinations of L and P may be different or identical each other, however, are desirably identical each other.

Two or more species of discotic liquid-crystalline compounds may be used in combination. For example, a compound having an asymmetric carbon atom in the divalent linking group and a compound having no asymmetric carbon atom in the divalent linking group may be used in combination.

The retarder of the present invention comprises a transparent substrate and on or above the substrate, at least two adjacent layers which are respectively formed of aligned liquid-crystalline molecules wherein no alignment layer is disposed between the two layers. The two layers comprising liquid-crystalline compounds are distinguished an upper layer from a lower layer by their location. The lower layer is disposed nearer a substrate than the upper layer. According to the present invention, there is substantively no alignment layer between the lower and upper layer. That is, there is no alignment layer for preparing the upper layer. In the present invention, an alignment layer may be used for preparing the lower layer. That is, there may be an alignment layer between the substrate and the lower layer.

The lower layer is desirably prepared by applying a composition (coating solution) comprising a rod-like or discotic liquid-crystalline compound, and if necessary additives such as a polymerization initiator or a cross-linkable polymer described later, to a substrate. Any organic solvents may be used for preparing the coating solution. The examples of the organic solvents include amides (e.g., N,N-dimethyl formamide), sulfoxides (e.g., dimethyl sulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents may be used in combination. The coating solution can be applied by known techniques (e.g., extrusion coating, direct gravure coating, reverse gravure coating, die coating).

The liquid-crystalline molecules in the layers are fixed in an alignment, preferably fixed by the polymerization reaction of the polymerizable groups (P) or (Q) included in the liquid-crystalline molecules. The polymerization reaction may be carried out in a manner of a thermal polymerization reaction with a thermal polymerization initiator or in a manner of a photo-polymerization reaction with a photo-polymerization initiator. Photo-polymerization reaction is preferred. The examples of photo-polymerization initiators include alpha-carbonyl compounds (described in U.S. Pat. Nos. 2,367,661 and 2,367,670), acyloin ethers (described in U.S. Pat. No. 2,448,828), alpha-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (described in JPA No. 1985-105667 and U.S. Pat. No. 4,239,850) and oxadiazole compounds (described in U.S. Pat. No. 4,212,970).

The amount of the photo-polymerization initiators to be used is preferably 0.01 to 20% by weight, more preferably 0.5 to 5% by weight on the basis of solids in the coating solution. Irradiation for polymerizing the liquid-crystalline molecules preferably uses UV rays. The irradiation energy is preferably 20 mJ/cm$^2$ to 50 J/cm$^2$, and more preferably 100 to 800 mJ/cm$^2$. Irradiation may be performed under heating to accelerate the photo-polymerization reaction.

The thicknesses of the lower and upper optically anisotropic layers are preferably 0.1 to 10 micro meters, more preferably 0.5 to 5 micro meters.

[Alignment Layer]

For aligning liquid-crystalline molecules to prepare the lower layer, an alignment layer may be used. There have been provided alignment layers formed of various materials by various methods such as subjecting a film made of an organic compound (preferably a polymer) to a rubbing treatment, obliquely depositing an inorganic compound, forming a layer having microgrooves, or accumulating an organic compound (e.g., ω-trichosanic acid, dioctadecylmethylammonium chloride, methyl stearate) by Langmuir-Blodgett method (LB film). Alignment layers having an alignment effect under an electric or magnetic field or irradiation are also known. According to the present invention, the alignment layer prepared by subjecting a film of a polymer to a rubbing treatment is desirable as an alignment layer for the lower layer. The rubbing treatment is performed by rubbing the surface of the polymer layer in a direction several times with paper or a cloth.

Materials for preparing the alignment layer are not specifically limited and may be selected depending on desired liquid-crystal alignment (especially a mean tilt angle).

In order to align the liquid-crystalline molecules homogeneously, a polymer for preparing an alignment layer is desirably selected so as not to lower the surface energy of the alignment layer. That is, polymers usually used in preparation of alignment layers are desirably used. Specific examples of the polymers are described in various literatures relating to liquid-crystal cells or optical compensation sheets. For improving adhesion between the liquid-crystalline compound and the transparent substrate, the alignment layer is desirably formed of a polymer having a polymerizable group. The polymerizable group may be introduced to the polymer as a portion in a side chain of a repeating unit constituting the polymer or as a cyclic substituent group of the polymer. The polymers capable of forming chemical bonds with liquid-crystalline molecules at the interface between the alignment layer and the lower layer are desirably used, and alignment layers formed of such polymers are described in JPA No. 1997-152509.

The thickness of the alignment layer is preferably 0.01 to 5 micro meters, and more preferably 0.05 to 1 micro meters.

The alignment layer may be formed on a temporary substrate and an optically anisotropic layer may be formed by aligning the liquid-crystalline compound on the alignment layer and then transferred onto a transparent substrate such as a plastic film. The liquid-crystalline compound fixed in an alignment can remain the alignment without any alignment layer.

In the case that the lower layer is formed of a composition comprising a rod-like liquid-crystalline compound, and the optic axes of the rod-like molecules in the lower layer are oriented at an angle not smaller than 45 degrees relative to the longitudinal direction of the substrate, an alignment layer capable of aligning the rod-like liquid-crystalline molecules in a direction such that their optic axes are aligned in an orthogonal direction to the rubbing direction (hereinafter such an alignment layer is referred to as "an orthogonal alignment layer") is desirably used. In the case that the lower layer is formed of rod-like liquid-crystalline molecules and the optic axes of the molecules are aligned at an angle smaller than 45 degrees relative to the longitudinal direction of the transparent substrate, an alignment layer which is usually used for preparation of a liquid-crystal cell and the like is preferred.

[Orthogonal Alignment Layer]

Next, orthogonal alignment layers are described in detail.

Various orthogonal alignment layers are described in JPA No. 2002-062427, Japanese Patent Application No. 2000-174829 and JPA No. 2002-268068. In particular, an orthogonal alignment layer formed of a polymer having either a repeating unit of Formula (PAIII) or Formula (PAIV) and a repeating unit of Formula (PAV) is desirably used.

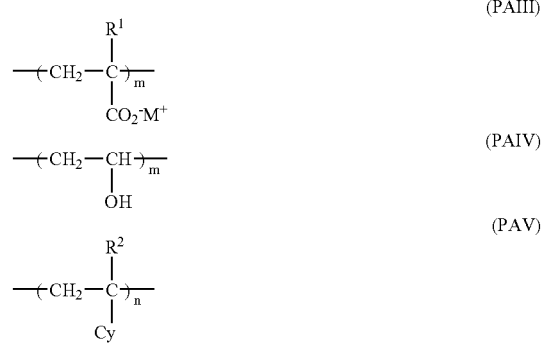

In the formulae, R$^1$ is hydrogen or methyl, R$^2$ is hydrogen, halogen or C1–6 alkyl group; M is proton, alkali metal ion or ammonium ion; Cy is an aliphatic cyclic group, aryl group or heterocyclic group; m ranges from 10 to 95 mol %, and n ranges from 90 to 5 mol %.

The formulae (PAIII) and (PAV) are described bellow in detail.

In the Formula (PAIII), $R^1$ is hydrogen (when the polymer is an acrylic copolymer) or methyl (when the polymer is a methacrylic copolymer).

In the Formula (PAIII), M is proton, alkali metal ion (e.g., $Li^+$, $Na^+$, $K^+$) or ammonium ion. The ammonium ion may be substituted with organic group such as methyl or ethyl.

In the Formula (PAV), $R^2$ is a hydrogen atom, halogen atom or C1–6 alkyl group. $R^2$ is desirably a hydrogen atom or C1–6 alkyl group; preferably a hydrogen atom, methyl or ethyl; and more preferably a hydrogen atom or methyl.

In the Formula (PAV), Cy is an aliphatic cyclic group, aryl group or heterocyclic group.

The aliphatic ring included in the aliphatic cyclic group is desirably five-, six- or seven-membered, preferably five- or six-membered, and more preferably six-membered. The examples of the aliphatic ring include a cyclohexane ring, cyclohexene ring and bicyclo[2.2.1]hepta-2-en ring. The aliphatic rings may be condensed with other aliphatic rings, aryl rings or hetero rings.

The examples of the aryl ring included in the aryl group include benzene ring, naphthalene ring, anthracene ring, phenanthrene ring, pyrane ring and tetracene (naphthacene) ring. The aryl rings may be condensed with aliphatic rings or hetero rings.

The hetero ring included in the heterocyclic group is desirably five-, six- or seven-membered, preferably five- or six-membered, and more preferably six-membered. Aromatic hetero rings are desirable. Aromatic hetero rings are usually unsaturated and desirably have maximum double bondings. The examples of the hetero rings include a furan ring, thiophene ring, pyrrole ring, oxazole ring, isoxazole ring, isothiazole ring, imidazole ring, pyrazole ring, furazan ring, pyrane ring, pyridine ring, pyridazine ring, pyrimidine ring and pyrazine ring. The hetero rings may be condensed with other hetero rings, aliphatic rings or aryl rings.

The aliphatic cyclic group, aryl group and the heterocyclic group may have at least one substituent. The examples of the substituent include alkyl group (e.g., methyl, ethyl, t-butyl), substituted alkyl group (e.g., chloromethyl, hydroxymethyl, trimethylammonium chloride), alkoxy group (e.g., methoxy), halogen atom (e.g., F, Cl, Br), carboxy, acyl group (e.g., formyl), amino, sulfo, aryl group (e.g., phenyl), aryloxy group (e.g., phenoxy) and oxo.

In the Formula (PAV), n ranges from 5 to 90 mol %.

The examples of repeating units represented by the Formula (PAV) are shown bellow.

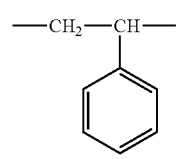
(PAV-1)

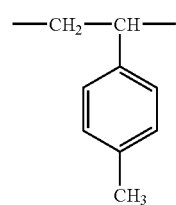
(PAV-2)

-continued

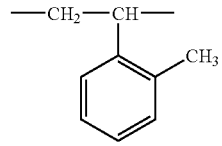
(PAV-3)

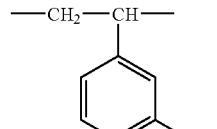
(PAV-4)

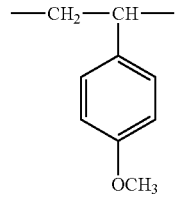
(PAV-5)

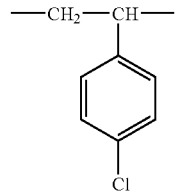
(PAV-6)

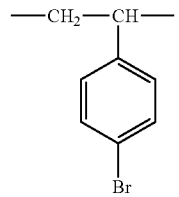
(PAV-7)

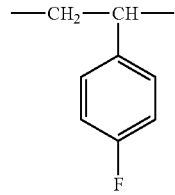
(PAV-8)

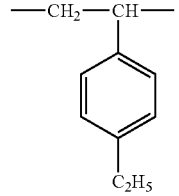
(PAV-9)

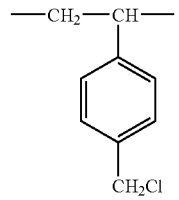
(PAV-10)

(PAV-11) 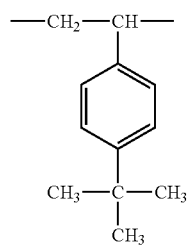
(PAV-12) 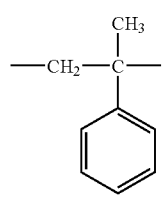
(PAV-13) 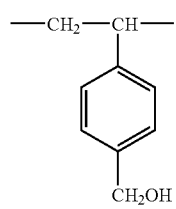
(PAV-14) 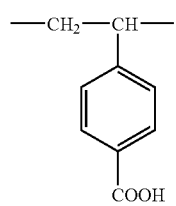
(PAV-15) 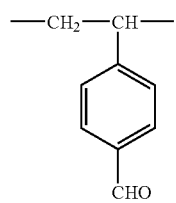
(PAV-16) 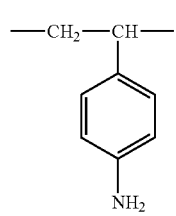
(PAV-17) 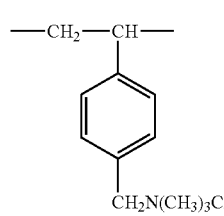
(PAV-18) 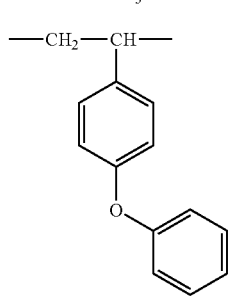
(PAV-19) 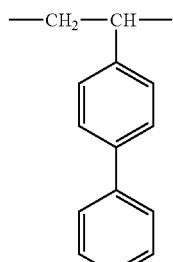
(PAV-20) 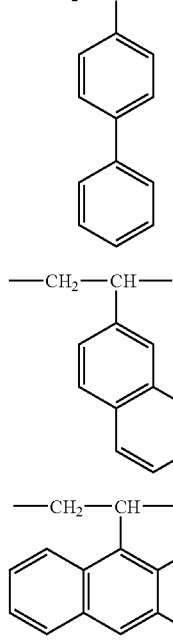
(PAV-21)
(PAV-22)
(PAV-23) 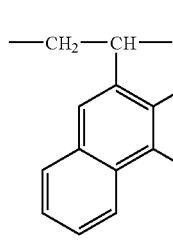
(PAV-24) 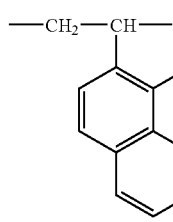

-continued (PAV-25) 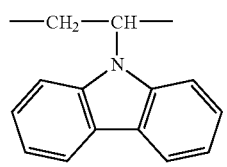

(PAV-26) 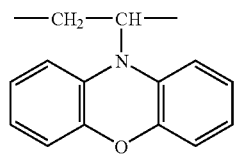

(PAV-27) 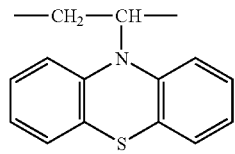

(PAV-28) 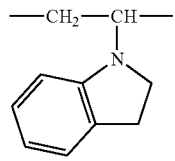

(PAV-29) 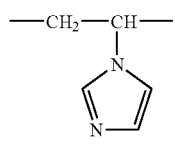

(PAV-30) 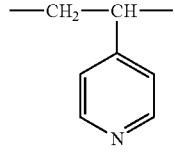

(PAV-31) 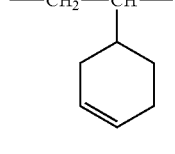

(PAV-32) 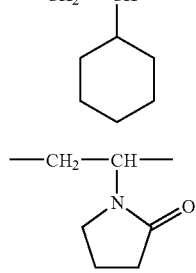

(PAV-33) 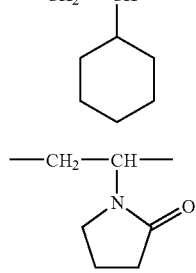

(PAV-34) 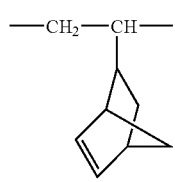

-continued (PAV-35) 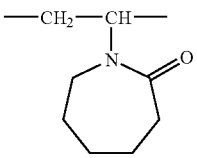

The desired examples of the acrylic copolymers and methacrylic copolymers are shown bellow. In the following examples, "AA" denotes a repeating unit derived from acrylic acid, "MA" denotes a repeating unit derived from methacrylic acid. The ration of each repeating unit is shown by mol %.

PA101: -(AA)$_{70}$-(PAV-1)$_{30}$-
PA102: -(AA)$_{60}$-(PAV-1)$_{40}$-
PA103: -(AA)$_{50}$-(PAV-1)$_{50}$-
PA104: -(AA)$_{40}$-(PAV-1)$_{60}$-
PA105: -(AA)$_{60}$-(PAV-2)$_{40}$-
PA106: -(AA)$_{60}$-(PAV-3)$_{40}$-
PA107: -(AA)$_{60}$-(PAV-4)$_{40}$-
PA108: -(AA)$_{60}$-(PAV-5)$_{40}$-
PA109: -(AA)$_{40}$-(PAV-6)$_{40}$-
PA110: -(AA)$_{50}$-(PAV-7)$_{50}$-
PA111: -(AA)$_{70}$-(PAV-8)$_{30}$-
PA112: -(AA)$_{60}$-(PAV-9)$_{40}$-
PA113: -(AA)$_{60}$-(PAV-10)$_{40}$-
PA114: -(AA)$_{60}$-(PAV-11)$_{40}$-
PA115: -(AA)$_{50}$-(PAV-12)$_{50}$-
PA116: -(AA)$_{50}$-(PAV-13)$_{50}$-
PA117: -(AA)$_{70}$-(PAV-14)$_{30}$-
PA118: -(AA)$_{50}$-(PAV-15)$_{50}$-
PA119: -(AA)$_{60}$-(PAV-16)$_{40}$-
PA120: -(AA)$_{60}$-(PAV-17)$_{40}$-
PA121: -(AA)$_{60}$-(PAV-18)$_{40}$-
PA122: -(AA)$_{60}$-(PAV-19)40-
PA123: -(AA)$_{75}$-(PAV-20)$_{25}$-
PA124: -(AA)$_{60}$-(PAV-20)$_{40}$-
PA125: -(AA)$_{70}$-(PAV-21)30-
PA126: -(AA)$_{80}$-(PAV-22)$_{20}$-
PA127: -(AA)$_{70}$-(PAV-22)$_{30}$-
PA128: -(AA)$_{60}$-(PAV-22)$_{40}$-
PA129: -(AA)$_{70}$-(PAV-23)$_{30}$-
PA130: -(AA)$_{70}$-(PAV-24)$_{30}$-
PA131: -(AA)$_{80}$-(PAV-25)$_{20}$-
PA132: -(AA)$_{70}$-(PAV-25)$_{30}$-
PA133: -(AA)$_{60}$-(PAV-25)$_{40}$-
PA134: -(AA)$_{60}$-(PAV-26)$_{40}$-
PA135: -(AA)$_{70}$-(PAV-27)$_{30}$-
PA136: -(AA)$_{80}$-(PAV-28)$_{20}$-
PA137: -(AA)$_{70}$-(PAV-29)$_{30}$-
PA138: -(AA)$_{60}$-(PAV-30)$_{40}$-
PA139: -(AA)$_{70}$-(PAV-31)$_{30}$-
PA140: -(AA)$_{70}$-(PAV-32)$_{30}$-
PA141: -(AA)$_{60}$-(PAV-33)$_{40}$-
PA142: -(AA)$_{70}$-(PAV-34)$_{30}$-
PA143: -(AA)$_{70}$-(PAV-35)$_{30}$-
PA201: -(MA)$_{70}$-(PAV-1)$_{30}$-
PA202: -(MA)$_{60}$-(PAV-1)$_{40}$-
PA203: -(MA)$_{50}$-(PAV-1)$_{50}$-
PA204: -(MA)$_{40}$-(PAV-1)$_{60}$-
PA205: -(MA)$_{60}$-(PAV-2)$_{40}$-
PA206: -(MA)$_{60}$-(PAV-3)$_{40}$-
PA207: -(MA)$_{60}$-(PAV-4)$_{40}$-
PA208: -(MA)$_{60}$-(PAV-5)$_{40}$-

PA209: -(MA)$_{40}$-(PAV-6)$_{40}$-
PA210: -(MA)$_{50}$-(PAV-7)$_{50}$-
PA211: -(MA)$_{70}$-(PAV-8)$_{30}$-
PA212: -(MA)$_{60}$-(PAV-9)$_{40}$-
PA213: -(MA)$_{60}$-(PAV-10)$_{40}$-
PA214: -(MA)$_{60}$-(PAV-11)$_{40}$-
PA215: -(MA)$_{50}$-(PAV-12)$_{50}$-
PA216: -(MA)$_{50}$-(PAV-13)$_{50}$-
PA217: -(MA)$_{70}$-(PAV-14)$_{30}$-
PA218: -(MA)$_{50}$-(PAV-15)$_{50}$-
PA219: -(MA)$_{60}$-(PAV-16)$_{40}$-
PA220: -(MA)$_{60}$-(PAV-17)$_{40}$-
PA221: -(MA)$_{60}$-(PAV-18)$_{40}$-
PA222: -(MA)$_{60}$-(PAV-19)$_{40}$-
PA223: -(MA)$_{75}$-(PAV-20)$_{25}$-
PA224: -(MA)$_{60}$-(PAV-20)$_{40}$-
PA225: -(MA)$_{70}$-(PAV-21)$_{30}$-
PA226: -(MA)$_{80}$-(PAV-22)$_{20}$-
PA227: -(MA)$_{70}$-(PAV-22)$_{30}$-
PA228: -(MA)$_{60}$-(PAV-22)$_{40}$-
PA229: -(MA)$_{70}$-(PAV-23)$_{30}$-
PA230: -(MA)$_{70}$-(PAV-24)$_{30}$-
PA231: -(MA)$_{80}$-(PAV-25)$_{20}$-
PA232: -(MA)$_{70}$-(PAV-25)$_{30}$-
PA233: -(MA)$_{60}$-(PAV-25)$_{40}$-
PA234: -(MA)$_{60}$-(PAV-26)$_{40}$-
PA235: -(MA)$_{70}$-(PAV-27)$_{30}$-
PA236: -(MA)$_{80}$-(PAV-28)$_{20}$-
PA237: -(MA)$_{70}$-(PAV-29)$_{30}$-
PA238: -(MA)$_{60}$-(PAV-30)$_{40}$-
PA239: -(MA)$_{70}$-(PAV-31)$_{30}$-
PA240: -(MA)$_{70}$-(PAV-32)$_{30}$-
PA241: -(MA)$_{60}$-(PAV-33)$_{40}$-
PA242: -(MA)$_{70}$-(PAV-34)$_{30}$-
PA243: -(MA)$_{70}$-(PAV-35)$_{30}$-

The polymers comprising a repeating unit represented by the Formula (PAIV) usually belong to modified polyvinyl alcohols. It is not required to saponify all of the polyvinyl alcohol moieties included in the modified polyvinyl alcohol. That is, the modified polyvinyl alcohol may have a repeating unit represented by Formula (PAVI).

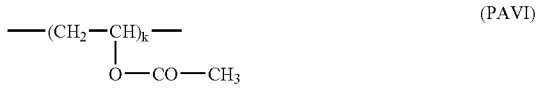
(PAVI)

In the Formula (PAVI), k ranges from 0.01 to 20 mol %.

The preferred examples of the modified polyvinyl alcohols are shown bellow. In the specific examples, "(PAIV)" denotes a vinyl alcohol based repeating unit represented by the Formula (PAIV) and "(PAVI)" denotes a vinyl acetate based repeating unit represented by the Formula (PAVI). The ration of each repeating unit is shown by mol %.

VA101: -(PAIV)$_{58}$-(PAV-1)$_{30}$-(PAVI)$_{12}$-
VA102: -(PAIV)$_{48}$-(PAV-1)$_{40}$-(PAVI)$_{12}$-
VA103: -(PAIV)$_{38}$-(PAV-1)$_{50}$-(PAVI)$_{12}$-
VA104: -(PAIV)$_{28}$-(PAV-1)$_{60}$-(PAVI)$_{12}$-
VA105: -(PAIV)$_{48}$-(PAV-2)$_{40}$-(PAVI)$_{12}$-
VA106: -(PAIV)$_{12}$-(PAV-3)$_{40}$-(PAVI)$_{12}$-
VA107: -(PAIV)$_{12}$-(PAV-4)$_{40}$-(PAVI)$_{12}$-
VA108: -(PAIV)$_{12}$-(PAV-5)$_{40}$-(PAVI)$_{12}$-
VA109: -(PAIV)$_{28}$-(PAV-6)$_{40}$-(PAVI)$_{12}$-
VA110: -(PAIV)$_{38}$-(PAV-7)$_{50}$-(PAVI)$_{12}$-
VA111: -(PAIV)$_{58}$-(PAV-8)$_{30}$-(PAVI)$_{12}$-
VA112: -(PAIV)$_{12}$-(PAV-9)$_{40}$-(PAVI)$_{12}$-
VA113: -(PAIV)$_{12}$-(PAV-10)$_{40}$-(PAVI)$_{12}$-
VA114: -(PAIV)$_{12}$-(PAV-11)$_{40}$-(PAVI)$_{12}$-
VA115: -(PAIV)$_{38}$-(PAV-12)$_{50}$-(PAVI)$_{12}$-
VA116: -(PAIV)$_{38}$-(PAV-13)$_{50}$-(PAVI)$_{12}$-
VA117: -(PAIV)$_{58}$-(PAV-14)$_{30}$-(PAVI)$_{12}$-
VA118: -(PAIV)$_{38}$-(PAV-15)$_{50}$-(PAVI)$_{12}$-
VA119: -(PAIV)$_{48}$-(PAV-16)$_{40}$-(PAVI)$_{12}$-
VA120: -(PAIV)$_{48}$-(PAV-17)$_{40}$-(PAVI)$_{12}$-
VA121: -(PAIV)$_{48}$-(PAV-18)$_{40}$-(PAVI)$_{12}$-
VA122: -(PAIV)$_{48}$-(PAV-19)$_{40}$-(PAVI)$_{12}$-
VA123: -(PAIV)$_{63}$-(PAV-20)$_{25}$-(PAVI)$_{12}$-
VA124: -(PAIV)$_{48}$-(PAV-20)$_{40}$-(PAVI)$_{12}$-
VA125: -(PAIV)$_{58}$-(PAV-21)$_{30}$-(PAVI)$_{12}$-
VA126: -(PAIV)$_{68}$-(PAV-22)$_{20}$-(PAVI)$_{12}$-
VA127: -(PAIV)$_{58}$-(PAV-22)$_{30}$-(PAVI)$_{12}$-
VA128: -(PAIV)$_{48}$-(PAV-22)$_{40}$-(PAVI)$_{12}$-
VA129: -(PAIV)$_{58}$-(PAV-23)$_{30}$-(PAVI)$_{12}$-
VA130: -(PAIV)$_{58}$-(PAV-24)$_{30}$-(PAVI)$_{12}$-
VA131: -(PAIV)$_{68}$-(PAV-25)$_{20}$-(PAVI)$_{12}$-
VA132: -(PAIV)$_{58}$-(PAV-25)$_{30}$-(PAVI)$_{12}$-
VA133: -(PAIV)$_{48}$-(PAV-25)$_{40}$-(PAVI)$_{12}$-
VA134: -(PAIV)$_{48}$-(PAV-26)$_{40}$-(PAVI)$_{12}$-
VA135: -(PAIV)$_{58}$-(PAV-27)$_{30}$-(PAVI)$_{12}$-
VA136: -(PAIV)$_{68}$-(PAV-28)$_{20}$-(PAVI)$_{12}$-
VA137: -(PAIV)$_{58}$-(PAV-29)$_{30}$-(PAVI)$_{12}$-
VA138: -(PAIV)$_{48}$-(PAV-30)$_{40}$-(PAVI)$_{12}$-
VA139: -(PAIV)$_{58}$-(PAV-31)$_{30}$-(PAVI)$_{12}$-
VA140: -(PAIV)$_{58}$-(PAV-32)$_{30}$-(PAVI)$_{12}$-
VA141: -(PAIV)$_{48}$-(PAV-33)$_{40}$-(PAVI)$_{12}$-
VA142: -(PAIV)$_{58}$-(PAV-34)$_{30}$-(PAVI)$_{12}$-
VA143: -(PAIV)$_{58}$-(PAV-35)$_{30}$-(PAVI)$_{12}$-

[Homeotropic Alignment Layer]

For aligning discotic liquid-crystalline molecules homeotropically, it is important to lower surface energy of an alignment layer. In particular, for aligning discotic liquid-crystalline molecules homeotropically, it is necessary to use an alignment layer formed of a polymer having functional groups capable of lowering surface energy of the alignment layer. Hydrocarbon groups of 10 or more carbon atoms are effective in lowering the surface energy. The hydrocarbon groups introduced into the side chains of a polymer are more localized on the surface of a layer formed of the polymer than those introduced into the main chain of the polymer. The term of "hydrocarbon group" is used for any aliphatic groups, aryl groups and any combinations thereof. The aliphatic group may have a straight chain, branched chain or cyclic structure. The desired examples of the aliphatic group include alkyl group (including cycloalkyl group) and alkenyl group (including cycloalkenyl group). The hydrocarbon group may have a substituent, which is not so much hydrophilic, such as halogen atoms. The number of the carbon atoms included in the hydrocarbon group is desirably from 10 to 100, preferably from 10 to 60, and more preferably from 10 to 40. The main chain of the polymer desirably has a polyimide based or polyvinyl alcohol based structure.

Polyimide is usually prepared by condensation reaction of a tetra-carboxylic acids and a diamine. Copolymer type polyimide may be prepared by condensation reaction of two or more species of tetra-carboxylic acids and two or more species of diamines. The above-mentioned hydrocarbon group may be included in either of the repeating units based on the tetra-carboxylic acids or diamines, or both of them. Among polyimides having the hydrocarbon groups, polyimides having steroid moieties in the side chains or the main chain are preferred. The steroid moiety is corresponding to a hydrocarbon group of 10 or more carbon atoms and the steroid moieties in the side chains contribute to aligning discotic liquid-crystalline molecules homeotropically. In the present specification, the term of "steroid moiety" is used for any cyclopentanohydrophenanthrene ring structures and any ring structures based on the cyclopentanohydrophenanthrene ring in which at least one single bond is replaced by a double bond provided that the double-bond-replaced ring doesn't belong to an aryl ring group.

The modified polyvinyl alcohols having hydrocarbon group of 10 or more carbon atoms are desirably used for preparing a homeotropic alignment layer. The term of "hydrocarbon group" is used for aliphatic groups, aryl groups and any combinations thereof. The aliphatic group may have a straight chain, branched chain or cyclic structure. The desired examples of the aliphatic group include alkyl group (including cycloalkyl group) and alkenyl group (including cycloalkenyl group). The hydrocarbon group may have a substituent, which is not so much hydrophilic, such as halogen atoms. The number of the carbon atoms included in the hydrocarbon group is desirably from 10 to 100, preferably from 10 to 60, and more preferably from 10 to 40. The ratio of a repeating unit having the hydrocarbon group of 10 or more carbon atoms in the modified polyvinyl alcohol is desirably from 2 to 80 mol %, and preferably from 3 to 70 mol %.

The modified polyvinyl alcohol having the hydrocarbon group of 10 or more carbon atoms denoted by Formula (PAVII) are preferred.

Formula (PAVII)

In the Formula (PAVII), Val denotes a vinyl alcohol based repeating unit, HyC is a repeating unit having a hydrocarbon group of 10 or more carbon atoms, VAc is a vinyl acetate based repeating unit, x ranges from 20 to 95 mol % (desirably from 25 to 90 mol %), y ranges from 2 to 80 mol % (desirably from 3 to 70 mol %) and z ranges from 0 to 30 mol % (desirably from 2 to 20 mol %) Among the repeating units of Hyc having a hydrocarbon group of 10 or more carbon atoms, repeating units denoted by Formula (HyC-I) or (HyC-II) are preferred.

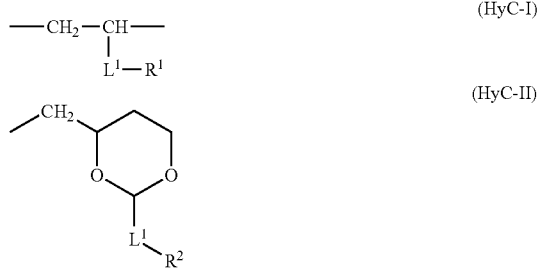

In the formulae, $L^1$ is a divalent linking group selected from the group consisting of —O—, —CO—, —SO$_2$—, —NH—, an alkylene group, arylene group and any combinations thereof; $L^2$ is a single bond or divalent linking group selected from the group consisting of —O—, —CO—, —SO$_2$—, —NH—, an alkylene group, arylene group and any combinations thereof; $R^1$ and $R^2$ respectively denote a hydrocarbon group of 9 or less carbon atoms. The examples of the divalent linking group formed of the combinations are shown bellow.

L1: —O—CO—
L2: —O—CO-{alkylene}-O—
L3: —O—CO-{alkylene}-CO—NH—
L4: —O—CO-{alkylene}-NH—SO$_2$-{arylene}-O—
L5: -{arylene}-NH—CO—
L6: -{arylene}-CO—O—
L7: -{arylene}-CO—NH—
L8: -{arylene}-O—
L9: —O—CO—NH-{arylene}-NH—CO—

The polymerization degree of the polymer used in preparation of the homeotropic layer is desirably from 200 to 5,000, and preferably from 300 to 3,000. The molecular weight of the polymer is desirably from 9,000 to 200,000, and preferably from 13,000 to 130,000. The homeotropic alignment layer may be formed of two or more species of polymers. For preparing the homeotropic alignment layer, a rubbing treatment is desirably performed. The rubbing treatment is performed by rubbing the surface of the polymer layer in a direction several times with a paper or a cloth. The homeotropic alignment layer may be formed on a temporary substrate and the lower layer may be formed by aligning discotic liquid-crystalline molecules on the alignment layer and then transferred onto the transparent substrate such as plastic films. The discotic liquid-crystalline molecules fixed in an alignment can remain the alignment without alignment layer.

For improving adhesion between the liquid-crystalline compound and the transparent substrate, the polymer used in the homeotropic alignment layer desirably has a polymerizable group. The polymerizable group may be introduced to the polymer as a portion in the side chains of a repeating unit constituting the polymer or as a cyclic substituent group of the polymer.

[Additive for Controlling Alignment of Liquid-Crystalline Molecules]

The upper layer may be prepared by a process comprising a step of preparing a composition (coating solution) with similar materials to those for the lower layer and a step of applying the composition to the surface of the lower layer. In order to stably prepare the upper layer without substantially preparing an alignment layer on the surface of the lower layer, the composition for preparation of the lower layer comprises a liquid-crystalline compound in the combination with an additive for controlling its alignment. The additive is required to be stably mixed in the composition (coating solution) for preparing the lower layer. And the additive desirably has a tendency to migrate to the upper area of the lower layer, that is, the air interface of the lower layer, while the lower layer is formed, in particular, the liquid-crystalline compound is aligned and fixed in the alignment state. The additive migrates to the upper area of the lower layer such that an area to be subjected to a treatment for aligning liquid-crystalline molecules in the upper layer can be formed at the surface of the lower layer. As a result, the upper layer in which liquid-crystalline molecules are aligned in a desired alignment can be formed stably in contact with the lower layer without substantially preparing an alignment layer between them.

In general, when a layer formed of aligned liquid-crystalline molecules has two interfaces, one is an alignment layer interface and another is an air interface, liquid-crystalline molecules can be aligned in homogeneous alignment in the area near to the alignment layer interface, and on the other hand, they tend to be aligned with a certain level of tilt angles in the area near to the air interface. As a result, the layer sometimes lacks in optical uniformity. Therefore, it is preferable that the additive added to the lower layer can not only contribute to aligning the molecules in the upper layer, but also contribute to reducing tilt angles of the molecules in the lower layer in the area near to the air interface.

The additives may be a high-molecular-weight compound, in other words, polymer or a low-molecular-weight compound. The examples of the additive which can be used in the present invention are described bellow.

First, the examples of low-molecular-weight additives are described bellow.

The additives denoted by Formula (V) are desired.

$$(Hb-L^{52}-)_n B^{51} \qquad \text{Formula (V)}$$

In the Formula (V), Hb is an aliphatic group of 6 to 40 carbon atoms or an oligosiloxanoxy group having an aliphatic group of 6 to 40 carbon atoms. Hb is desirably an aliphatic group of 6 to 40 carbon atoms, preferably a fluorinated aliphatic group of 6 to 40 carbon atoms or a branched aliphatic group of 6 to 40 carbon atoms and more preferably fluorinated alkyl group of 6 to 40 carbon atoms or a branched alkyl group of 6 to 40 carbon atoms.

Among the aliphatic groups, chain aliphatic groups are preferred to rather than cyclic aliphatic groups. The chain aliphatic groups may have a straight or branched chain structure. The number of the carbon atoms included in the aliphatic group is desirably from 7 to 35, preferably from 8 to 30, more preferably from 9 to 25 and much more preferably from 10 to 20.

The term of "aliphatic group" is a general term for a substituted or non-substituted alkyl group, substituted or non-substituted alkenyl group and substituted or non-substituted alkynyl group. The aliphatic group is desirably a substituted or non-substituted alkyl group or substituted or non-substituted alkenyl group and preferably substituted or non-substituted alkyl group.

The examples of the substituent of the aliphatic group include halogen atoms, hydroxy, cyano, nitro, alkoxy group, substituted alkoxy group (e.g., oligoalkoxy group), alkenyloxy group (e.g., vinyloxy), acyl group (e.g., acryloyl, methacryloyl), acyloxy group (e.g., acryloyloxy, benzoyloxy), sulfamoyl group, sulfamoyl groups substituted with aliphatic groups and epoxy alkyl group (e.g., epoxy ethyl). Among them, halogen atoms are desirable, and fluorine is more desirable, as substituent. Fluorinated aliphatic group is an aliphatic group in which part or all of the hydrogen atoms have been substituted with fluorine atoms. 50 to 100 percent of the hydrogen atoms in the aliphatic group are desirably substituted with fluorine atoms, with 60 to 100 percent substitution being preferred, 80 to 100 percent substitution being of even greater preference and 85 to 100 percent substitution being of even much greater preference.

The number of the carbon atoms included in the oligosiloxanoxy group having an aliphatic group is desirably from 7 to 35, preferably from 8 to 30, more preferably from 9 to 25 and much more preferably from 10 to 20. The oligosiloxanoxy group having an aliphatic group can be denoted by the following formula:

$$R^{51}-(Si(R^{52})_2-O)_q-.$$

In the formula, $R^{51}$ is hydrogen, hydroxy or aliphatic group; $R^{52}$ is hydrogen, aliphatic group or alkoxy group; and q is an integer from 1 to 12. A chain aliphatic group is preferred to a cyclic aliphatic group as the aliphatic group denoted by $R^{51}$ or $R^{52}$. The chain aliphatic group may have a straight chain or branched chain structure. The number of the carbon atoms included in the aliphatic group is desirably from 1 to 12, preferably from 1 to 8, more preferably from 1 to 6 and much more preferably from 1 to 4.

The aliphatic group denoted respectively by $R^{51}$ or $R^{52}$ is a substituted or non-substituted alkyl group, substituted or non-substituted alkenyl group, or substituted or non-substituted alkynyl group. As the aliphatic group, a non-substituted alkyl group, substituted alkyl group, non-substituted alkenyl group and substituted alkenyl group are preferred, and a non-substituted and substituted alkyl group are more preferred.

The aliphatic group denoted respectively by $R^{51}$ or $R^{52}$ may be substituted with at least one of substituent such as a halogen atom, hydroxy, cyano, nitro, alkoxy group, substituted alkoxy group (e.g., oligoalkoxy), alkenyloxy group (e.g., vinyloxy), acyl group (e.g., acryloyl, methacryloyl), acyloxy group (e.g., acryloyl oxy, benzoyl oxy), sulfamoyl, sulfamoyl group substituted with aliphatic group or epoxy alkyl group (e.g., epoxy ethyl).

The alkoxy group denoted by $R^{52}$ may have a cyclic or straight or branched chain structure. The number of the carbon atoms included in the alkoxy group is desirably from 1 to 12, preferably from 1 to 8, more preferably from 1 to 6 and more preferably from 1 to 4.

The specific examples of Hb are shown bellow.

Hb1: n-$C_{16}H_{33}$—
Hb2: n-$C_{20}H_{41}$—
Hb3: n-$C_6H_{13}$—CH(n-$C_4H_9$)—$CH_2$—$CH_2$—
Hb4: n-$C_{12}H_{25}$—
Hb5: n-$C_{18}H_{37}$—
Hb6: n-$C_{14}H_{29}$—
Hb7: n-$C_{15}H_{31}$—
Hb8: n-$C_{10}H_{21}$—
Hb9: n-$C_{10}H_{21}$—CH(n-$C_4H_9$)—$CH_2$—$CH_2$—
Hb10: n-$C_8F_{17}$—
Hb11: n-$C_8H_{17}$—
Hb12: $CH(CH_3)_2$—{$C_3H_6$—CH($CH_3$)}$_3$—$C_2H_4$—
Hb13: $CH(CH_3)_2$—{$C_3H_6$—CH($CH_3$)}$_2$—$C_3H_6$—C($CH_3$)=CH—$CH_2$—
Hb14: n-$C_8H_{17}$—CH(n-$C_6H_{13}$)—$CH_2$—$CH_2$—
Hb15: n-$C_6H_{13}$—CH($C_2H_5$)—$CH_2$—$CH_2$—
Hb16: n-$C_8F_{17}$—CH(n-$C_4F_9$)—$CH_2$—
Hb17: n-$C_8F_{17}$—CF(n-$C_6F_{13}$)—$CF_2$—$CF_2$—
Hb18: n-$C_3F_7$—CF($CF_3$)—$CF_2$—
Hb19: Si($CH_3$)$_3$—{Si($CH_3$)$_2$—O}$_6$—O—
Hb20: Si(O$C_3H_7$)($C_{16}F_{33}$)($C_2H_4$—$SO_2$—NH—$C_8F_{17}$)—O—

In the Formula (V), $L^{52}$ is a single bond or divalent linking group. The divalent linking group is desirably a divalent linking group selected from the group consisting of -alkylene-, -fluorinated alkylene-, —O—, —S—, —CO—, —NR—, —$SO_2$— and any combinations thereof. R is a hydrogen atom or C1–20 alkyl group. R is desirably a hydrogen atom or C1–12 alkyl group. The number of the carbon atoms included in the alkylene or the fluorinated alkylene is desirably from 1 to 40, preferably from 1 to 30, more preferably from 1 to 20, much more preferably from 1 to 15 and further much more preferably from 1 to 12.

The specific examples of $L^{52}$ are shown bellow. They are connected on the left to Hb and on the right to $B^{51}$.

$L^{52}$10: single bond
$L^{52}$11: —O—
$L^{52}$12: —O—CO—
$L^{52}$13: —CO—$C_4H_8$—O—
$L^{52}$14: —O—$C_2H_4$—O—$C_2H_4$—O—
$L^{52}$15: —S—
$L^{52}$16: —N(n-$C_{12}H_{25}$)—
$L^{52}$17: —$SO_2$—N(n-$C_3H_7$)—$CH_2CH_2$—O—
$L^{52}$18: —O—{CF($CF_3$)—$CF_2$—O}$_3$—CF($CF_3$)—

In the Formula (V), n is an integer from 2 to 12. n is desirably an integer from 2 to 9, preferably from 2 to 6, more preferably 2, 3 or 4 and much more preferably 3 or 4.

In the Formula (V), $B^{51}$ is an n-valent group showing an excluded volume effect and comprising at least three rings. $B^{51}$ is desirably an n-valent group denoted by Formula (V-a).

$$(-Cy^{51}-L^{53}-)_nCy^{52} \quad \text{Formula (V-a)}$$

In the Formula (V-a), $Cy^{51}$ is a divalent cyclic group. $Cy^{51}$ is desirably a divalent aromatic hydrocarbon group or a divalent heterocyclic divalent group and more preferably a divalent aromatic hydrocarbon group.

The divalent aromatic hydrocarbon group is a general term for a substituted or non-substituted arylene group. The examples of the arylene group include benzene-diyl, indene-diyl, naphthalene-diyl, fluorine-diyl, phenanthrene-diyl, anthracene-diyl and pyrane-diyl. The divalent aromatic hydrocarbon group is desirably benzene-diyl or naphthalene-diyl.

The examples of the substituent of the substituted arylene group include an aliphatic group, aromatic hydrocarbon group, heterocyclic group, halogen atom, alkoxy group (e.g., methoxy, ethoxy, methoxy-ethoxy), aryloxy group (e.g., phenoxy), arylazo group (e.g., phenylazo), alkylthio group (e.g., methylthio, ethylthio, propylthio), alkylamino group (e.g., methylamino, propylamino), acyl group (e.g., acetyl, propanoyl, octanoyl, benzoyl), acyloxy group (e.g., acetoxy, pivaloyloxy, benzoyloxy), hydroxy, mercapto, amino, carboxy, sulfo, carbamoyl, sulfamoyl and ureido.

The divalent aromatic hydrocarbon group bonded to another aromatic hydrocarbon group through a single, vinylene or ethynylene bond may show the above-mentioned ability of promoting alignment of liquid-crystalline molecules. The divalent aromatic hydrocarbon group may have a group of $Hb-L^{52}$- as a substituent.

The hetero ring included in the divalent heterocyclic group denoted by $Cy^{51}$ is desirably five-, six- or seven-membered, preferably five- or six-membered, and more preferably six-membered. The hetero atom constituting the hetero ring is desirably nitrogen, oxygen or sulfur. The hetero ring desirably has aromaticity. Aromatic hetero rings are usually unsaturated rings and desirably has maximum double bondings. The examples of the hetero ring include a furan ring, thiophene ring, pyrrole ring, pyrrolizine ring, oxazole ring, isoxazole ring, thiazole ring, isothiazole ring, imidazole ring, imidazoline ring, imidazolidine ring, pyrazole ring, pyrazolidine ring, triazole ring, furazan ring, tetrazole ring, pyrane ring, thiine ring, pyridine ring, piperidine ring, oxazine ring, morpholine ring, thiazine ring, pyridazine ring, pyrimidine ring, pyrazine ring, piperazine ring and triazine ring.

The hetero rings may be condensed with other hetero rings, aliphatic rings or aryl rings. The examples of the condensed hetero rings include a benzofuran ring, isobenzofuran ring, benzothiophene ring, indole ring, indoline ring, isoindole ring, benzoxazole ring, benzothiazole ring, indazole ring, benzoimidazole ring, chromene ring, chromane ring, isochromane ring, quinoline ring, isoquinoline ring, cinnoline ring, phthalazine ring, quinazoline ring, quinoxaline ring, di-benzofuran ring, carbazole ring, xanthene ring, acridine ring, phenanthridine ring, phenanthroline ring, phenazine ring, phenoxazine ring, thianthrene ring, indolizine ring, quinolidine ring, quinuclidine ring, naphthridine ring, purine ring and pteridine ring.

The divalent heterocyclic group may have at least one substituent. The examples of the substituent for the divalent heterocyclic group are identical with those for the substituted arylene group.

The divalent heterocyclic group, $Cy^{51}$, may connected to the $L^{53}$ or the cyclic group denoted by $Cy^{52}$, when $L^{53}$ is a single bond, through a hetero atom such as nitrogen constituting a piperidine ring. The hetero atom linking them may form an onium salt such as an oxonium, sulfonium or ammonium.

The Cyclic $Cy^{51}$ and $Cy^{52}$ may form a planar structure, that is, a discotic structure, as a whole. In such a case, the above-mentioned ability of promoting alignment of liquid-crystalline molecules can be obtained.

The specific examples of $Cy^{51}$ are shown bellow. When the plural groups corresponding to $Hb-L^{52}$- are bonded to a divalent aromatic hydrocarbon group or a divalent heterocyclic group, one of the plural groups can be regarded as $Hb-L^{52}$- and others can be regarded as substituent of the aromatic hydrocarbon group or the heterocyclic group.

Cy101:

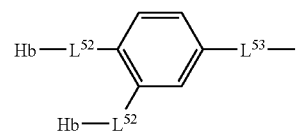

Cy102:

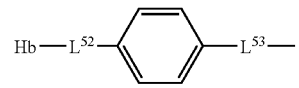

Cy103:

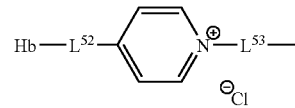

Cy104:

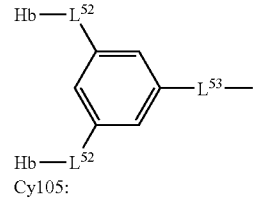

Cy105:

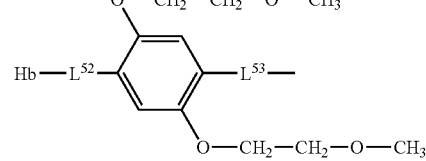

Cy106:

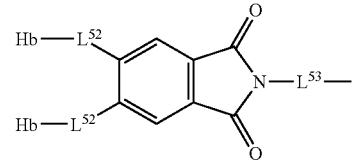

Cy107:
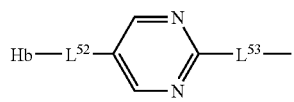
Cy108:
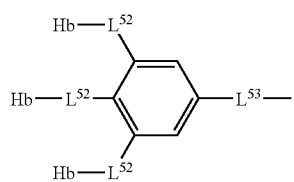
Cy109:
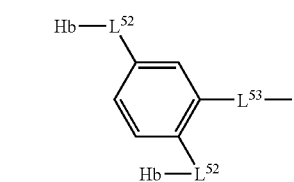
Cy110:
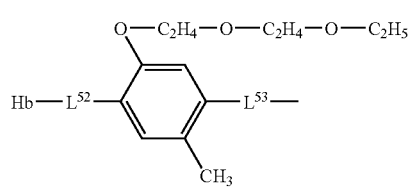
Cy111:
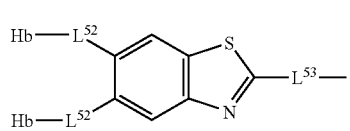
Cy112:
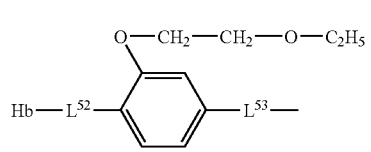
Cy113:
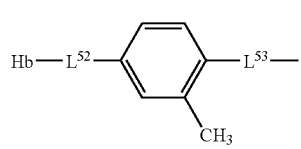
Cy114:
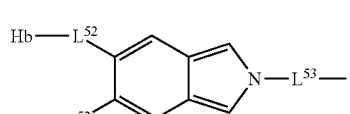
Cy115:
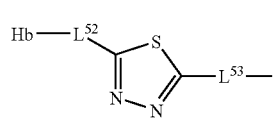
Cy116:
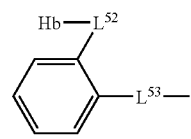
Cy117:
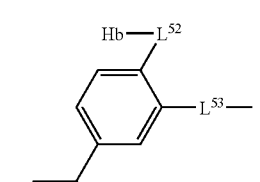
Cy118:
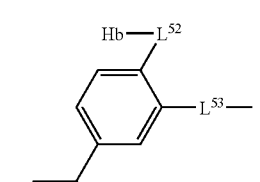
Cy119:
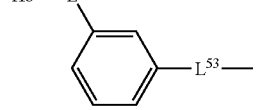
Cy120:
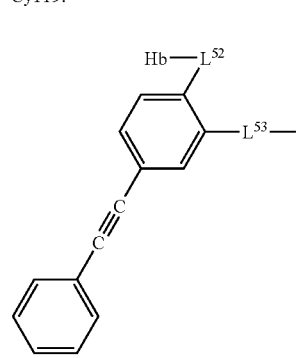
Cy121:
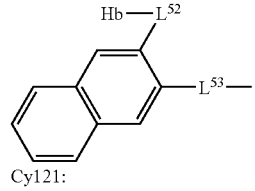
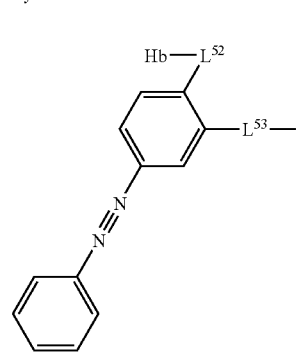
In the Formula (V-a), $L^{53}$ is a divalent linking group selected from the group consisting of a single bond, -alkylene-, -alkenylene-, -alkynylene-, —O—, —S—, —CO—, —NR—, —SO$_2$— and any combinations thereof. R is a hydrogen atom or C1–30 alkyl group. L$^{53}$ is desirably a divalent linking group selected from the group consisting of —O—, —S—, —CO—, —NR—, —SO$_2$— and any combinations thereof. R is desirably a hydrogen atom or C1–20 alkyl group, preferably a hydrogen atom or C1–15 alkyl group, and more preferably a hydrogen atom or C1–12 alkyl group.

The number of the carbon atoms included in the alkylene group is desirably from 1 to 40, preferably from 1 to 30, more preferably from 1 to 15 and much more preferably from 1 to 12.

The number of the carbon atoms included in the alkenylene group is desirably from 2 to 40, preferably from 2 to 30, more preferably from 2 to 15 and much more preferably from 2 to 12.

The specific examples of L$^{53}$ are shown bellow. In the following examples, the left end of an exemplified group is bonded to Cy$^{51}$ and the right end is bonded to Cy$^{52}$.

L20: single bond
L21: —S—
L22: —NH—
L23: —NH—SO$_2$—NH—
L24: —NH—CO—NH—
L25: —SO$_2$—
L26: —O—NH—
L27: —C≡C—
L28: —CH=CH—S—
L29: —CH$_2$—O—
L30: —N(CH$_3$)—
L31: —CO—O—

In the Formula (V-a), n is an integer from 2 to 12, desirably from 2 to 9, preferably from 2 to 6, more preferably 2, 3 or 4, and much more preferably 3 or 4.

In the Formula (V-a), Cy$^{52}$ is an n-valent cyclic group. Cy$^{52}$ is desirably an n-valent aromatic hydrocarbon group or n-valent heterocyclic group.

The examples of the aromatic hydrocarbon ring included in the aromatic hydrocarbon group denoted by Cy$^{52}$ include a benzene ring, indene ring, naphthalene ring, fluorine ring, phenanthrene ring, anthracene ring and pyrene ring. Among them, a benzene ring and naphthalene ring are preferred and a benzene ring is more preferred.

The aromatic hydrocarbon group denoted by Cy$^{52}$ may have at least one substituent. The examples of the substituent include an aliphatic group, aromatic hydrocarbon group, heterocyclic group, halogen atom, alkoxy group (e.g., methoxy, ethoxy, methoxy-ethoxy), aryloxy group (e.g., phenoxy), arylazo group (e.g., phenylazo), alkylthio group (e.g., methylthio, ethylthio, propylthio), alkylamino group (e.g., methylamino, propylamino), arylamino group (e.g., phenylamino), acyl group (e.g., acetyl, propanoyl, octanoyl, benzoyl), acyloxy group (e.g., acetoxy, pivaloyloxy, benzoyloxy), hydroxy, mercapto, amino, carboxy, sulfo, carbamoyl, sulfamoyl and ureido.

The hetero ring included in the divalent heterocyclic group denoted by Cy$^{52}$ is desirably five-, six- or seven-membered, preferably five- or six-membered, and more preferably six-membered. The hetero atom constituting the hetero ring is desirably nitrogen, oxygen or sulfur. The hetero ring desirably has aromaticity. Aromatic hetero rings are usually unsaturated rings and desirably has maximum double bondings. The examples of the hetero ring include a furan ring, thiophene ring, pyrrole ring, pyrroline ring, pyrrolizine ring, oxazole ring, isoxazole ring, thiazole ring, isothiazole ring, imidazole ring, imidazoline ring, imidazolidine ring, pyrazole ring, pyrazoline ring, pyrazolidine ring, triazole ring, furazan ring, tetrazole ring, pyrane ring, thiine ring, pyridine ring, piperidine ring, oxazine ring, morpholine ring, thiazine ring, pyridazine ring, pyrimidine ring, pyrazine ring, piperazine ring and triazine ring. Among them, triazine ring is preferred and 1,3,5-triazine ring is more preferred.

Although the hetero rings may be condensed with other hetero rings, aliphatic rings or aryl rings, monocyclic hetero rings are preferred.

The specific examples of Cy$^{52}$ are shown bellow.

Cy201(n = 4):

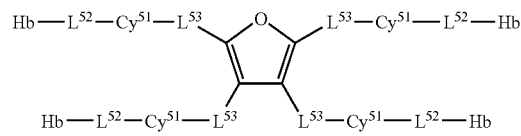

Cy202(n = 4):

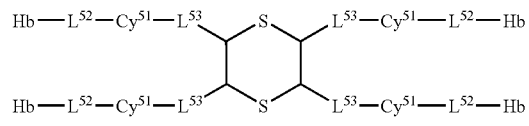

Cy203(n = 4):

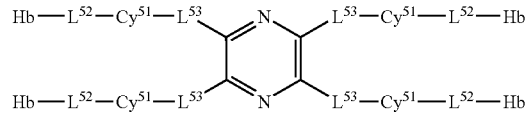

Cy204(n = 3):

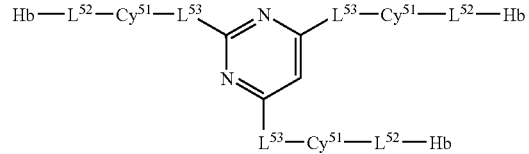

Cy205(n = 3):

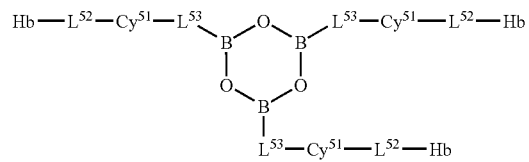

Cy206(n = 3):

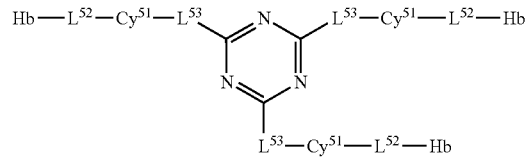

Cy207(n = 3):

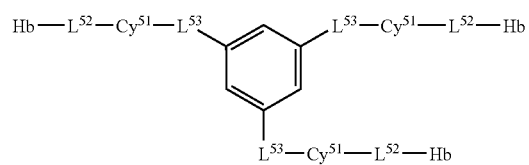

-continued

Cy208(n = 2):
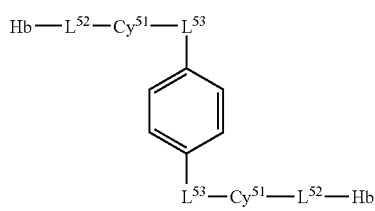

Cy209(n = 2):
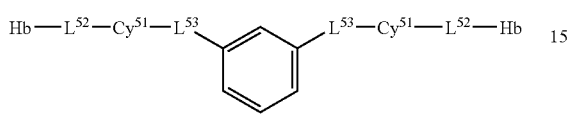

Cy210(n = 2):
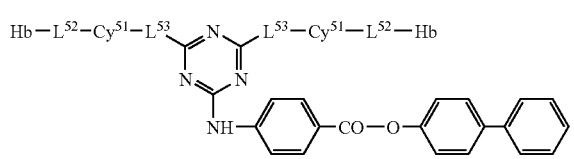

-continued

Cy211(n = 2):
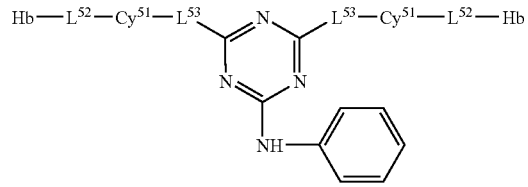

The alignment promoter is a compound comprising the aforementioned hydrophobic group (Hb), the linking group ($L^{52}$) and the group (Bu) showing an excluded volume effect. There is no specific limitation on the combinations thereof.

The specific examples of the alignment promoters denoted by the Formula (V) are shown below.

v-(1)
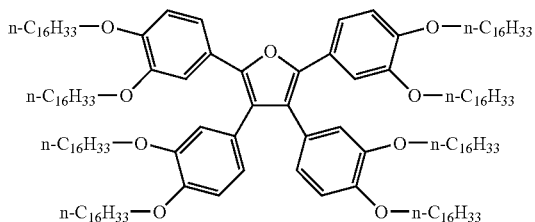

v-(2)
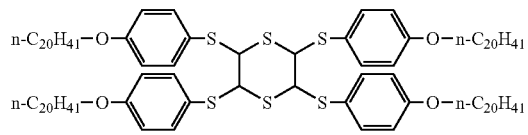

v-(3)
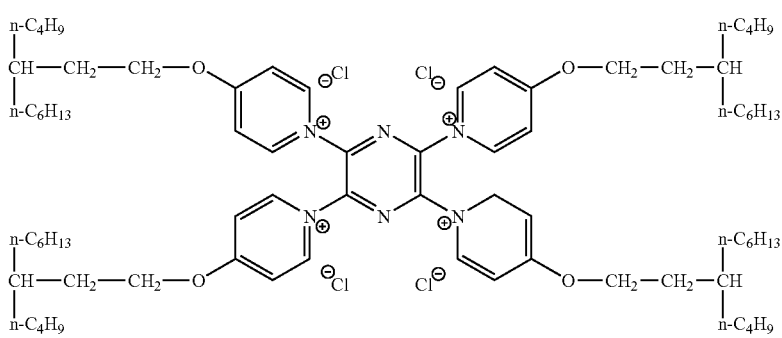

v-(4)
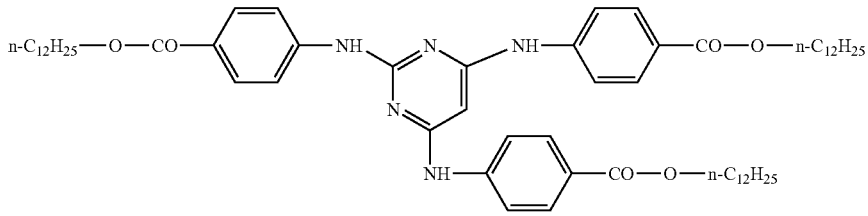

-continued
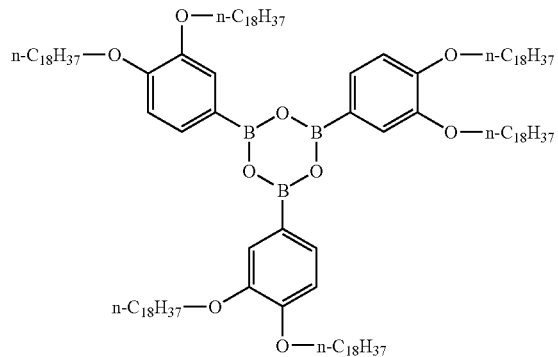
v-(5)
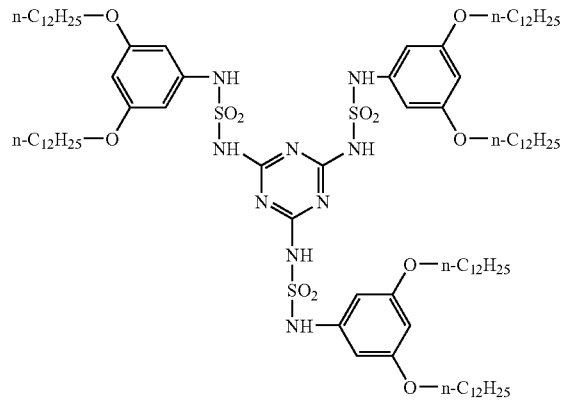
v-(6)
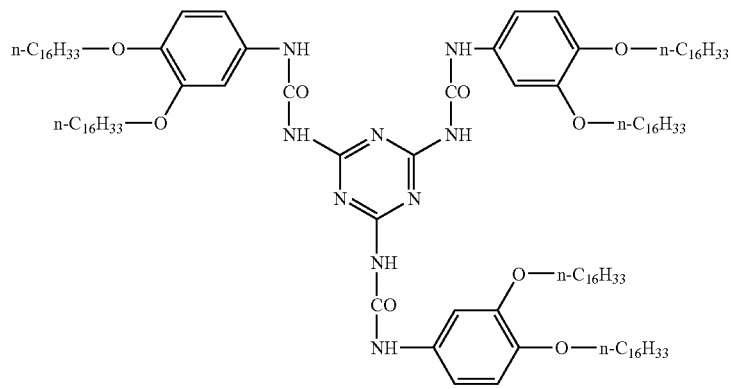
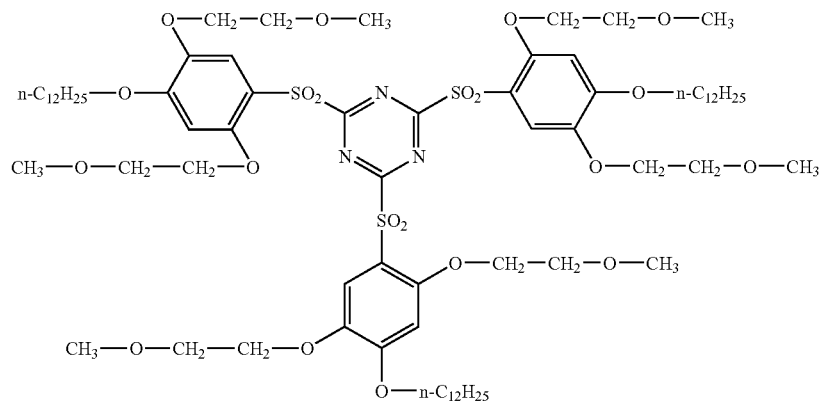
v-(8)
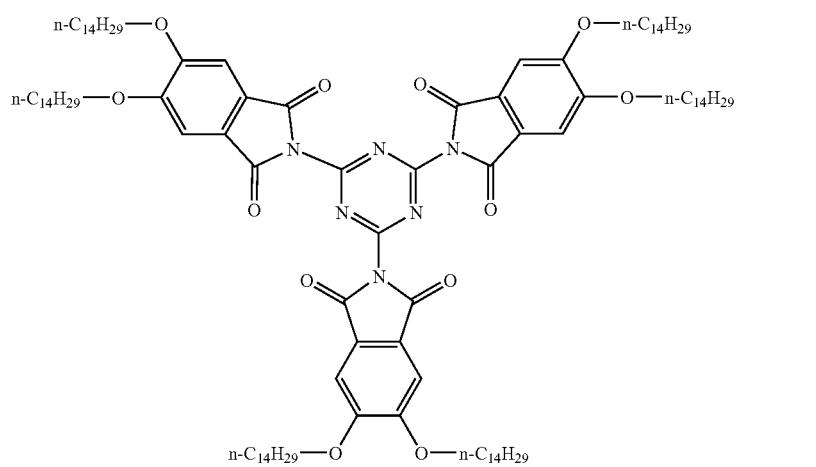
v-(9)

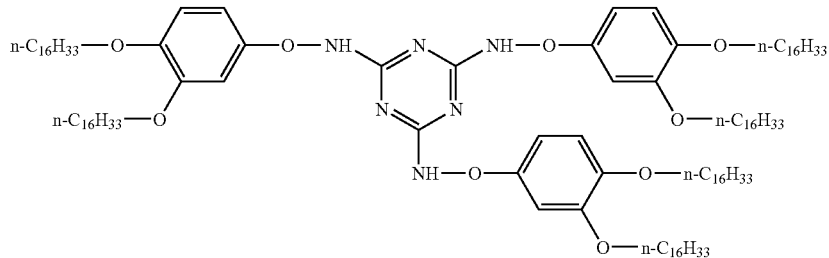
v-(10)
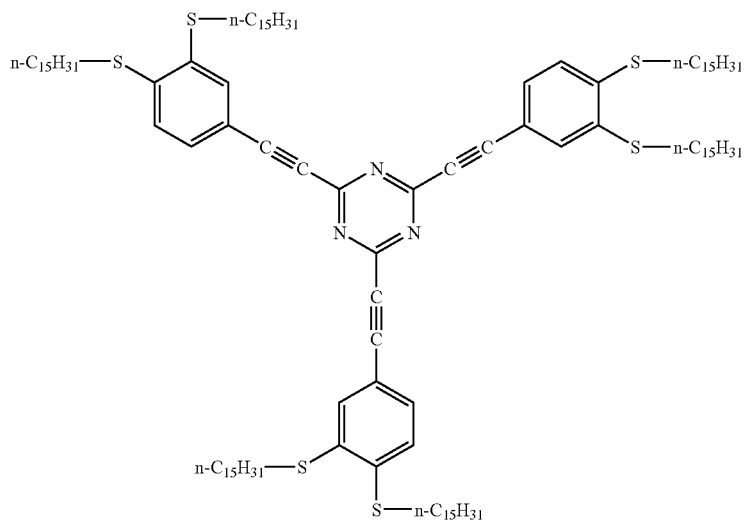
v-(11)
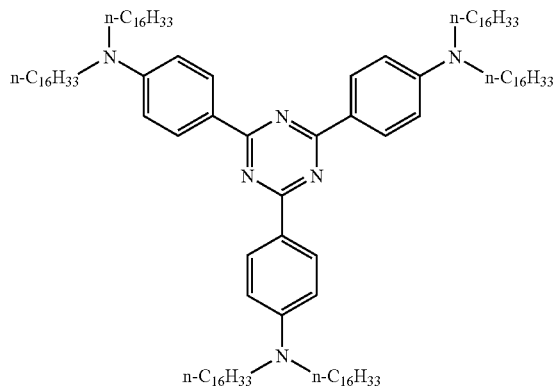
v-(12)
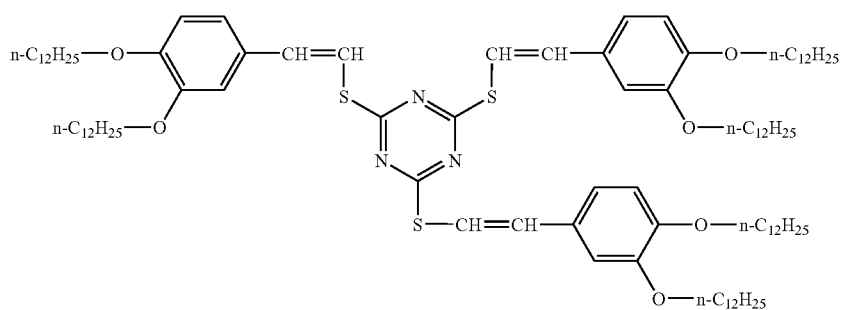
v-(13)

-continued
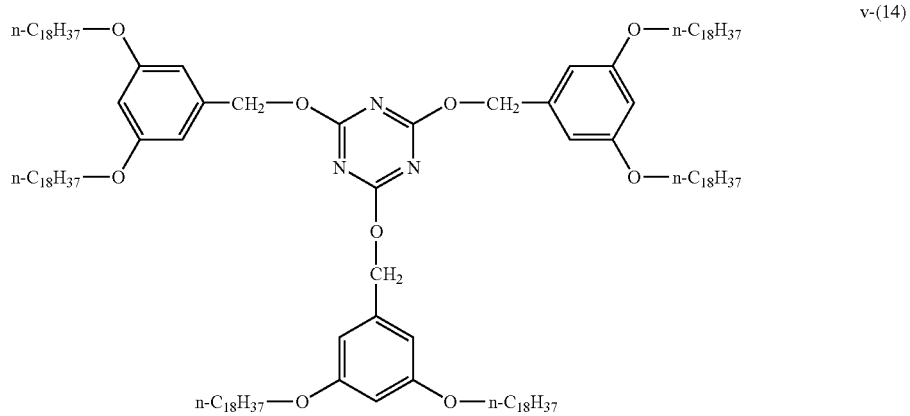
v-(14)
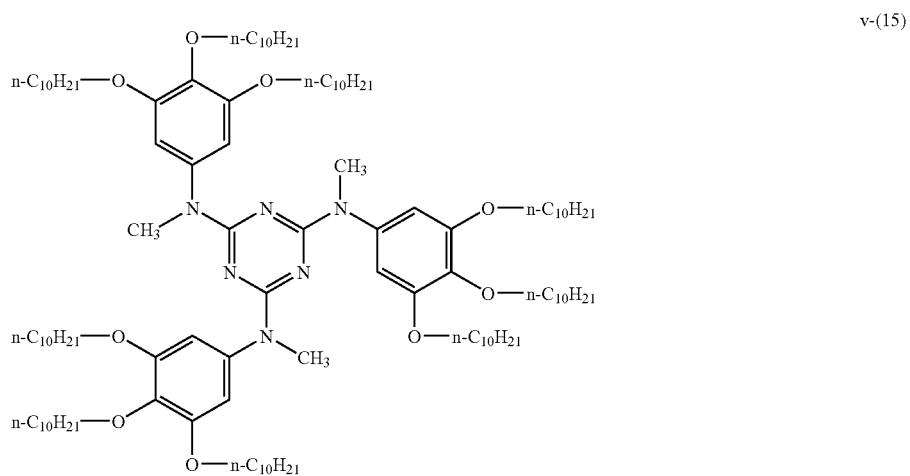
v-(15)
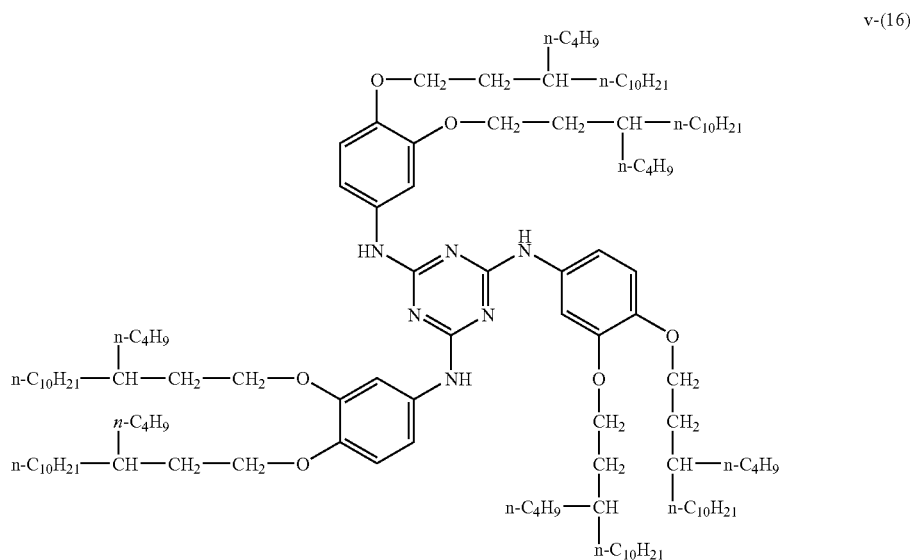
v-(16)

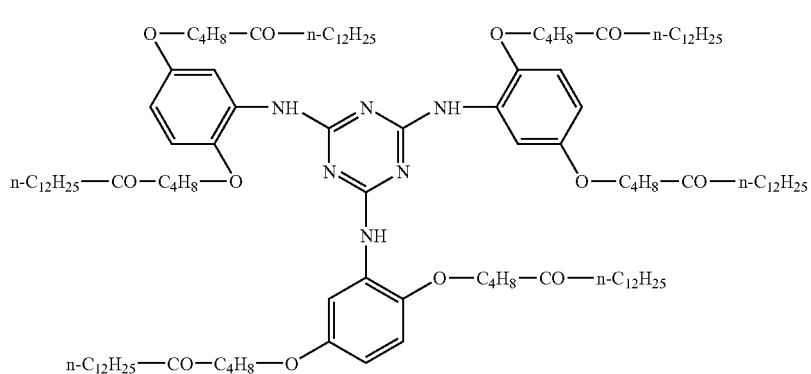
v-(17)
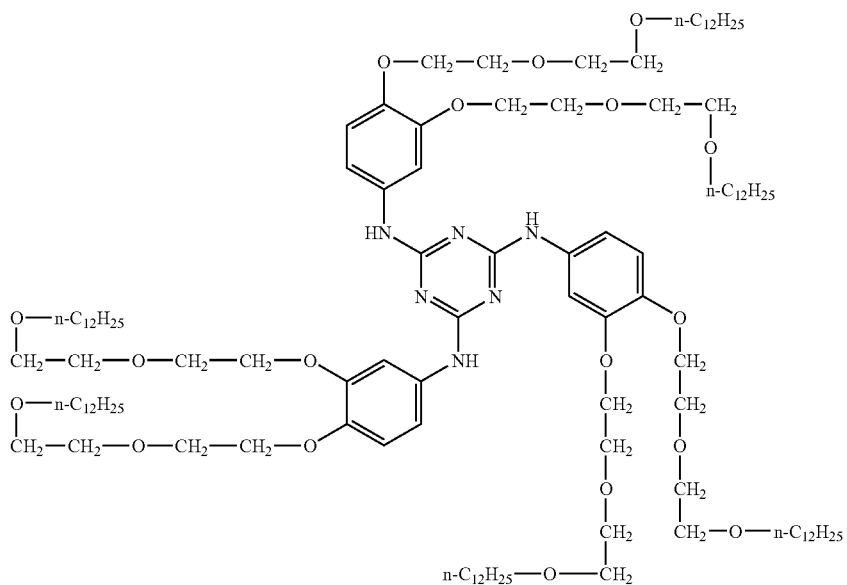
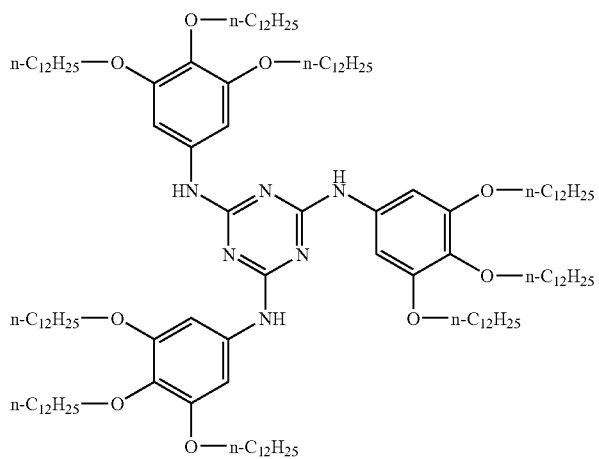
v-(19)

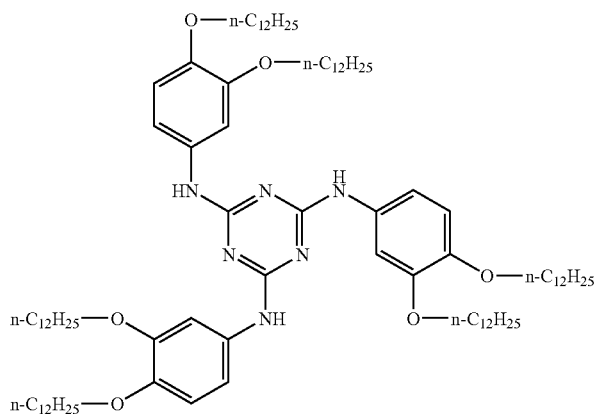
v-(20)
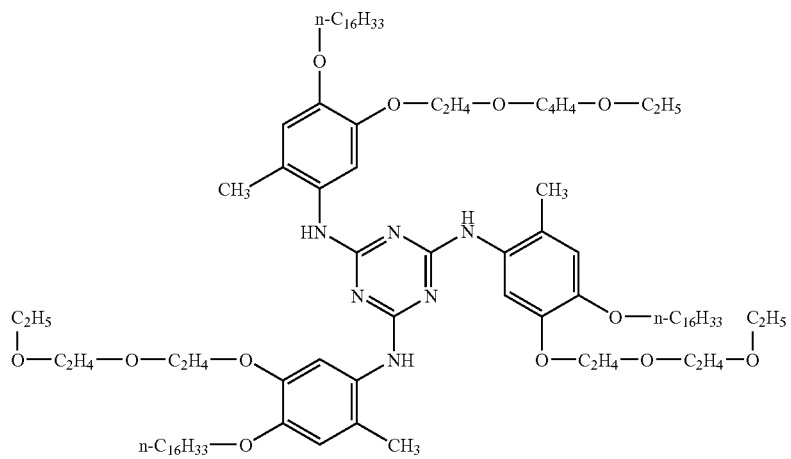
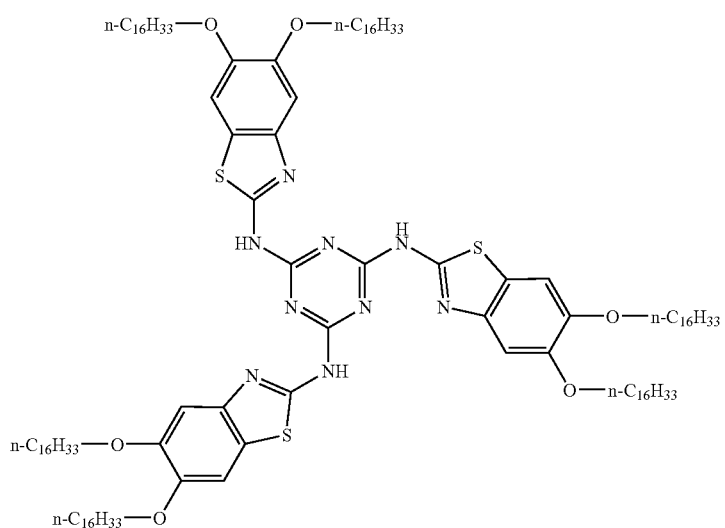
v-(22)

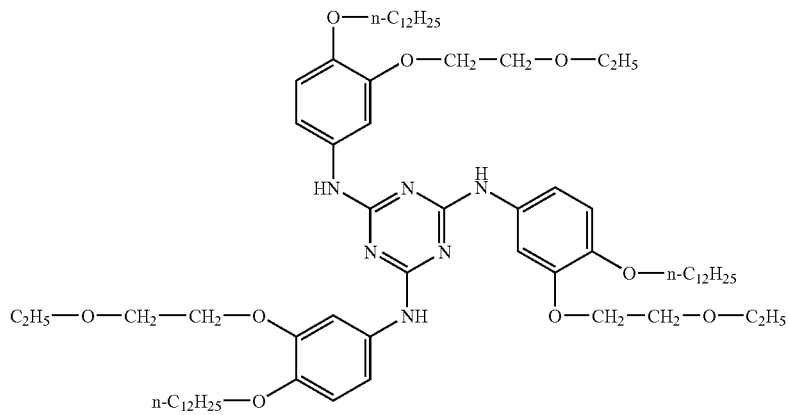
v-(23)
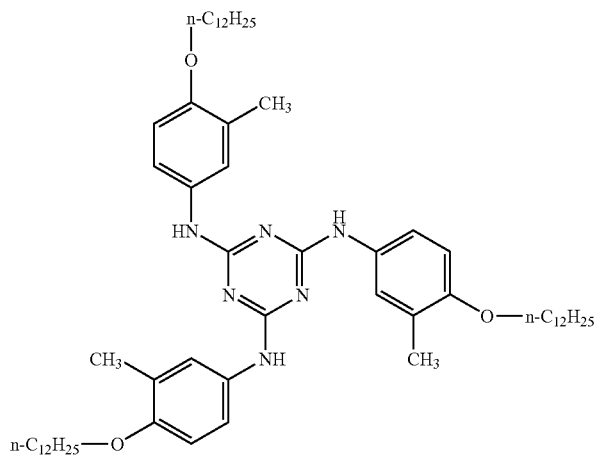
v-(24)
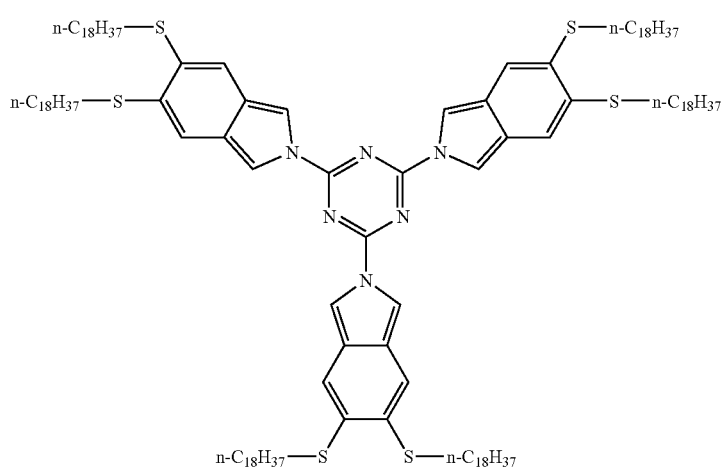
v-(25)

-continued
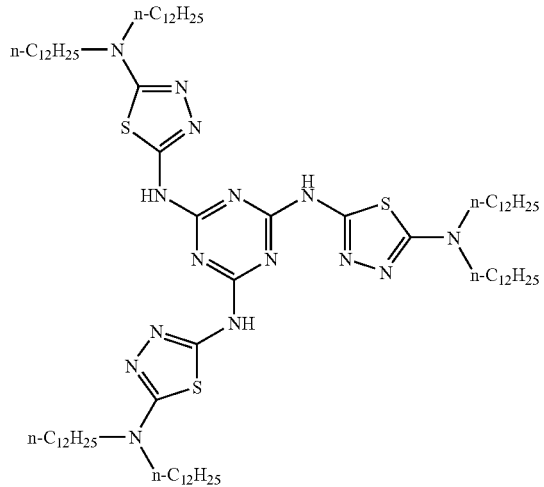
v-(26)
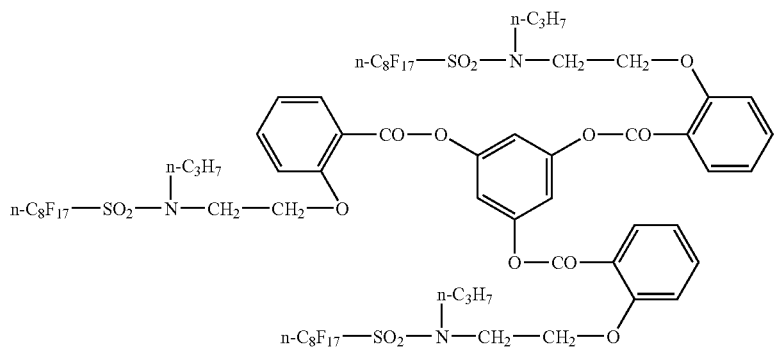
v-(27)
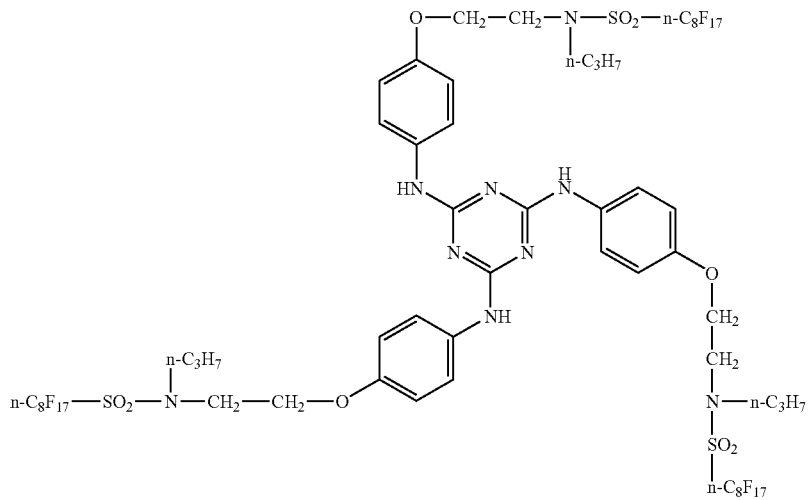
v-(28)

-continued
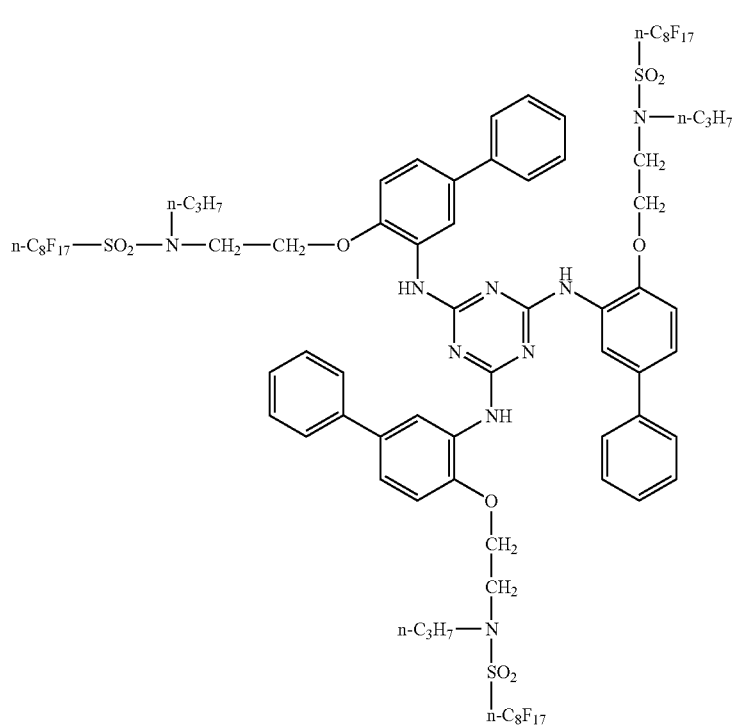
v-(29)
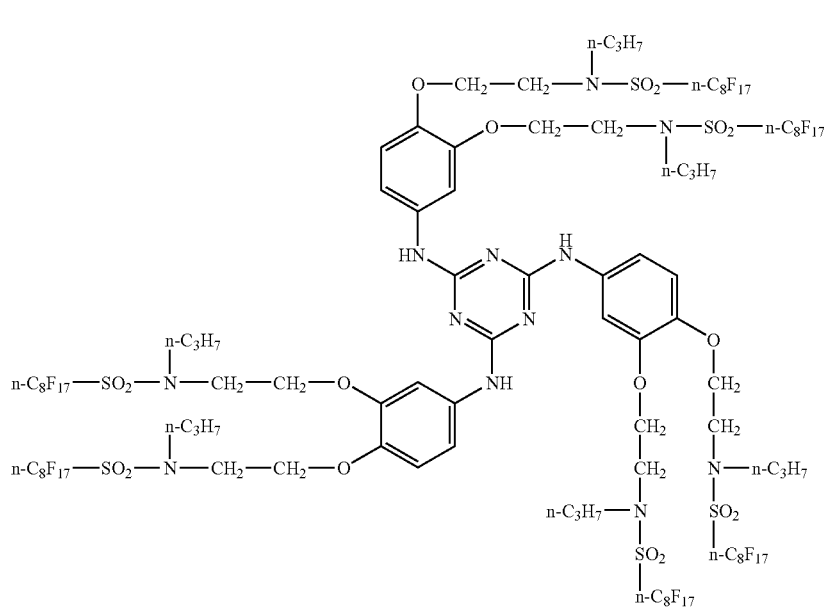
v-(30)

-continued
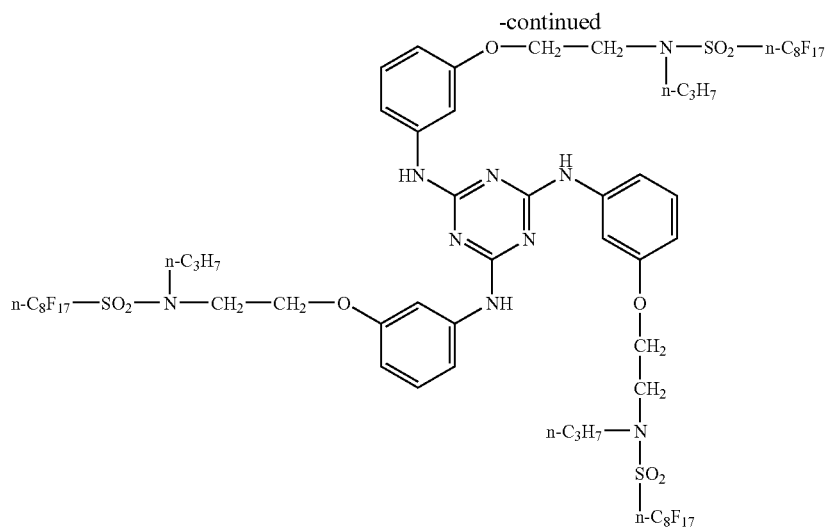
v-(32)
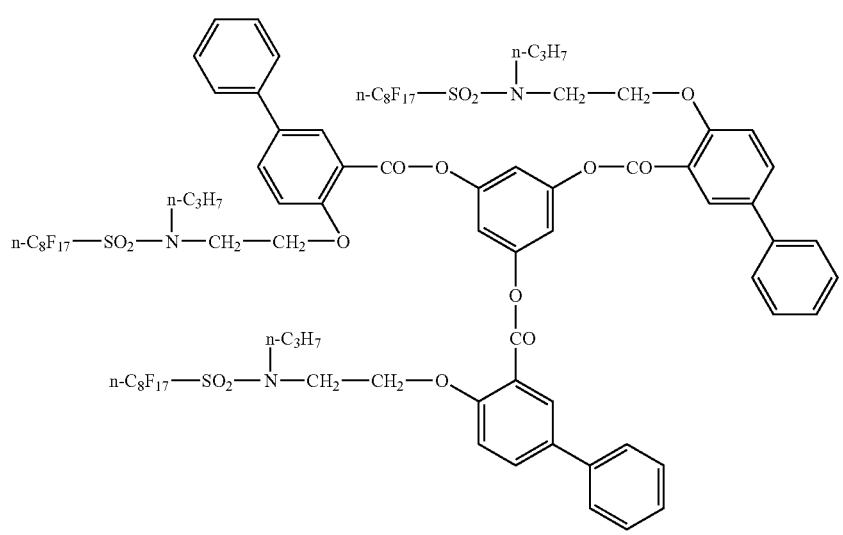
v-(33)
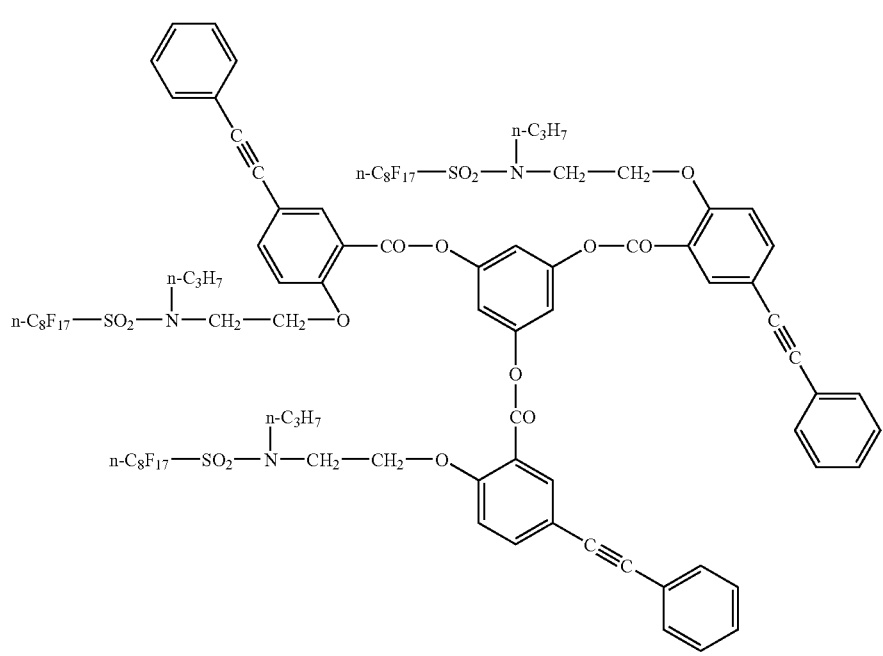

-continued
v-(34)
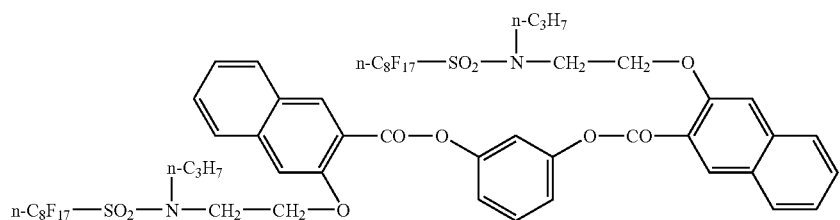
v-(35)
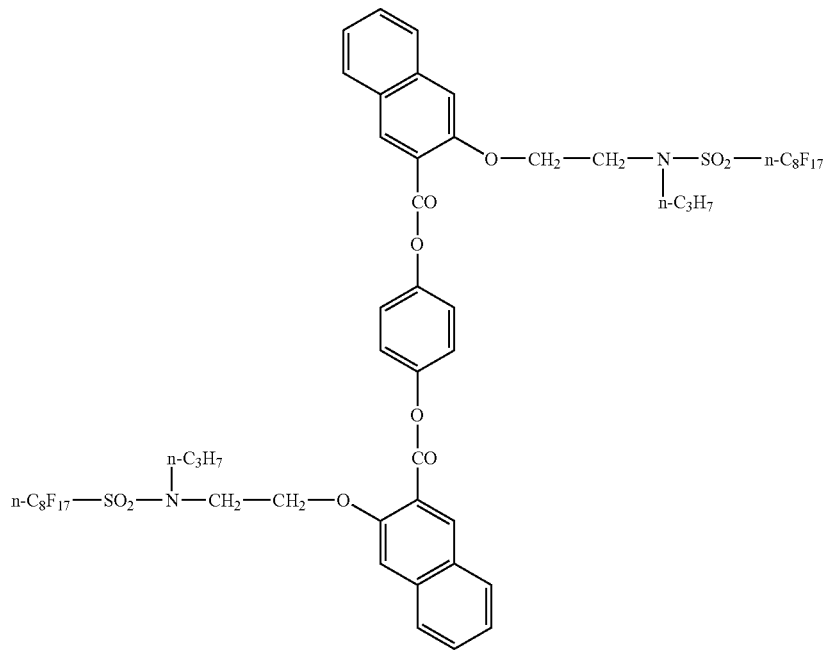
v-(36)
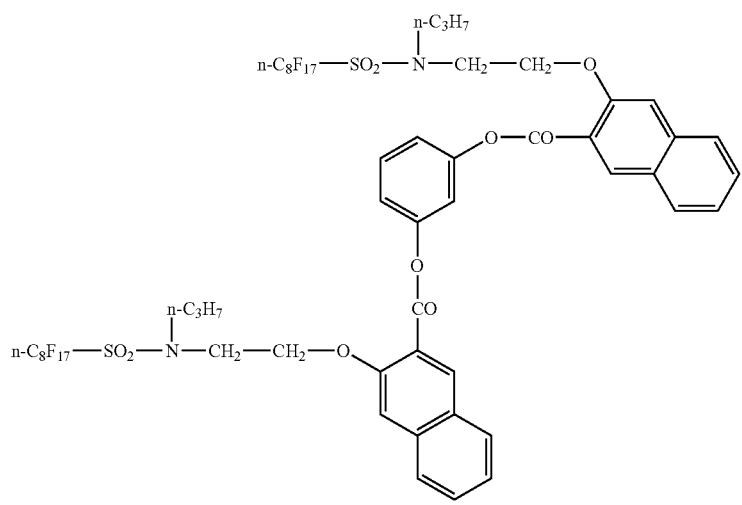

-continued
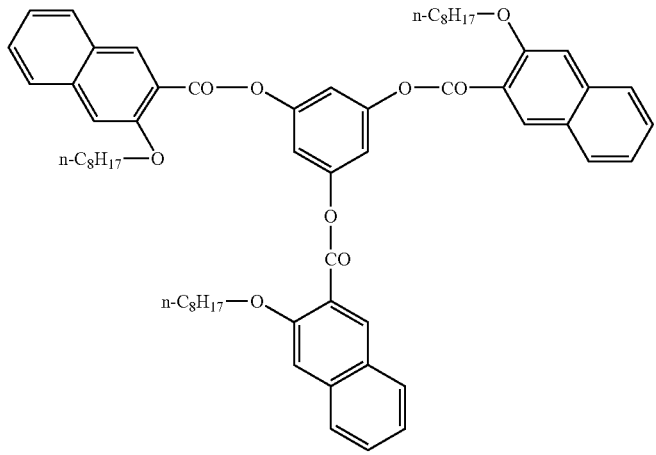
v-(37)
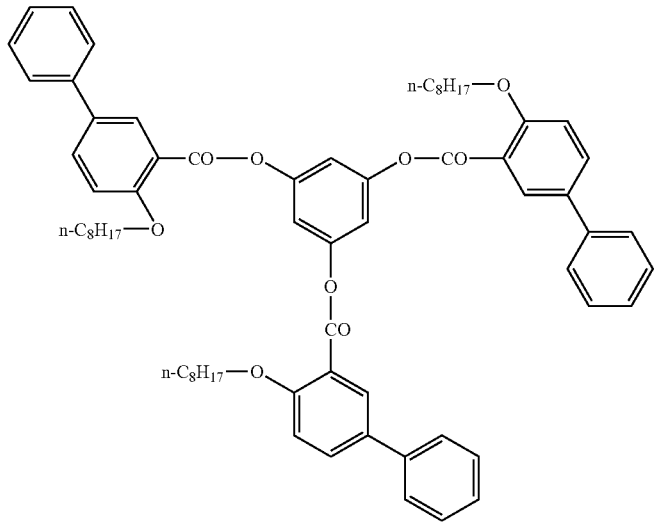
v-(38)
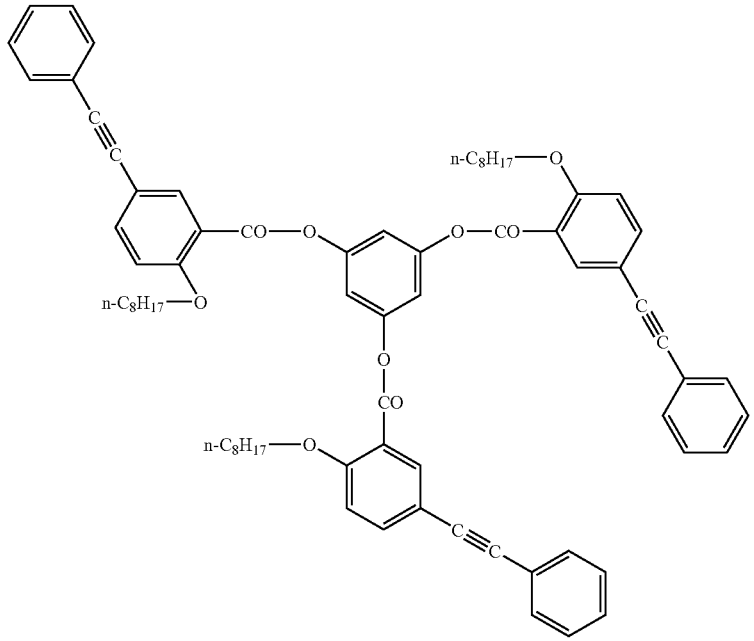
v-(39)

-continued
v-(40)
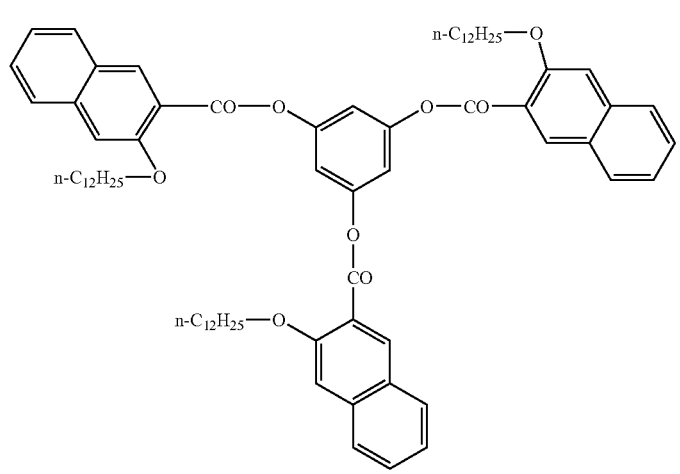
v-(41)
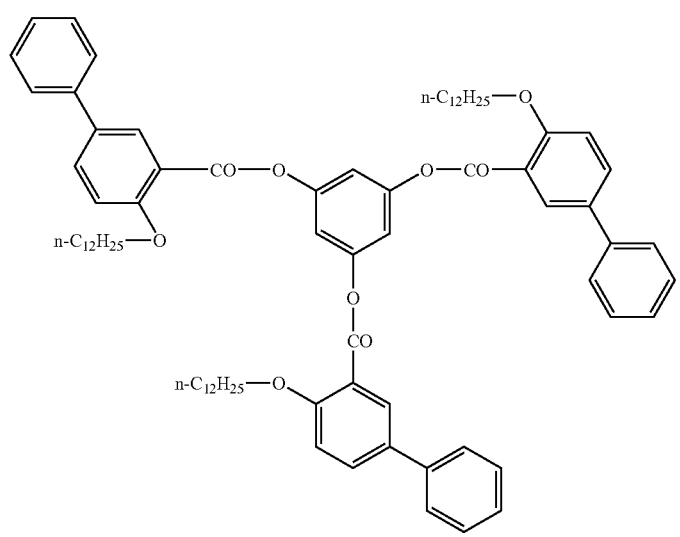
v-(42)
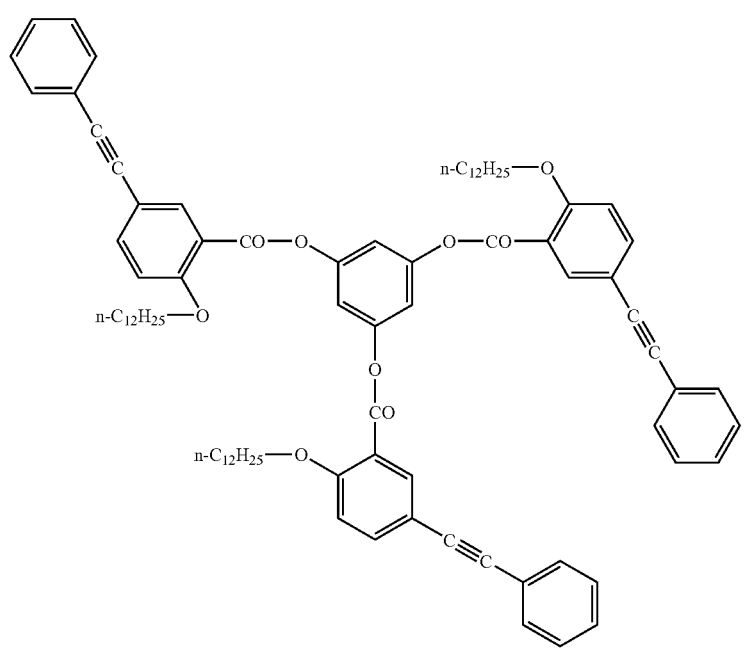

-continued
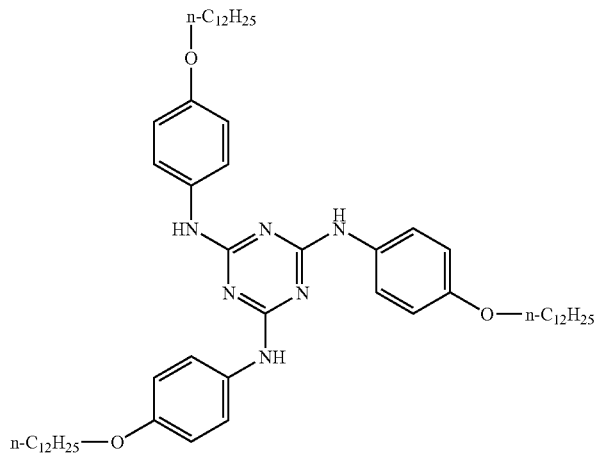
v-(43)
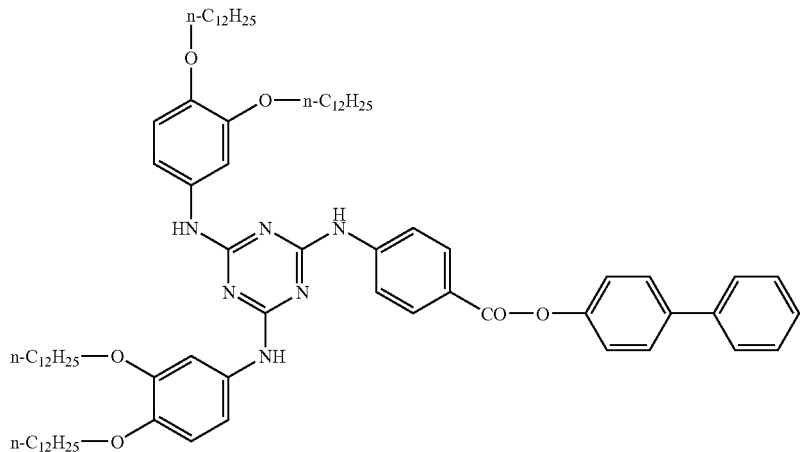
v-(44)
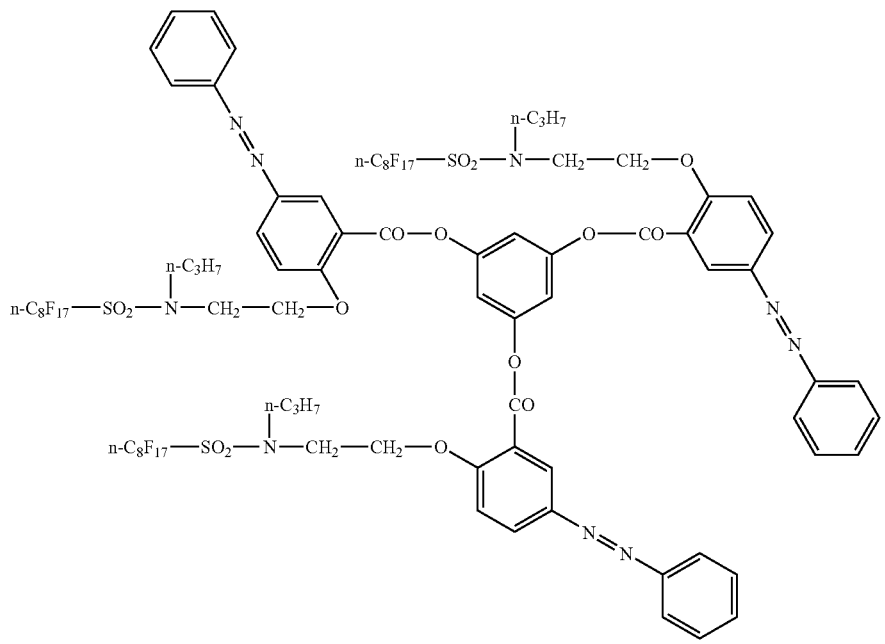
v-(45)

-continued v-(46)

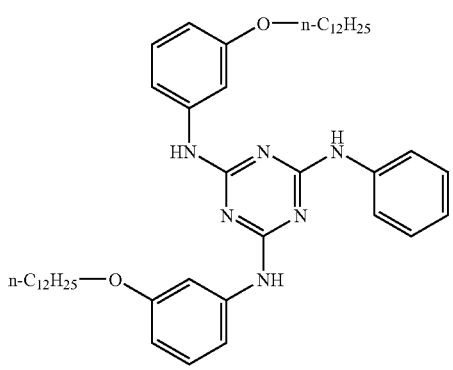

v-(47)

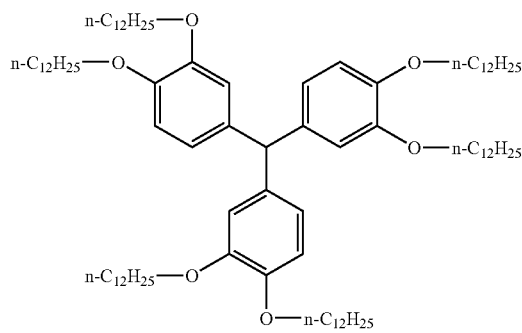

Next, among the aforementioned additives to the liquid-crystal layer, polymers are described in detail.

Any polymers which can be dissolved in a coating solution can be used for preparation of the lower or upper liquid-crystal layer. The specific examples of the polymers which can be employed in the present invention as an additive are shown bellow, however, polymers that can be employed in the present invention are not limited to these examples.

polypropylene oxide
polytetramethylene oxide
poly-ε-caprolactone
poly-ε-caprolactone diol
poly-ε-caprolactone triol
polyvinyl acetate
polymelamine
poly(ethylene adipate)
poly(1,4-butylene adipate)
poly(1,4-buthylene glutarate)
poly(1,2-buthylene glycol)
poly(1,4-buthylene succinate)
poly(1,4-buthylene terephthalate)
poly(ethylene terephthalate)
poly(2-mehyl-1,3-propyrene adipate)
poly(2-methyl-1,3-propyrene glutarate)
poly(neopentyl glycol adipate)
poly(neopentyl glycol sebacate)
poly(1,3-propyrene adipate)
poly(1,3-propyrene glutarate)
polyvinyl butyral
polyvinyl formal
polyvinyl acetal
polyvinyl propanal
polyvinyl hexanal
polyvinyl pyrrolidone
polyacrylate
polymethacrylate
poly(3-hydroxy butyric acid)

The polymer used as an additive is desirably a modified polyvinyl alcohol having a hydrocarbon group of 9 or less carbon atoms. The modified polyvinyl alcohols denoted by Formula (PX) are preferred.

-(VAl)$_x$-(HyD)$_y$-(VAc)$_z$-    Formula (PX)

In the Formula (PX), "Val" is a vinyl alcohol based repeating unit, "HyD" is a repeating unit having a hydrocarbon group of 9 or less carbon atoms and "VAc" is a vinyl acetate based repeating unit; x is 20 to 95 wt %, and desirably 25 to 90 wt %; y is 2 to 98 wt %, and desirably 10 to 80 wt %; and z is 0 to 30 wt %, and desirably 2 to 20 wt %. The term "hydrocarbon group" is used for any aliphatic groups, any aromatic groups and any combinations thereof. The aliphatic group may have a cyclic or straight or branched chain structure. The aliphatic group is desirably an alkyl group (including cycloalkyl group) or alkenyl group (including cycloalkenyl group). The hydrocarbon group may have at least one substituent. The number of the carbon atoms included in the hydrocarbon group is from 1 to 9, and desirably from 1 to 8.

The preferred "HyD", which is a repeating unit having a hydrocarbon group of 9 or less carbon atoms, is denoted by Formula (HyD-I) or (HyD-II).

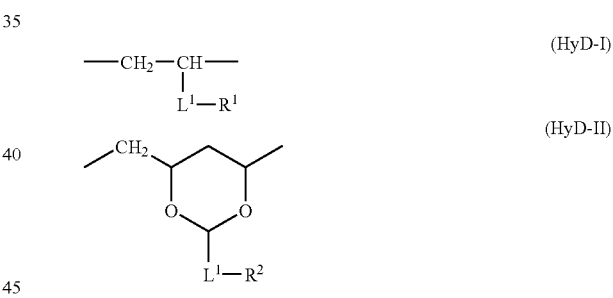

In the formulae, $L^1$ is a divalent linking group selected from the group consisting of —O—, —CO—, —SO$_2$—, —NH—, an alkylene group, arylene group and any combinations thereof; $L^2$ is a single bond or a divalent linking group selected from the group consisting of —O—, —CO—, —SO$_2$—, —NH—, an alkylene group, arylene group and any combinations thereof; and $R^1$ and $R^2$ respectively denote a hydrocarbon group of 9 or less carbon atoms. The specific examples of the linking groups formed of the aforementioned combinations are shown bellow.

L1: —O—CO—
L2: —O—CO-alkylene-O—
L3: —O—CO-alkylene-CO—NH—
L4: —O—CO-alkylene-NH—SO$_2$-arylene-O—
L5: -arylene-NH—CO—
L6: -arylene-CO—O—
L7: -arylene-CO—NH—
L8: -arylene-O—
L9: —O—CO—NH-arylene-NH—CO—

The specific examples of "HyD" are shown bellow.

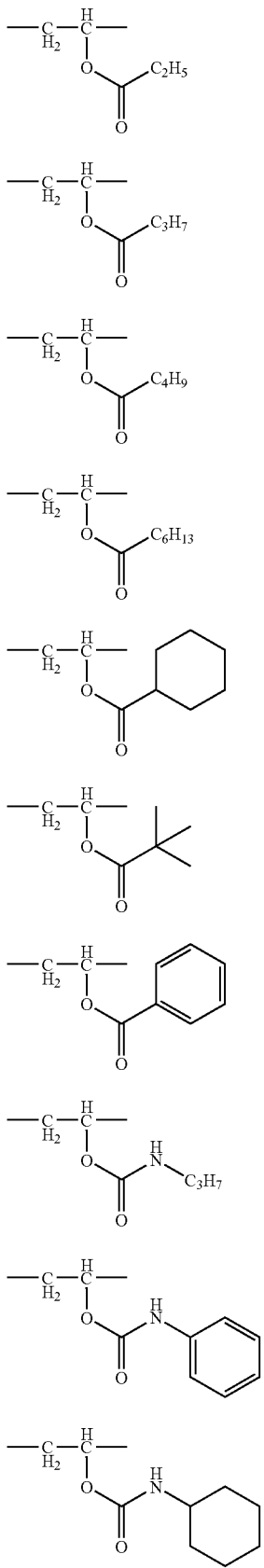
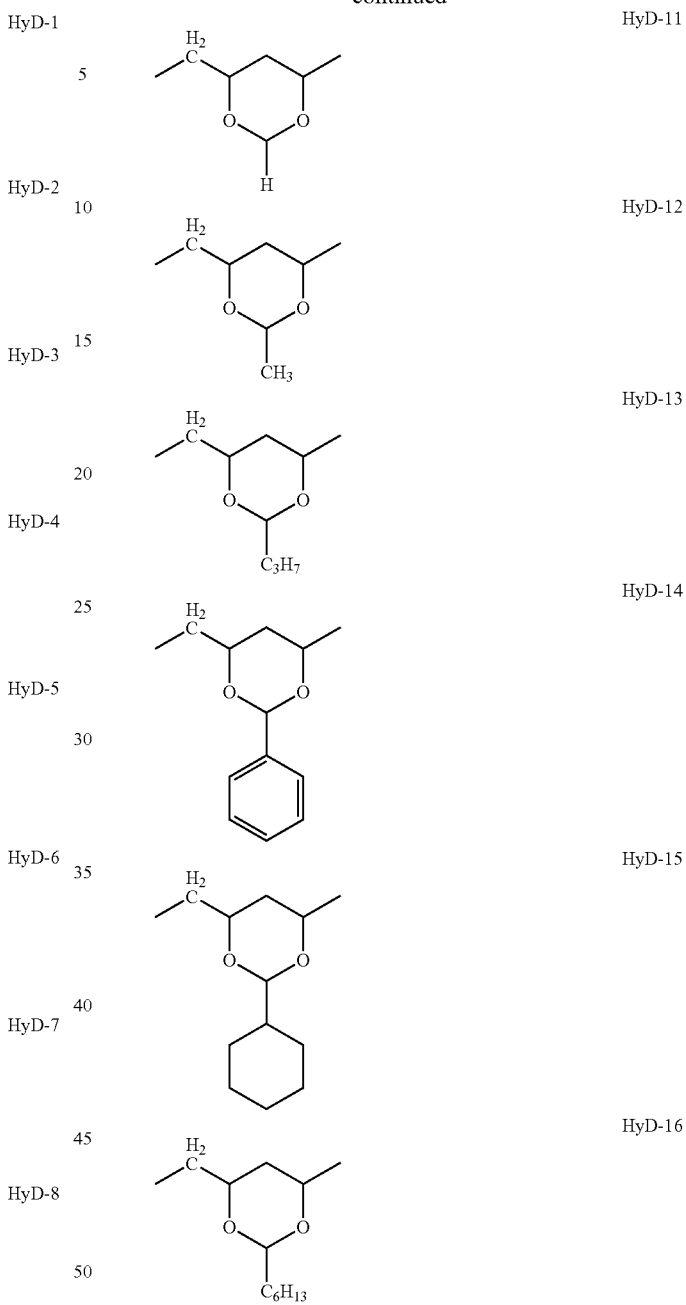

The polymer employed as an additive in the present invention preferably has a polymerization degree of 200 to 5,000 (more preferably 300 to 3,000) and a molecular weight of 9,000 to 200,000 (more preferably 13,000 to 130,000). Two or more species of the polymers can be used in combination.

The specific examples of the polymers are shown bellow, however, the polymer that can be employed in the present invention are not limited to these examples.

PX-1: -(VAl)$_{21}$-(HyD-13)$_{77}$-(VAc)$_2$-
PX-2: -(VAl)$_{14}$-(HyD-13)$_{84}$-(VAc)$_2$-
PX-3: -(VAl)$_{21}$-(HyD-16)$_{77}$-(VAc)$_2$-
PX-4: -(VAl)$_{34}$-(HyD-15)$_{64}$-(VAc)$_2$-
PX-5: -(VAl)$_{29}$-(HyD-12)$_{69}$-(VAc)$_2$-

PX-6: -(VAl)$_{46}$-(HyD-14)$_{52}$-(VAc)$_2$-
PX-7: -(VAl)$_{21}$-(HyD-2)$_{77}$-(VAc)$_2$-
PX-8: -(VAl)$_{17}$-(HyD-8)$_{85}$-(VAc)$_2$-
PX-9: -(VAl)$_{21}$-(HyD-13)$_{7}$-(VAc)$_2$-
PX-10: -(VAl)$_{46}$-(HyD-9)$_{52}$-(VAc)$_2$-

The amount of the such additive in the liquid-crystal layer is desirably from 0.05 to 10 wt %, preferably from 0.1 to 5 wt %, with respect to the weight of the liquid-crystalline compound.

Before being applied the coating solution for preparation of the upper layer, the surface of the lower layer is desirably subjected to a rubbing treatment. The rubbing treatment can be carried out by rubbing the surface of the lower layer comprising the aforementioned additive with a paper or cloth several times along a certain direction.

The additive may be used in the combination with at least one condensation agent. The condensation agent is desirably a compound having an isocyanate or formyl at the terminal end. The specific examples of the condensation agent are shown bellow, however, the condensation agents that can be employed in the present invention are not limited to these examples.

Poly(1,4-butane diol), isophorone diisocyanate terminated

Poly(1,4-butane diol), tolylene 2,4-diisocyanate terminated

Poly(ethylene adipate), tolylene 2,4-diisocyanate terminated

Poly(propylene glycol) tolylene 2,4-diisocyanate terminated 1,6-diisocyanate hexane
1,8-diisocyanateoctane
1,12-diisocyanatedecane
isophorone isocyanate
glyoxal The additive employed in the lower layer is desirably selected from non-liquid-crystalline polymers, and more desirably selected from non crystal polymers having a cross-linkable group. The term of "cross-linkable polymer" is hereinafter used for any non-liquid-crystalline polymers which have at least a cross-linkable group, namely a polymerizable group. When a liquid-crystal composition comprising a cross-linkable polymer is applied to the surface of a substrate (or an alignment layer) to form an optically anisotropic layer, the cross-linkable polymer may contribute to leveling the surface of the optically anisotropic layer at an air interface. Namely, the cross-linkable polymer may function as a leveling agent. When a retarder comprising plural laminated optically anisotropic layers is prepared according to the prior art, it is necessary to prepare an alignment layer between two adjacent optically anisotropic layers. On the other hand, according to the present invention, since the optically anisotropic layer comprising the cross-linkable polymer can play role similar to an alignment layer for an optically anisotropic layer disposed in contact with its surface, it is not necessary to prepare an alignment layer between two adjacent optically anisotropic layers. The cross-linkable polymer may migrate to the upper area of the lower layer to form an area containing the polymer in a high concentration at the surface of the lower layer. Applied treatment such as a rubbing treatment, the area containing a lager amount of the polymer can play role similar to an alignment layer for liquid-crystalline molecules in the upper layer disposed on the rubbed surface. Thus, the upper layer can be stably prepared without an alignment. Before being applied a composition for preparation of the upper layer, the surface of the lower layer containing the cross-linkable polymer is desirably subjected to a rubbing treatment. Carrying out the cross-linking reaction of the polymer, the lower optically anisotropic layer becomes to contain the cross-linked polymer, thereby improving the function as an alignment layer remarkably, specifically, thereby reducing the surface tackiness and increasing the solvent resistance of the surface of the lower layer.

From the above-mentioned viewpoint, namely, in order to exhibit a satisfying leveling ability and a satisfying property for migrating to an upper area of the layer to form an area containing the polymer in a high concentration at the surface, the cross-linkable polymer is required to be sufficiently hydrophobic to a liquid-crystalline compound used in the combination with the polymer. It is possible to estimate whether a cross-linkable compounds are phobic or philic to a liquid-crystalline compound from their structures with various factors such as Log P value, I/O value or SP value. We had studied about various cross-linkable polymers and as a result, we found that it is possible to estimate how excellent leveling-properties and polymer-condensed-area-forming-properties the polymers exhibit, with an anti-dispersion force component (hereinafter referred to as "δa value") of a SP value which can be calculated by Hoy's method, referred to "PROPERTIES OF POLYMERS (ED.3)" written by VAN KREVELEN, D. W., published from ELSEVIER in 1990. A δa value of a compound can be calculated with 3-dimensional SP values, δd, δp and δh, calculated by Hoy's method, by a following formula (1). According to the Hoy's method, δd, δp and δh can be calculated based on a molecular structure of the compound. A δa value of a co-polymer comprising plural repeating units can be obtained by substituting a square value of 3-dimensional SP value, δd², δp² and δh², of a co-polymer, which are respectively the sum of the products of a square value of a 3-dimensional SP value of an each repeating unit and a volume ratio of the repeating unit, in the following formula (1).

$$\delta a = (\delta p^2 + \delta h^2)^{0.5} \quad (1)$$

The cross-linkable polymer used in the present invention desirably has a smaller δa value than that of a liquid-crystalline compound used in the combination with it. The great difference in a δa value between the polymer and the liquid-crystalline compound is desired. The δa value of the liquid-crystalline compound minus the δa value of the polymer is desirably positive, preferably not smaller than 1.5 MPa$^{0.5}$. The desirable range of the remainder of the δa value of the liquid-crystalline compound minus the δa value of the polymer varies with various factors such as species of liquid-crystalline compounds and polymers, molecular weights thereof or temperature or times for aligning, and in general but not specifically limited to, the remainder is desirably from 0.5 to 20 MPa$^{0.5}$, preferably from 1.0 to 20 MPa$^{0.5}$, and more preferably from 2.0 to 20 MPa$^{0.5}$.

The examples of the cross-linkable group include any groups for addition reaction, condensation reaction or substituent conversion reaction. On the other hand, the liquid-crystalline compound used in the combination with the cross-linkable polymer may desirably have an ethylenic unsaturated group so as to be fixed by polymerization initiated by UV light irradiation with a photo-radical-polymerization initiator. Thus, the cross-linkable polymer desirably has a group capable of cross-linking initiated by UV light irradiation. The examples of cross-linking reaction include any open-ring polymerization reactions of heterocyclic compounds such as epoxy compounds or oxethane compounds in the combination with compounds generating cations by UV light irradiation; and any radical polymerization reactions of compounds having an ethylenic unsaturated group in combination with compounds generating radicals by UV light irradiation. In the present invention, the polymers having an ethylenic unsaturated group are desirable as a cross-linkable polymer. The reaction of the cross-linkable polymer may be carried out in various manners such as addition reaction, condensation reaction or substituent conversion reaction. The radical polymerization reaction is desirable because of for its simplicity. According to the present invention, the cross-linkable polymer comprising a repeating unit denoted by Formula (III) is desired as an additive.

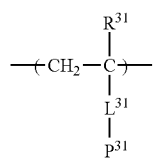

Formula (III)

In the Formula (III), $R^{31}$ is a hydrogen atom or C1–4 alkyl, and desirably a hydrogen atom or methyl; $P^{31}$ is a monovalent group having an ethylenic unsaturated group; $L^{31}$ is a single bond or divalent group, and desirably a single bond, —O—, an alkylene group, arylene group, *-COO—, *-CONH—, *-OCO— or *-NHCO— which are respectively bonded to a main chain at * side. $P^{31}$ is desirably a monovalent group including an acryloyl group, methacryloyl group or styryl group, and preferably a monovalent group including an acryloyl group or methacryloyl group.

The preferred embodiment of the formula (III) is an embodiment in which $R^{31}$ is hydrogen or methyl; $L^{31}$ is an arylene, *-COO—*-CONH— or *-OCO—; $P^{31}$ is a monovalent group including an acryloyl group, methacryloyl group or styryl group.

The specific examples of the repeating unit denoted by the Formula (III) are shown bellow, however, polymers that can be employed in the present invention are not limited to these examples.

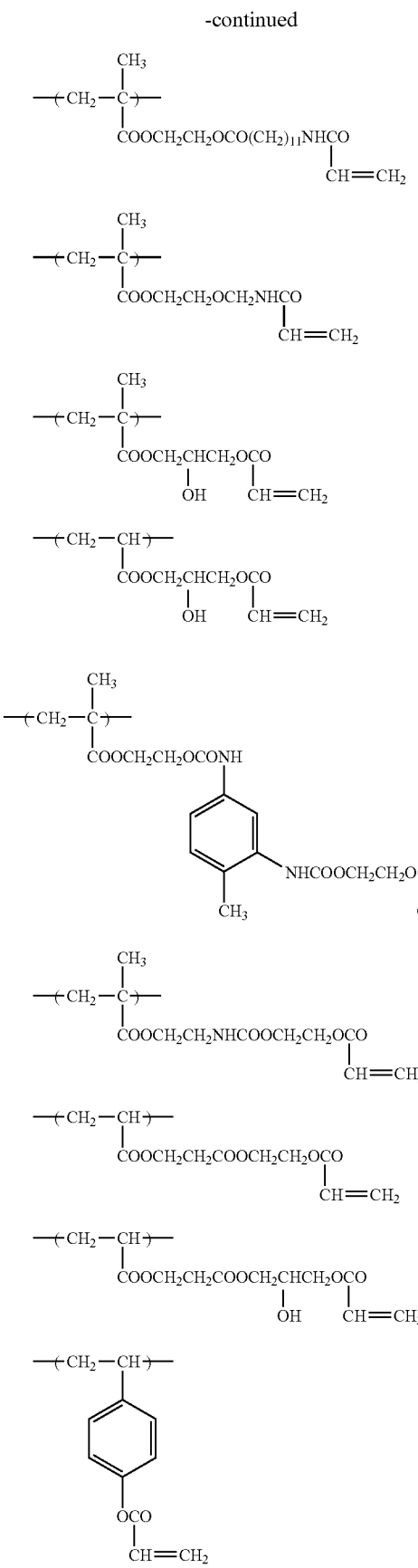
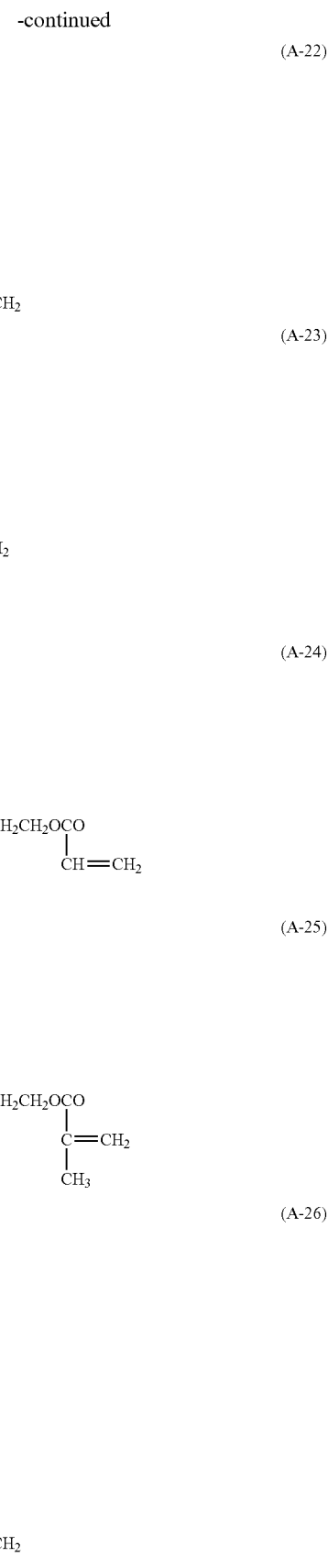

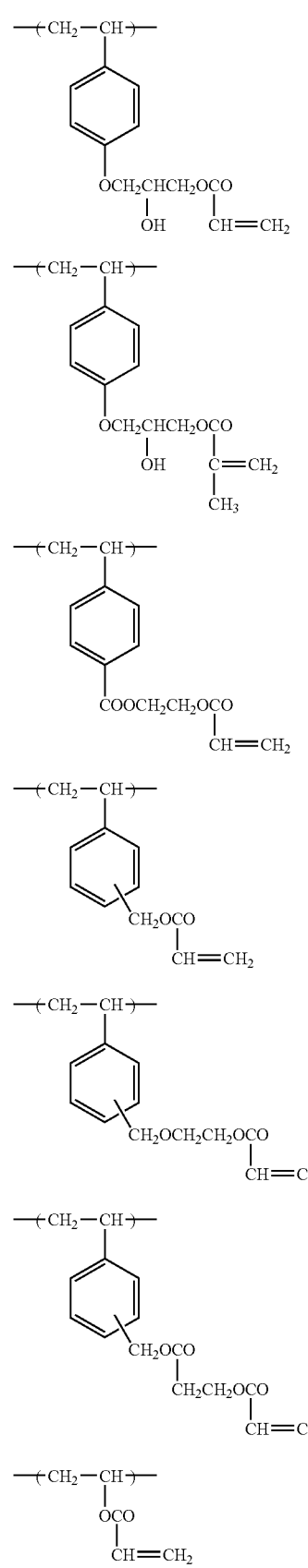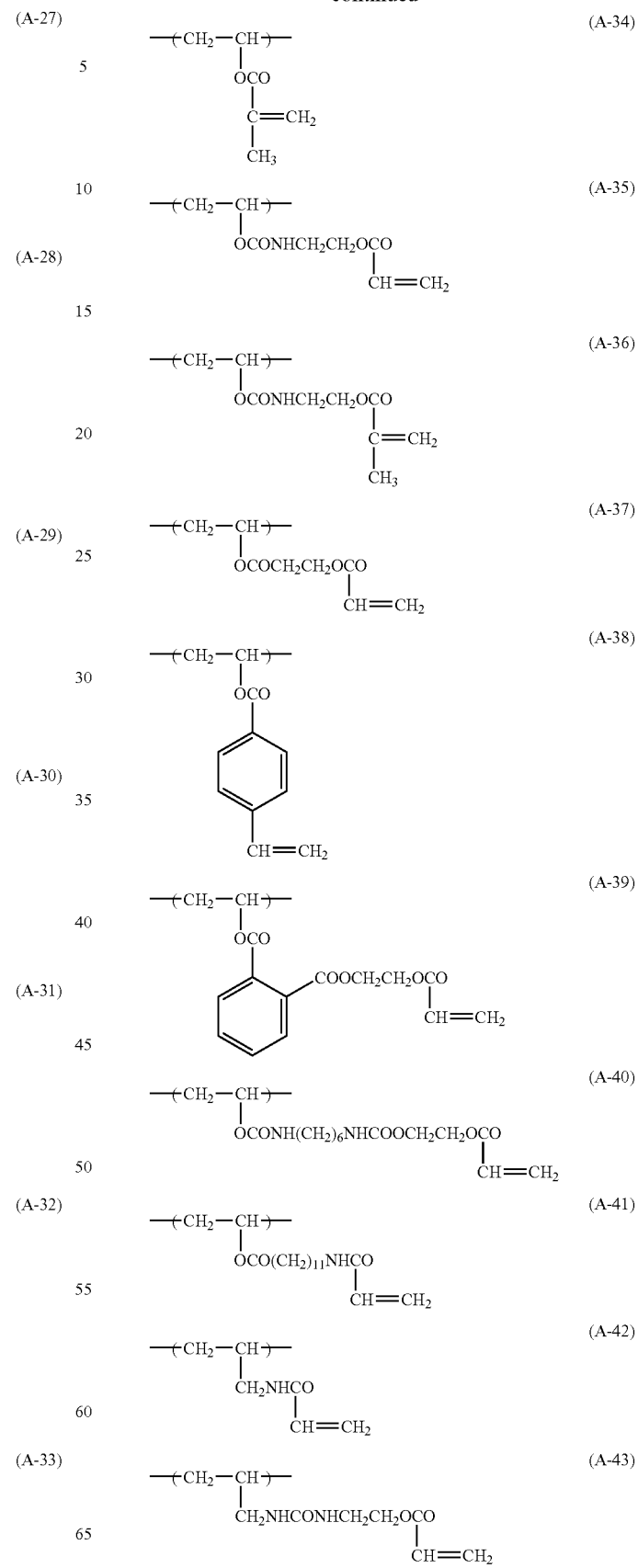

-continued

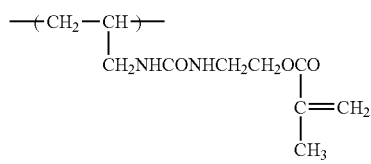

(A-44)

The cross-linkable polymer comprising a repeating unit denoted by the Formula (III) may be prepared by the process such as (a) polymerization of a monomer corresponding to the unit; (b) polymer reaction for introducing an ethylenic unsaturated group to a polymer; or a combination of (a) and (b). Radical polymerization, cation polymerization or anion polymerization may be utilized in (a) or (b) process. In the case of the (a) process, it is necessary to utilize the difference of activities between the ethylenic unsaturated group exhausted during the polymerization, and the ethylenic unsaturated group surviving the polymerization and remaining in the polymer as a cross-linkable group. For example, to prepare a cross-linkable polymer comprising a repeating unit denoted by the formula (III), in which $P^{31}$ is a monovalent group including an acryloyl group or methacroyl group, by the (a) process, cation polymerization may be carried out. In the case of preparing a cross-linkable polymer having a repeating unit denoted by the formula (III), in which $P^{31}$ is a monovalent group including a styryl group, by the (a) process, gelation proceeds easily during any types of polymerizations such as a radical, cation or anion polymerization. Thus, such polymers are desirably prepared by the (b) process.

The (b) process utilizing a polymer reaction is useful since cross-linkable polymers having any kinds of cross-linkable groups can be prepared by it. The cross-linkable polymers may be prepared by processes utilizing a polymer reaction such as I) a process comprising preparing a precursor polymer having a function capable turning into an ethylenic unsaturated group, and carrying out a reaction (e.g., an elimination reaction, oxidation reaction reduction reaction, de-protection reaction) of the precursor to change the function group into an ethylenic unsaturated group, which is carried out in the manner similar to an elimination of hydrochloride from 2-chloroethylene; II) a process comprising preparing a polymer having a function group and carrying out a reaction of the polymer and a compound having both of an ethylenic unsaturated group and a function group capable of reacting and forming a covalent binding with the function group of the polymer (such a compound is hereinafter referred to as "reactivity monomer"); or any combinations of I) and II). The II) process may utilize any reactions capable of forming a covalent binding generally known in the organic chemistry field. Since the cross-linkable polymer polymerizes and sets to gel during the II) process, the reaction is desirably carried out at low temperature, in particular desirably at not higher than 60 degrees Celsius and more desirably at not higher than room temperature. For promoting the reaction, a catalyst may be used in the reaction and for inhibiting gelation, a polymerization inhibitor may be used in the reaction.

The preferred combinations of function groups capable of reacting and forming a covalent binding each other are described bellow, however, the present invention is not limited to these examples.

The examples of the function group combinations capable of reacting each other under heating or at room temperature include (i) combinations of hydroxy and epoxy, isocyanate, N-methylol, carboxy, alkyl halide, acid anhydride, acid chloride, activated ester such as a sulfate, formyl or acetal; (ii) combinations of isocyanate and hydroxy, mercapto, amino, carboxy or N-methylol; (iii) combinations of carboxy and epoxy, isocyanate, amino or N-methylol; (iv) combinations of N-methylol and isocyanate, N-methylol, carboxy, amino or hydroxy; (v) combinations of epoxy and hydroxy, amino, mercapto, carboxy and N-methylol; (vi) combinations of vinyl sulfone and sulfinic acid or amino; (vii) combinations of formyl and hydroxy, mercapto or activated methylene; (viii) combinations of mercapto and formyl, vinyl such as allyl or acryl, epoxy, isocyanate, N-methylol, carboxy, alkyl halide, acid anhydride, acid chloride or activated ester such as sulfate; (ix) combinations of amino and formyl, vinyl such as allyl or acryl, epoxy, isocyanate, N-methylol, carboxy, acid anhydride, acid chloride or activated ester such as sulfate.

The examples of reactivity monomers, but not specifically limited to, include vinyl monomers having a hydroxy such as hydroxyethyl acrylate, hydroxyethyl methacrylate, allyl alcohol, hydroxypropyl acrylate or hydroxypropyl methacrylate; vinyl monomers having an isocyanate such as isocyanate ethyl acrylate or isocyanate ethyl methacrylate; vinyl monomers having an N-methylol such as N-methylol acrylamide or N-methylol methacrylamide; vinyl monomers having an epoxy such as glycidyl acrylate, glycidyl methacrylate, allyl glycidyl ether or "CYCLOMER-M100" or "A200" (manufactured by DAICEL CHEMICAL INDUSTRIES, LTD.); vinyl monomers having a carboxy such as acrylic acid, methacrylic acid, itaconic acid, carboxy ethyl acrylate or vinyl benzoate; vinyl monomers having an alkyl halide group such as chloromethyl styrene, 2-hydroxy-3-chloropropyl methacrylate or 2-hydroxy-3-chloropropyl methacrylate; vinyl monomers having an acid anhydride group such as maleic anhydride; vinyl monomers having a formyl group such as acrolein or methacrolein, vinyl monomers having a sulfinic acid group such as styrene potassium sulfinate; vinyl monomers having an activated methylene group such as acetoxyethyl methacrylate, vinyl monomers having a vinyl group such as allyl methacrylate or allyl acrylate; monomers having acid chloride group such as acryloyl chloride or methacryloyl chloride; and vinyl monomers having an amide such as allyl amine.

The polymers having a function group, which can be used in the II) process, may be prepared by polymerization of a reactivity monomer having both of a reactivity function group and an ethylenic unsaturated group. The polymers may be also prepared by a substituent conversion reaction of a polymer obtained by polymerization of a low-reactivity precursor monomer, being carried out in the same manner as a polyvinyl alcohol is prepared by modification of a polyvinyl acetate. In these cases, the polymerization is desirably carried out in a radical polymerization manner because of its simplicity.

The cross-linkable polymer comprising a repeating unit denoted by the Formula (III) maybe a copolymer, that is, comprise two or more repeating units denoted by the Formula (III) or comprise a repeating unit other than that denoted by the Formula (III) such as a repeating unit not having ethylenic unsaturated group. The cross-linkable polymer desirably comprises a repeating unit denoted by the Formula (III) and a repeating unit not denoted by the Formula (III), in order to adjust a Tg or a hydrophilicity-hydrophobicity balance of the polymer to a proper range, or to regulate an amount of an ethylenic unsaturated group in the polymer. The repeating unit not denoted by the Formula (III) may be introduced into the polymer by (a') co-polymerization of a monomer corresponding to the repeating monomer; (b') polymer reaction of a polymer obtained by polymerization of a precursor monomer which can react in a manner of a substituent conversion reaction; or a combination process of (a') and (b').

The examples of monomers used in the (a') process, in other words of monomers corresponding to the repeating unit not denoted by the Formula (III), include esters or amides derived from acrylic acids or α-alkyl acrylic acids (e.g., methacrylic acid), such as N-i-propyl acrylamide, N-n-butyl acrylamide, N-t-butyl acrylamide, N,N-dimethyl acrylamide, N-methyl methacrylamide, acrylamide, 2-acrylamide-2-methylpropane sulfonic acid, acrylamide propyltrimethyl ammonium chloride, methacrylamide, diacetone acrylamide, acryloyl morpholine, N-methylol acrylamide, N-methylol methacrylamide, methyl acrylate, ethyl acrylate, hydroxyethyl acrylate, n-propyl acrylate, i-propyl acrylate, 2-hydroxypropyl acrylate, 2-methyl-2-nitropropyl acrylate, n-butyl acrylate, i-butyl acrylate, t-butyl acrylate, t-pentyl acrylate, 2-methoxyethyl acrylate, 2-ethoxyethyl acrylate, 2-methoxyethyl acrylate, 2,2,2-trifuloroethyl acrylate, 2,2-dimethylbutyl acrylate, 3-methoxybutyl acrylate, ethylcarbitol acrylate, phenoxyethyl acrylate, n-pentyl acrylate, 3-pentyl acrylate, octafluoropentyl acrylate, n-hexyl acrylate, cyclohexyl acrylate, cyclopentyl acrylate, cetyl acrylate, benzyl acrylate, n-octyl acrylate, 2-ethylhexyl acrylate, 4-methyl-2-propylpentyl acrylate, heptadecafluorodecyl acrylate, n-octadecyl acrylate, methyl methacrylate, 2,2,2-trifluoroethyl methacrylate, tetrafluoropropyl methacrylate, hexafluoropropyl methacrylate, hydroxyethyl methacrylate, 2-hydroxypropyl methacrylate, n-butyl methacrylate, i-butyl methacrylate, sec-butyl methacrylate, n-octyl methacrylate, 2-ethylhexyl methacrylate, 2-methoxyethyl methacrylate, 2-ethoxyethyl methacrylate, benzyl methacrylate, heptadecafluorodecyl methacrylate, n-octadecyl methacrylate, 2-isobornyl methacrylate, 2-norbornyl methacrylate, 5-norbornene-2-yl methyl methacrylate, 3-methyl-2-norbornylmetyl methacrylate or dimethylaminoethyl methacrylate; acrylic acid; α-alkyl acrylic acids such as methacrylic acid or itaconic acid; vinyl esters such as vinyl acetate; esters derived from maleic acids or fumaric acids, such as dimethyl maleate, dibutyl maleate or diethyl fumarate; maleimides such as N-phenyl maleimide; maleic acid; fumaric acid; p-sodium sulfonate styrene; acrylonitrile; methacrylonitrile; dienes such as butadiene, cyclopentadiene or isoprene; vinyl aromatic compounds such as styrene, p-chloro styrene, t-butyl styrene, α-methyl styrene or styrene sodium sulfate; N-vinyl pyrrolidone; N-vinyl oxazolidine; N-vinyl succinimido; N-vinyl formamide; N-vinyl-N-methyl formamide; N-vinyl acetamide; N-vinyl-N-methyl acetamide; 1-vinyl imidazole; 4-vinyl pyridine; vinyl sulfone; vinyl sodium sulfonate; allyl sodium sulfonate; methacryl sodium sulfonate; vinylidene chloride; vinyl alkyl ethers such as methylvinyl ether; ethylene; propylene; 1-butene and isobutene.

One or more monomers selected from the above examples may be used in the (a') process. Vinyl monomers described in Research Disclosure No. 1955 (1980, July) may also be used.

Among them, esters or amides derived from acrylic acid and methacrylic acid, or vinyl aromatic compounds are desired as a vinyl monomer corresponding to the repeating unit not denoted by the Formula (III).

The copolymer comprising a repeating unit having a precursor function group or a reactivity function group may be obtained during the (b) process when the cross-linkable group included in a repeating unit denoted by the Formula (III) is introduced by a polymer reaction and the polymer reaction is not terminated.

According to the (b') process, in particular according to the process comprising polymerization step of a precursor monomer which can react in a manner of a substituent conversion reaction and a polymer reaction step of the obtained polymer, almost all kinds of the repeating units, derived from a vinyl monomer, not having an ethylenic unsaturated group can be introduced into a polymer. On the other hand, the cross-linkable polymer comprising a repeating unit denoted by the Formula (III) may comprise a repeating unit not denoted by the Formula (III) which is introduced into the polymer only by a polymer reaction. The typical examples of such polymers include polyvinyl alcohols which are obtained by modification of a polyvinyl acetate and polyvinyl butyrals which are obtained by acetalization of a polyvinyl alcohol. The specific examples of such polymers are shown bellow, however, the present invention is not limited to these examples.

(N-1)

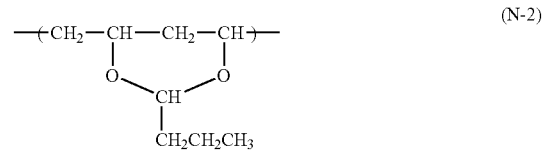

(N-2)

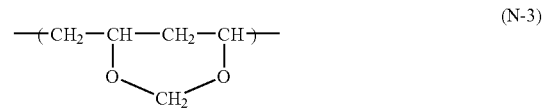

(N-3)

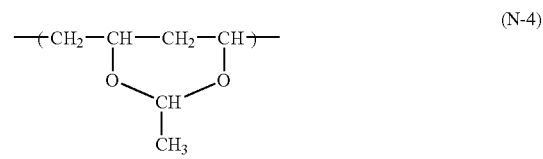

(N-4)

The amount of the repeating unit denoted by the Formula (III) with respect to weight of the cross-linkable polymer is desirably from 0.5 wt % to 100 wt %, preferably from 2 wt % to 100 wt % and more preferably from 5 wt % to 100 wt %.

The molecular weight of the cross-linkable polymer is desirably from 1,000 to 1,000,000, preferably from 3,000 to 200,000 and more preferably from 5,000 to 100,000.

The specific examples of the cross-linkable polymer comprising a repeating unit denoted by the Formula (III) are shown in Table bellow, however, the additive which can be employed in the present invention is not limited to these examples. In the Table, repeating units denoted by the Formula (III) and polyvinyl alcohol based repeating units are respectively specified by the above-mentioned example numbers, repeating units derived from a co-polymerizable monomer are specified by a compound name, and the constituent ratios of the polymers are respectively shown by wt %.

| | Constitution of repeating units | Constituent ratio (wt %) |
|---|---|---|
| K-1 | A-1/n-butyl methacrylate | 45/55 |
| K-2 | A-1/n-butyl methacrylate | 15/85 |
| K-3 | A-2/styrene | 50/50 |
| K-4 | A-1/n-dodecyl methacrylate | 70/30 |
| K-5 | A-1/n-butyl methacrylate/hydroxyethyl methacrylate | 15/60/25 |
| K-6 | A-1/n-butyl methacrylate/methacrylic acid | 10/80/10 |
| K-7 | A-1/benzyl methacrylate | 10/90 |
| K-8 | A-9/cyclohexyl methacrylate | 30/70 |
| K-9 | A-1/n-butyl acrylate/ethyl acrylate | 30/60/10 |
| K-10 | A-1/2-ethylhexyl methacrylate/N,N-dimethylacrylamide | 15/70/15 |
| K-11 | A-2/A-11 | 30/70 |
| K-12 | A-21 | 100 |
| K-13 | A-7/n-butyl methacrylate/hydroxyethyl methacrylate | 30/65/5 |
| K-14 | A-1/n-butyl methacrylate/glycidyl methacrylate | 30/50/20 |
| K-15 | A-2/n-butyl methacrylate/N-phenyl maleimide | 30/40/30 |
| K-16 | A-33/N-2/vinyl acetate | 37/61/2 |
| K-17 | A-33/N-2/vinyl acetate/N-1 | 4/75/2/19 |
| K-19 | A-34/N-2/vinyl acetate/N-1 | 23/65/2/10 |
| K-20 | A-36/N-2/vinyl acetate/N-1 | 10/70/2/18 |

The amount of the cross-linkable polymer in the composition used for preparation of the lower layer is desirably less than that of a liquid-crystalline compound used in combination so as not to lower an optical property, that is, a major component of the composition is desirably the liquid-crystalline compound. In particular, the amount of the cross-linkable polymer is desirably from 0.01 to 20 wt %, preferably fro 0.1 to 10 wt % and more preferably from 0.5 to 5 wt % with respect to the total amount of the liquid-crystalline compound. Two or more species of the cross-linkable polymers may be added to the composition. Unless the effect of the present invention is lowered, a non-cross-linkable polymer may be used in the combination with the cross-linkable polymer.

[Substrate]

The substrate is transparent desirably. In particular, the substrate preferably has a transmittance of 80% or more. The substrate with low wave length dispersion is used desirably. In particular, the substrate has an Re400/Re700 ratio of less than 1.2 desirably. The substrate has a small optical an isotropy desirably. In particular, the substrate desirably has an in-plane retardation (Re) of 20 nm or less, and more preferably 10 nm or less. The long substrate has the form of a roll or a rectangular sheet. Preferably, the upper and lower layers are laminated on a substrate in the form of a roll, and then the laminated roll is cut into a desired size.

Materials for the substrate include, but not specifically limited to, glass plates or polymer films, among which polymer films are preferred to obtain light-weight thin-layer products. Examples of polymers include cellulose esters, polycarbonates, polysulfones, polycycloolefin, polyether sulfones, polyacrylates and polymethacrylates, preferably cellulose esters, more preferably acetyl cellulose, most preferably triacetyl cellulose. The polymer films are preferably formed by solvent casting. The thickness of the transparent substrate is preferably 20 to 500 micro meters, more preferably 50 to 200 micro meters. The transparent substrate may be subjected to a surface treatment (e.g., glow discharge treatment, corona discharge treatment, UV treatment, flame treatment) to improve adhesion between the transparent substrate and the overlying layer (an adhesive layer, orthogonal alignment layer or optically anisotropic layer). An adhesive layer (undercoat layer) may be provided on the transparent substrate.

[Preparation of Broad Band Quarter Wave Plates]

According to the present invention, a broad band quarter wave plate may be prepared by a process comprising following (i) to (vi) steps;

(i) a step of preparing a layer on a transparent substrate;

(ii) a step of rubbing a surface of the layer to form an alignment layer;

(iii) a step of applying a composition comprising a liquid-crystalline compound and an additive, desirably cross-linkable polymer, to the rubbed surface of the alignment layer;

(iv) a step of aligning the liquid-crystalline molecules, if necessary under heating, and fixing them in an alignment state by irradiation with UV light to form a lower optically anisotropic layer which can generate a phase difference of π or π/2;

(v) a step of rubbing a surface of the lower optically anisotropic layer in a direction inclined at 60 degrees relative to a slow axis of the lower optically anisotropic layer;

(vi) a step of applying a composition comprising a liquid-crystalline compound to form an upper optically anisotropic layer.

When the retarder comprises plural layers formed of fixed liquid-crystalline molecules in an alignment state, at least one of the layers must comprises a cross-linkable polymer, and needless to say, all of them can comprise a cross-linkable polymer. Adding a cross-linkable polymer to the upper layer may bring about desirable effects such as preventing the surface of the upper layer being sticky or preventing a component of the top layer transferring to a cloth rubbing the surface of the upper layer, however, it is not needed necessarily.

[Circular Polarizer]

The retarder of the present invention can be especially advantageously used as quarter wave plates in reflective liquid-crystal display devices, quarter wave plates in pickups for writing on optical discs, or quarter wave plates in anti-reflection coatings. Typically, quarter wave plates are used as circular polarizers in combination with linear polarizer films. Thus, retarders can be easily incorporated into intended devices such as reflective liquid-crystal display devices when they are combined with linear polarizer films to form circular polarizers.

Linear polarizer films used in the present invention include iodine-based polarizer films, dye-based polarizer films including dichroic dyes and polyene-based polarizer films. Iodine-based polarizer films and dye-based polarizer films are typically prepared with polyvinyl alcohol-based films. The transmission axis of the linear polarizer film usually corresponds to the direction perpendicular to the drawing direction of the film. The linear polarizer film typically has a protective film on each side. In the present invention, however, an optically anisotropic layer or a transparent substrate having thereon can serve as a protective film on one side of the linear polarizer film. When a separate protective film is used other than the optically anisotropic layer or the transparent substrate, it is preferably a cellulose ester film having high optical isotropy, especially a triacetyl cellulose film.

When circular polarizers comprising a broadband quarter wave plates formed of the retarder and a linear polarizer film are prepared according to the present invention, it is desired that the linear polarizer film, the optically anisotropic layer generating a π phase difference and the optically anisotropic layer generating a π/2 phase difference are laminated in this order, and more desired that they are laminated in the order such that the angle between the transmission axis of the linear polarizer film and the slow axis of the optically anisotropic layer generating a n phase difference is 15 or 75±5 degrees, preferably 15 or 75±3 degrees. Usually, commercially available long-length linear polarizer films have an absorption axis parallel to the longitudinal direction thereof and have a transmission axis orthogonal to the absorption axis. Thus, when the long-length linear polarizer film is used for preparation of the circular polarizer, the optically anisotropic layer generating a π phase difference is desirably laminated on the linear polarizer film such that the angle between the slow axis of the layer and the longitudinal axis of the film is substantially 15 or 75 degrees. Linear polarizer films having an absorption axis inclined at 45 degrees relative to the longitudinal direction are described in JPA No. 2002-86554. For such linear polarizer films, the optically anisotropic layer generating a n phase difference is desirably laminated on the linear polarizer film such that the angle between the slow axis of the layer and the absorption axis of the linear polarizer film is substantially 15 or 75 degrees.

[Liquid-Crystal Displays]

One embodiment of the present invention relates to a LCD cell and a pair of polarizer plates sandwiching the LCD cell wherein at least one of the polarizer plates comprises a transparent protective film, a linear polarizer film and a retarder of the present invention. The retarder is desirably a quarter wave plate comprising a layer generating a phase difference of π and a layer generating a phase difference of π/2. The retarder is desirably laminated on the linear polarizer film at the layer generating a phase difference of π. The retarder according to the present invention may be incorporated in the LCD as a stand-alone component or one integrated component of a circular polarizer desirably having the above-mentioned structure.

Various examples of layer constitutions, LCD cells or the like which can be used in the retarder, circular polarizer and LCD according to the present invention are described in columns from 129 to 192 of JPA No. 2001-166144.

EXAMPLES

The present invention will further be detailed referring to specific Examples. It is to be noted that any materials, reagents, ratios of use thereof and operations shown in the Examples below can properly be modified without departing from the spirit of the present invention. Thus the present invention is by no means limited to the Examples described below.

Example 1-1

(Preparation of an Alignment Layer)

An optically isotropic triacetyl cellulose film in the form of 100 micro meters in thickness, 150 mm in width and 200 mm in length was used as a transparent substrate. A diluted solution for an alignment layer (a polymer of the structural formula shown below) was continuously applied to a surface of the transparent substrate to form a layer having a thickness of 0.5 micro meters. Then, a rubbing treatment was continuously performed to a surface of the layer in a direction at 30 degrees anticlockwise relative to the longitudinal direction of the transparent substrate, to form an alignment layer.

Polymer used for an alignment layer

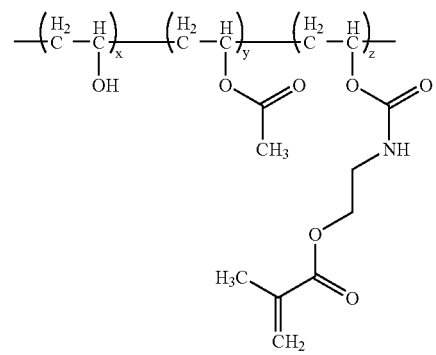

x:y:z (molar ratio)=97:2:1

(Preparation of an Optically Anisotropic Layer (A))

A coating solution of the composition below was continuously applied to the rubbed surface of the alignment layer with a bar coater, dried, heated (matured in alignment) and further irradiated with UV rays to form an optically anisotropic layer (A), in other words a lower layer, having a thickness of 2.0 micro meters. The optically anisotropic layer (A) had a slow axis in a direction at 30 degrees anticlockwise relative to the longitudinal direction of the transparent substrate. The retardation value at 550 nm was 265 nm.

Composition of the Coating Solution for the Optically Anisotropic Layer (A)

Rod-like liquid-crystalline compound (1)  14.5 wt %

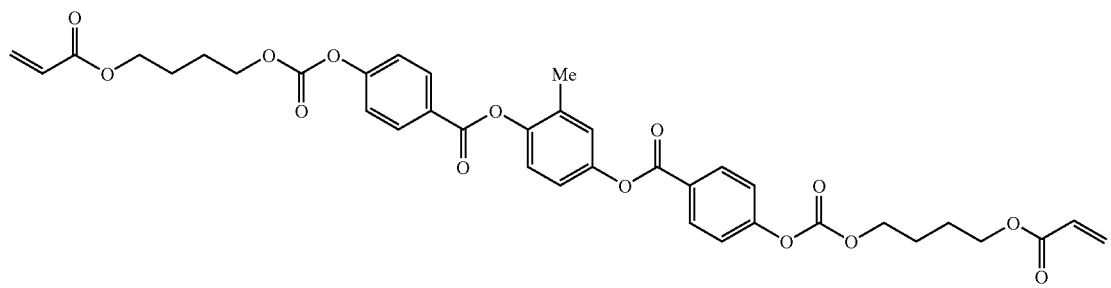

-continued

Sensitizer (1) below　　0.15 wt %

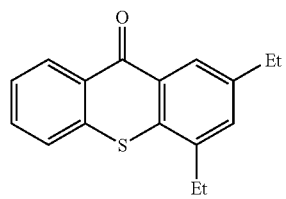

Photo-polymerization initiator (1) below　　0.29 wt %

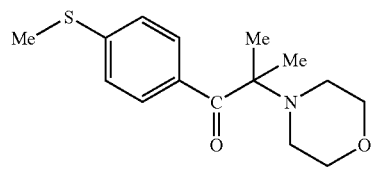

An additive PX-1 bellow　　0.15 wt %

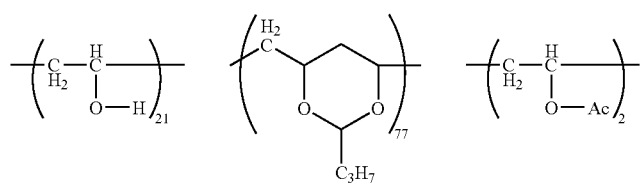

Methyl ethyl ketone　　84.96 wt %

(Preparation of an Optically Anisotropic Layer (B))

A rubbing treatment was continuously performed in a direction at 60 degrees clockwise relative to the slow axis of the layer (A) and at 30 degrees clockwise relative to longitudinal direction of the transparent substrate. A coating solution of the composition below was continuously applied to the rubbed surface of the layer (A) with a bar coater, and dried and heated (matured in alignment), and further irradiated with UV rays to form an optically anisotropic layer (B), in other words upper layer, having a thickness of 1.0 micro meters.

Composition of the coating solution for the optically anisotropic layer (B)

| | |
|---|---|
| The rod-like liquid-crystalline compound (1) | 13.0 wt % |
| The sensitizer (1) | 0.13 wt % |
| The photo-polymerization initiator (1) | 0.39 wt % |
| The additive PX-1 | 0.13 wt % |
| Methyl ethyl ketone | 84.91 wt % |

Thus, a retarder comprising the upper and lower optically anisotropic layers was prepared.

Comparative Example 1-1

An optically anisotropic layer (A) was prepared in the same manner as the Example 1-1 and the same dilute solution as for the alignment layer used in the Example 1-1 was continuously applied to a surface of the optically anisotropic layer (A), to form a layer having a thickness of 0.5 micro meters. Subsequently, a rubbing treatment was continuously performed to a surface of the layer in a direction at 60 degrees clockwise relative to the slow axis of the layer (A) and at 30 degrees clockwise relative to longitudinal direction of the transparent substrate, to form an alignment layer on the layer (A). The optically anisotropic layer (B) was prepared on the rubbed surface of the alignment layer in the same manner as the Example 1-1.

Referential Example 1-1

An optically anisotropic layer (A) was prepared in the same manner as the Example 1-1 except that the additive PX-1 was not added to the coating solution for an optically anisotropic layer (A). Being observed with a polarizing microscope, the layer (A) had a mono-domain like structure, however, a few sea-island like defects were found in the layer (A). A rubbing treatment was continuously performed a surface of the layer (A) in a direction at 60 degrees clockwise relative to the slow axis of the layer (A) and at 30 degrees clockwise relative to longitudinal direction of the transparent substrate and the optically anisotropic layer (B) was prepared in the same manner as the Example 1-1.

Example 1-2

A polyvinyl alcohol (PVA) film was immersed in an aqueous solution containing 2.0 g/L of iodine and 4.0 g/L of potassium iodide at 25 degrees Celsius for 240 seconds and subsequently in an aqueous solution of 10 g/L boric acid at 25 degrees Celsius for 60 seconds. The PVA film was introduced into a tenter stretcher same as that described in FIG. 2 of JPA No.2002-86554 and stretched by 5.3 times. While the tenter was bent far from the stretching direction in the same manner as shown FIG. 2 of JPA No.2002-86554 and the tenter width was kept constant, the PVA film was dried in an atmosphere of 80 degrees Celsius, contracted and put out of the tenter. The PVA film contained 31% of moisture before stretching and 1.5% after drying respectively.

The difference in traveling speed between the left and an right tenter clips was less than 0.05%; and an angle between the center line of the PVA film to be introduced into the stretcher and the center line of the PVA film to be sent to a next step was 46°. The used tenter stretcher had |L1–L2| of 0.7 m and W of 0.7 m, that is, satisfying a relation of |L1–L2|=W, (|L1–L2| and W were identically defined with those described in FIG. 2 of JPA No.2002-86554). "Ax–Cx", which was a substantial stretching direction at the exit of the tenter stretcher and identically defined with that described in FIG. 2 of JPA No.2002-86554, is inclined at 45° relative to the center line (shown by 22 in FIG. 2 of JPA No.2002-86554) of the PVA film to be sent to a next step. Neither winkle nor deformation of the PVA film was found at the exit of the tenter stretcher.

A commercially available cellulose acetate film ("FUJI-TAC" whose retardation was 3.0 nm, FUJI PHOTO FILM Co., LTD.) was subjected to saponification treatment, and then the film was laminated on the surface of the obtained stretched PVA film with an aqueous solution of 3% PVA (PVA-117H, KRARAY CO., LTD.) as an adhesive, and dried at 80 degrees Celsius. Then, a linear polarizer plate having a working width of 650 mm was obtained.

The obtained linear polarizer plate had an absorption axis in a direction inclined at 45 degrees relative to the longitudinal direction. The polarizer plate had a transmittance of 43.7% and a polarization degree of 99.97%. The polarizer plate was cut into a piece having a dimension of 310 mm×233 mm in the same manner as that described in FIG. 8 of JPA No. 2002-86554. Thus, the polarizer plate having the dimension and an absorption axis in a direction inclined at 45 degrees relative to the side at an area efficiency of 91.5%.

Next, as shown in FIG. 1, the retarder 95 which was prepared in the Example 1-1 was laminated on one side of the obtained iodine-based linear polarizer film 91 and an antidazzle antireflective film 96 subjected to a saponification treatment was laminated to another side, such that the longitudinal directions of the polarizer film 91 and the retarder 95 were identical. Thus, circular polarizer 92 was prepared.

Comparative Example 1-2

A circular polarizer 93 was prepared in the same manner as the Example 1-2, except that the retarder 95'prepared in the Comparative Example 1-1 was laminated on one side of the linear polarizer film 91 in the place of the retarder 95, such that the longitudinal directions of the polarizer film 91 and the retarder 95' were identical.

Referential Example 1-2

A circular polarizer 94 was prepared in the same manner as the Example 1-2, except that the retarder 95" prepared in the Referential Example 1-1 was laminated on one side of the linear polarizer film 91 in the place of the retarder 95, such that the longitudinal directions of the polarizer film 91 and the retarder 95" were identical.

[Evaluation]

The circular polarizers 92 to 94 were respectively irradiated with light of 450 nm, 550 nm and 650 nm from the linear polarizer film side and the retardations of the transmitted light were measured.

Being observed with a polarizing microscope, the alignment defects in the retarders were respectively counted.

The obtained results are shown Table 1.

TABLE 1

| Circular Polarizer | Retarder | Re (450 nm) | Re (550 nm) | Re (650 nm) | Number of defects |
|---|---|---|---|---|---|
| 92 | Example 1 | 112 nm | 135 nm | 143 nm | 2 |
| 93 | Comparative Example 1 | 112 nm | 136 nm | 142 nm | 5 |
| 94 | Referential Example 1 | not measurable | 340 nm | 280 nm | — |
| | Ideal value | 112.5 nm | 137.5 nm | 157.5 nm | 0 |

As shown in the above table, according to the present invention, circular polarizers having few defects and being stable can be obtained. As the circular polarizer 94, when the optically anisotropic layer (A) was prepared without the additive and the optically anisotropic layer (B) was prepared on the rubbed surface of the layer (A) without any alignment layer, the desired optical property was not obtained since the slow axes of the layer (A) and (B) did not intersect at the desired angle.

Example No. 2-1

(Preparation of an Alignment Layer)

An optical isotropic triacetyl cellulose film having a thickness of 100 micrometers, a length of 200 m and a width of 150 mm was used as a transparent support. A solution of a polymer described bellow was applied to a surface of the film to form a layer and the surface of the layer was rubbed continuously in a direction at 30° anticlockwise with respect to the longitudinal direction of the transparent substrate. Then, an alignment layer was obtained.

Polymer used for an alignment layer

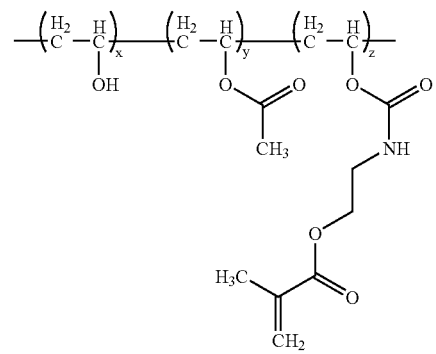

x:y:z (molar ratio)=97:2:1

(Preparation of an Optically Anisotropic Layer (A))

A coating solution of the composition below was continuously applied to the rubbed surface of the alignment layer with a bar coater, dried, heated (matured in alignment) and further irradiated with UV rays to form an optically anisotropic layer (A). The optically anisotropic layer (A) had a slow axis in a direction at 30° anticlockwise with respect to the longitudinal direction of the transparent substrate. The optically anisotropic layer (A) had a thickness of 2.4 micrometers so as to have a retardation of 265 nm at 550 nm.

Composition of the Coating Solution for the Optically Anisotropic Layer (A)

Thus, a Two-layers-type retarder No. 101 was obtained.

(Preparation of a Linear Polarizer Film Having an Inclined Absorption Axis at 45 Degrees)

A polyvinyl alcohol (PVA) film was immersed in an aqueous solution containing 2.0 g L iodine and 4.0 g/L potassium at 25 degrees Celsius for 240 seconds and subsequently in an aqueous solution of 10 g/L boric acid at 25 degrees Celsius for 60 seconds. The PVA film was introduced into a tenter stretcher same as that described in FIG. 2 of JPA No.2002-86554 and stretched 5.3 times. While the tenter was bent far from the stretching direction in the same manner as FIG. 2 of JPA No.2002-86554 and the tenter width was kept constant, the PVA film was dried in an atmosphere of 80 degrees Celsius, contracted and put out of the tenter. The PVA film contained 31% moisture before stretching and 1.5% after drying respectively.

The difference in traveling speed between the left and an right tenter clips was less than 0.05%; and an angle between the center line of the PVA film to be introduced into the stretcher and the center line of the PVA film to be sent to a next step was 46°. The used tenter stretcher had |L1−L2| of 0.7 m and W of 0.7 m, that is, satisfying a relation of |L1−L2|=W, (|L1−L2| and W were identically defined with those described in FIG. 2 of JPA No.2002-86554). "Ax–Cx", which was a substantial stretching direction at the exit of the tenter stretcher and identically defined with that described in Rod-like liquid-crystalline compound (1)     14.5 wt %

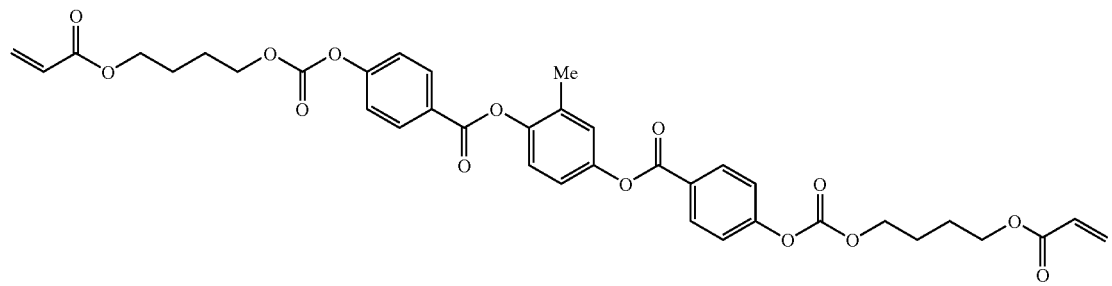

Sensitizer (1) below     0.15 wt %

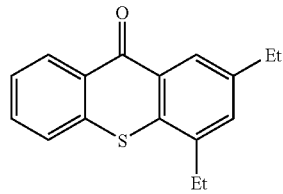

Photo-polymerization initiator (1) below     0.29 wt %

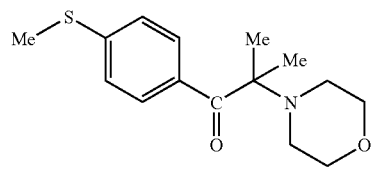

A cross-linkable polymer (K-1)     0.30 wt %
Methyl ethyl ketone     84.80 wt %

(Preparation of an Optically Anisotropic Layer (B))

A rubbing treatment was continuously performed in a direction at 60° clockwise with respect to the slow axis of the layer (A) and at 30° clockwise with respect to longitudinal direction of the transparent substrate. A coating solution of the composition below was continuously applied to the rubbed surface of the layer (A) with a bar coater, and dried and heated (matured in alignment), and further irradiated with UV rays to form an optically anisotropic layer (B) having a thickness of 1.2 micrometers.

Composition of the Coating Solution for the Optically Anisotropic Layer (B)

| | |
|---|---|
| The rod-like liquid-crystalline compound (1) | 13.0 wt % |
| The sensitizer (1) | 0.13 wt % |
| The photo-polymerization initiator (1) | 0.39 wt % |
| The cross-linkable polymer K-1 | 0.13 wt % |
| Methyl ethyl ketone | 86.50 wt % |

FIG. 2 of JPA No.2002-86554, is inclined at 45° relative to the center line (shown by 22 in FIG. 2 of JPA No.2002-86554) of the PVA film to be sent to a next step. Any deformation of the PVA film was not found at the exit of the tenter stretcher.

A commercially available cellulose acetate film ("FUJI-TAC" whose retardation was 3.0 nm, FUJI PHOTO FILM Co., LTD.) was subjected to saponification treatment, and then the film was laminated on the surface of the obtained stretched PVA film with an aqueous solution of 3% PVA (PVA-117H, KRARAY CO., LTD.) as an adhesive, and dried at 80 degrees Celsius. Thus, a linear polarizer plate having a working width of 650 mm was obtained.

The obtained polarizer plate had an absorption axis in a direction inclined at 45 degrees relative to the longitudinal direction. The polarizer film had a transmittance of 43.7% and a polarization degree of 99.97%. The polarizer film was cut into a piece having a dimension of 310 mm×233 mm in the same manner as that described in FIG. 8 of JPA No. 2002-86554. Thus, the polarizer film having the dimension and an absorption axis in a direction inclined at 45 degrees relative to the side at a dimension efficiency of 91.5%.

(Preparation of a Circular Polarizer)

Next, the stretched PVA film, having a 45 degrees inclined absorption axis, prepared in the same manner as the above process was used. An antidazzle antireflective film having a substrate (triacetyl cellulose film) was saponified at the substrate surface and the saponified surface was laminated on a surface of the stretched PVA film with an aqueous solution of 3% PVA (PVA-117H, KRARAY CO., LTD.) as an adhesive. The obtained retarder No. 101 was saponified at the substrate surface and the saponified surface was laminated on the other surface of the stretched PVA film with the same adhesive. Dried at 80 degrees Celsius, a circular polarizer No. 201 was obtained.

Examples No. 2-2 to 2-4 According to the Present Invention

Two-layers-type retarders No. 102 to 104 were prepared in the same manner as Example 2-1 except that compounds shown in Table 2-2 were respectively used for the optically anisotropic layer (A) and/or (B) in the place of the cross-linkable polymer K-1. And circular polarizers No. 202 to 204 were prepared in the same manner as Example 2-1 except that the two-layers-type retarders No. 102 to 104 were used respectively in the place of the retarder No. 101.

Comparative Examples No. 2-1 to 2-3

Two-layers-type retarders No. 105 to 107 were prepared in the same manner as Example 2-1 except that compounds shown in Table 2-2 were respectively used for the optically anisotropic layer (A) and/or (B) in the place of the cross-linkable polymer K-1. And circular polarizers No. 205 to 207 were prepared in the same manner as Example 1 except that the two-layers-type retarders No. 105 to 107 were used respectively in the place of the retarder No. 101.

TABLE 2

| Sample No. | | Compound used in an optically anisotropic layer | |
|---|---|---|---|
| Retarder | Circular polarizer | (A) | (B) |
| Example No. 2-1 | 101 | 201 | K-1 | K-1 |

TABLE 2-continued

| Sample No. | | Compound used in an optically anisotropic layer | |
|---|---|---|---|
| Retarder | Circular polarizer | (A) | (B) |
| Example No. 2-1 | 102 | 202 | K-1 | Alignment Promoter No. 27 |
| Example No. 2-1 | 103 | 203 | K-16 | K-16 |
| Example No. 2-1 | 104 | 204 | K-16 | Alignment Promoter No. 27 |
| Comparative Example No. 2-1 | 105 | 205 | Non | Non |
| Comparative Example No. 2-2 | 106 | 206 | Polymer 1 | Alignment Promoter No. 27 |
| Comparative Example No. 2-3 | 107 | 207 | Polymer 2 | Alignment Promoter No. 27 |

The δa values of compounds used in Examples No. 1-1 to 1-4 are shown bellow:

| Compound | δa value |
|---|---|
| Rod-like liquid-crystalline compound (1) | 15.7 |
| Cross-linkable polymer K-1 | 13.1 |
| Cross-linkable polymer K-16 | 10.7 |

Alignment promoter No. 27

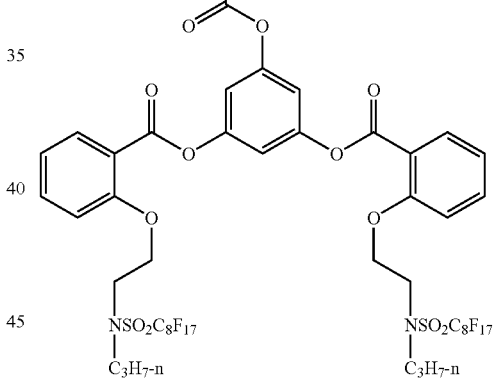

"Polymer I" in the Table 2 is "MEGAFAC F-177" (manufactured by DAINIPPON INK AND CHEMICALS, INCORPORATED), non-cross-linkable-polymer; δa is not available; described in Example Section of JPA No. 1996-231958).

"Polymer II" in the Table 2 is polybutylacrylate (manufactured by ALDRICH; non-cross-linkable-polymer; δa is not available; it was used after removing solvent).

The obtained retarders and circular polarizers were evaluated respectively according to the following methods. The results are shown in Table 3.

(Evaluation of Dirt Adhesion to the Rubbing Clothes from the Surfaces of the Optically Anisotropic Layers (A))

After rubbing the surfaces of the optically anisotropic layers (A), extents of dirt adhesion, in other words extents of whitish portion, transferring to the rubbing clothes were evaluated respectively by visual observation.

(Evaluation of Alignment Defects in the Optically Anisotropic Layers (A))

Before rubbing treatment, alignment defects in the optically anisotropic layers (A) were respectively evaluated by observation with a polarizing microscope. Two types of defects, one of them was a spot type and another was a sea-island type, were found in some of them, and the average numbers of the spot defects per 1 mm$^2$ in the optically anisotropic layers (A) and the sea-island defects presences in the layers were respectively shown in Table 3.

(Evaluation of Alignment Defects in the Optically Anisotropic Layers (B))

Before lamination, alignment defects in the optically anisotropic layers (B) were respectively evaluated by observation with a polarizing microscope. Two types of defects, one of them was a spot type and another was a sea-island type, were found in some of them, and the average numbers of the spot defects per 1 mm$^2$ in the optically anisotropic layers (B) and the sea-island defects presences in the layers were respectively shown in Table 3.

(Measurement of the Retardations of in the Two-Layers-Type Retarders and Evaluation of Retardation Ununiformity in Them)

The obtained circular polarizers was respectively irradiated with light from the linear polarizer film side, in other words the anti reflection film side, and the phase differences (retardation values) of lights passing through the circular polarizers were respectively measured at 450 nm, 550 nm and 650 nm. Remarkable retardation ununiformities were found in some of them, and in such cases, the maximum and minimum retardation values were measured at 550 nm.

(Evaluation of Image Display Qualities of the Circular Polarizers)

All of the upper portions including corresponding to circular polarizer portions above a liquid-crystal cell were removed from "Zaurus MI-E1" (manufactured by SHARP CORPORATION) and the circular polarizers were respectively laminated to the liquid-crystal cell and the residual portions. Then, liquid-crystal-displays respectively including the circular polarizers were evaluated by visual observation.

As indicated by results shown in Table 3, the sea-island alignment defects were found in both of the optically anisotropic layers (A) and (B) of the Comparative example No. 2-1, and the crossed angle between the slow axes of the layers (A) and (B) was not in the desired range, thereby not generating the phase difference in the desired range. Then, the LCD including the circular polarizer of the Comparative example No. 2-1 could not exhibit the desired quality. In the cases of the Comparative examples No. 2-2 and 2-3, although any sea-island alignment defects were not found in each layers (A), dirt adhesions to the rubbing clothes were observed and a lot of spot alignment defects were observed in each layers (B). The desired phase differences were generated only partially, and the only insufficient qualities were obtained. On the other hand, according to the present invention, it was possible to apply a rubbing treatment to the surface of the optically anisotropic layer (A) without any dirt adhesion and to prepare the stable retarder and the circular polarizer with slight defects. The LCD including the circular polarizer of the present invention exhibited a high image displaying quality.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A retarder comprising:
   a substrate and disposed on or above the substrate,
   at least two adjacent layers respectively formed of a composition comprising a liquid-crystalline compound, in which liquid-crystalline molecules are fixed in an alignment state,
   wherein no alignment layer is substantially disposed between the two adjacent layers, wherein the lower layer of the two layers has an upper surface subjected

TABLE 3

| | Evaluations for an optically anisotropic layer (A) | | | Evaluations for an optically anisotropic layer (B) | | Measurement of retardation | | | Image |
|---|---|---|---|---|---|---|---|---|---|
| | | Alignment defects | | Alignment defects | | | | | |
| | Dirt adhesion | Spot defects | Sea-island defects | Spot defects | Sea island defects | Re at 450 nm | Re at 550 nm | Re at 650 nm | desplaying quality |
| Example No. 2-1 | Not observed | Not greater than 10 | Not observed | Not greater than 10 | Not observed | 113 nm | 137 nm | 145 nm | High |
| Example No. 2-2 | Not observed | Not greater than 10 | Not observed | Not greater than 10 | Not observed | 114 nm | 138 nm | 145 nm | High |
| Example No. 2-3 | Not observed | Not greater than 10 | Not observed | Not greater than 10 | Not observed | 112 nm | 135 nm | 144 nm | High |
| Example No. 2-4 | Not observed | Not greater than 10 | Not observed | Not greater than 10 | Not observed | 113 nm | 137 nm | 145 nm | High |
| Comparative Example No. 2-1 | Not observed | Not greater than 10 | Observed | Not greater than 100 | Observed | Not measured | 285 nm (Min.) 365 nm (Max.) | Not measured | Inferior color reproduction |
| Comparative Example No. 2-2 | Slightly observed | Not greater than 10 | Not observed | Not greater than 100 | Not observed | Not measured | 137 nm (Min.) 370 nm (Max.) | Not measured | Ununiformity of color |
| Comparative Example No. 2-3 | Slightly observed | Not greater than 10 | Not observed | Not greater than 100 | Not Observed | Not measured | 135 nm (Min.) 368 nm (Max.) | Not measured | Ununiformity of color |
| Ideal Value | Not observed | Not greater than 10 | Not observed | Not greater than 10 | Not observed | 112.5 nm | 137.5 nm | 157.5 nm | High | to a rubbing treatment and the upper layer of the two layers is disposed in contact with the rubbed surface of the lower layer.

2. The retarder of claim 1, wherein the lower layer is formed of a composition comprising the liquid-crystalline compound and an additive.

3. The retarder of claim 2, wherein the additive is a polymer.

4. The retarder of claim 3, wherein the additive is a modified polyvinyl alcohol.

5. The retarder of claim 4, wherein the modified polyvinyl alcohol comprises a repeating unit comprising a hydrocarbon group of not greater than 9 carbon atoms.

6. The retarder of claim 5, wherein the modified polyvinyl alcohol is denoted by Formula (PX):

-(VAl)$_x$-(HyD)$_y$-(VAc)$_z$-  Formula (PX)

wherein "VAl" is a vinyl alcohol based repeating unit, "HyD" is a repeating unit having a hydrocarbon group of not greater than 9 carbon atoms, "VAc" is a vinyl acetate based repeating unit, x is 20 to 95 wt %, y is 2 to 98 wt %, and z is 0 to 30 wt %.

7. The retarder of claim 6, wherein "HyD" is denoted by Formula (HyD-I) or (HyD-II):

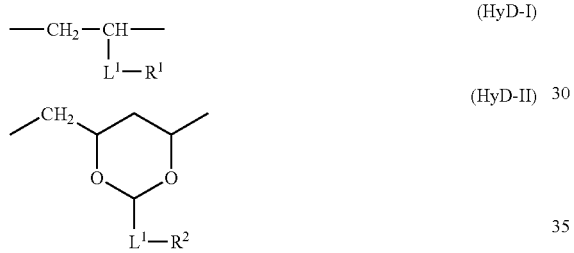

where $L^1$ is a divalent linking group selected from the group consisting of —O—, —CO—, —SO$_2$—, —NH—, an alkylene group, arylene group and any combinations thereof; $L^2$ is a single bond or a divalent linking group selected from the group consisting of —O—, —CO—, —SO$_2$—, —NH—, an alkylene group, arylene group and any combinations thereof; and $R^1$ and $R^2$ respectively denote the hydrocarbon group of not greater than 9 carbon atoms.

8. The retarder of claim 3, wherein the polymer is a non-liquid-crystalline polymer having a cross-linkable group.

9. The retarder of claim 8, wherein the non-liquid-crystalline polymer comprises a repeating unit denoted by Formula (III):

Formula (III)

where $R^{31}$ is a hydrogen atom or a C1–4 alkyl, $P^{31}$ is a monovalent group having an ethylenic unsaturated group, and $L^{31}$ is a single bond or divalent group.

10. The retarder of claim 9, wherein $R^{31}$ is hydrogen or methyl; $P^{31}$ is a monovalent group including an acryloyl, methacryloyl or styryl; and $L^{31}$ is an arylene group, *-COO—, *-CONH— or *-OCO— which are respectively bonded to a main chain at the * site.

11. The retarder of claim 9, wherein the non-liquid-crystalline polymer is a copolymer comprising a repeating unit denoted by the Formula (III) and at least one repeating unit not having any cross-linkable groups.

12. The retarder of claim 8, wherein the non-liquid-crystalline polymer has a smaller δa value, which is calculated with three-dimensional SP value, than that of the liquid-crystalline compound.

13. The retarder of claim 1, wherein the slow axes of the lower layer and the upper layer are not parallel to each other.

14. The retarder of claim 1, wherein an angle between a slow axis of the lower layer and a slow axis of the upper layer is substantially 60 degrees, one of the layers generates a phase difference of π at 550 nm and another generates a phase difference of π/2 at 550 nm.

15. A circular polarizer comprising:
A retarder comprising a substrate and disposed on or above the substrate, at least two adjacent layers respectively formed of a composition comprising a liquid-crystalline compound, in which the liquid-crystalline molecules are aligned in an alignment state,
wherein an angle between the slow axes of the two layers is substantially 60 degrees, one of the layers generates a phase difference of π at 550 nm, the other layer generates a phase difference of π/2 at 550 nm, no alignment layer is substantially disposed between the two layers, the lower layer of the two layers has an upper surface subjected to a rubbing treatment, and the upper layer of the two layers is disposed in contact with the rubbed surface of the lower layer;
a linear polarizer disposed nearer to the layer generating a phase different of π than the other layer,
wherein an angle between a slow axis of the layer generating a phase difference of π and a transmittance axis of the linear polarizer is substantially 15 or 75 degrees.

16. A liquid-crystal display comprising a retarder of claim 1.

17. A liquid-crystal display comprising a circular polarizer of claim 15.

18. A process for preparing a retarder comprising a substrate, a lower layer and an upper layer disposed on or above the substrate in this order wherein both of the layers are respectively formed of a composition comprising a liquid-crystalline compound, in which the liquid-crystalline molecules are fixed in an alignment, and no alignment layer is disposed between the layers, comprising:
a rubbing step of rubbing an upper surface of the lower layer; and
a step of preparing the upper layer in contact with the rubbed surface of the lower layer.

19. The process of claim 18, comprising a step of applying the composition comprising the liquid-crystalline compound and a non-liquid-crystalline polymer to a surface of the substrate or to a surface above the substrate surface, aligning and fixing the liquid-crystalline compound in an alignment state, thereby preparing a lower layer before the rubbing step, wherein the step of preparing the upper layer is a step of applying a composition comprising a liquid-crystalline compound to the rubbed surface, aligning and fixing the liquid-crystalline compound in the alignment state, thereby preparing the upper layer.

* * * * *